(12) United States Patent
Georgeson et al.

(10) Patent No.: US 11,414,002 B2
(45) Date of Patent: Aug. 16, 2022

(54) SYSTEMS, METHODS, AND APPARATUS FOR HIGH-TRAFFIC DENSITY AIR TRANSPORTATION

(71) Applicant: The Boeing Company, Chicago, IL (US)

(72) Inventors: Gary E. Georgeson, Tacoma, WA (US); Kenneth H. Griess, Kent, WA (US); Joseph Lawrence Hafenrichter, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

(21) Appl. No.: 16/582,875

(22) Filed: Sep. 25, 2019

(65) Prior Publication Data

US 2021/0086683 A1 Mar. 25, 2021

(51) Int. Cl.
*B60P 3/07* (2006.01)
*B60P 3/00* (2006.01)
(Continued)

(52) U.S. Cl.
CPC ............... *B60P 3/07* (2013.01); *B60P 3/007* (2013.01); *B64C 39/024* (2013.01);
(Continued)

(58) Field of Classification Search
CPC .......... B60P 3/07; B60P 3/007; B64C 39/024; B64C 2201/128; B64C 2201/208;
(Continued)

(56) References Cited

U.S. PATENT DOCUMENTS

| 3,425,310 A | 2/1969 | Grib et al. |
|---|---|---|
| 4,075,589 A | 2/1978 | Braillon |

(Continued)

FOREIGN PATENT DOCUMENTS

| CN | 110254150 A | 9/2019 |
|---|---|---|
| DE | 102016009685 A1 | 7/2017 |

(Continued)

OTHER PUBLICATIONS

"Electropermanent magnet", Retrieved from en.wikipedia.org/wiki/Electropermanent_magnet on Nov. 19, 2019. (7 pages).

(Continued)

*Primary Examiner* — Richard M Camby
(74) *Attorney, Agent, or Firm* — Hanley, Flight & Zimmerman, LLC

(57) ABSTRACT

Methods, apparatus, systems, and articles of manufacture are disclosed for high-traffic density air transportation. An example system includes a land vehicle having a first location and a transit carrier having a movement system, first stacking couplers, a first and second magnetic coupler, and a transit pod having second stacking couplers configured to couple to the first stacking couplers, a UAV having UAV couplers and a second location, and a controller to, in response to obtaining a request to direct the land vehicle to move from the first location to a third location, invoke the UAV to move to the third location, and in response to the land vehicle and the UAV arriving at the third location, invoke the UAV to couple to the transit pod to facilitate transport of the transit pod from the third location to a fourth location by coupling the UAV couplers to the second stacking couplers.

21 Claims, 50 Drawing Sheets

(51) Int. Cl.
*G05D 1/00* (2006.01)
*G05D 1/10* (2006.01)
*B64C 39/02* (2006.01)
*G05D 1/04* (2006.01)

(52) U.S. Cl.
CPC ........... *G05D 1/0088* (2013.01); *G05D 1/042* (2013.01); *G05D 1/101* (2013.01); *B64C 2201/128* (2013.01)

(58) Field of Classification Search
CPC ...... G05D 1/0088; G05D 1/042; G05D 1/101; G06Q 10/083; G06Q 50/28
See application file for complete search history.

(56) References Cited

U.S. PATENT DOCUMENTS

| | | | |
|---|---|---|---|
| 5,813,349 | A | 9/1998 | Jensen |
| 7,434,701 | B1 | 10/2008 | Freeman et al. |
| 8,678,121 | B2 | 3/2014 | Troy et al. |
| 8,738,226 | B2 | 5/2014 | Troy et al. |
| 9,056,676 | B1* | 6/2015 | Wang ................ G01C 21/3697 |
| 9,527,394 | B1 | 12/2016 | Tang et al. |
| 9,580,173 | B1* | 2/2017 | Burgess ................ B64D 1/22 |
| 9,841,757 | B2* | 12/2017 | Mikan ................ G08G 5/0069 |
| 9,940,840 | B1 | 4/2018 | Schubert et al. |
| 10,150,524 | B2 | 12/2018 | Evans |
| 10,380,898 | B1 | 8/2019 | Schubert et al. |
| 10,545,509 | B1 | 1/2020 | Jessen et al. |
| 10,683,022 | B2 | 6/2020 | Boichot et al. |
| 10,759,286 | B2 | 9/2020 | Evans |
| 10,831,215 | B2 | 11/2020 | Giegel |
| 10,899,240 | B2 | 1/2021 | Evans |
| 10,930,159 | B1 | 2/2021 | Jessen et al. |
| 11,077,551 | B2 | 8/2021 | Skaaksrud et al. |
| 11,130,503 | B1 | 9/2021 | Peloquin et al. |
| 2008/0059007 | A1 | 3/2008 | Whittaker et al. |
| 2009/0320713 | A1 | 12/2009 | Amiri |
| 2010/0256852 | A1 | 10/2010 | Mudalige |
| 2013/0313071 | A1 | 11/2013 | Kasuya et al. |
| 2014/0032034 | A1* | 1/2014 | Raptopoulos ........ G05D 1/0088 701/25 |
| 2014/0209756 | A1 | 7/2014 | Brown |
| 2014/0263852 | A1* | 9/2014 | Walker ................ B64D 47/08 244/53 R |
| 2015/0246614 | A1 | 9/2015 | Dames et al. |
| 2016/0207627 | A1* | 7/2016 | Hoareau .................. B64D 1/12 |
| 2016/0288802 | A1 | 10/2016 | Kinugawa et al. |
| 2017/0066486 | A1 | 3/2017 | Malone et al. |
| 2017/0262790 | A1 | 9/2017 | Khasis |
| 2018/0039285 | A1 | 2/2018 | Giegel |
| 2018/0237086 | A1 | 8/2018 | Evans |
| 2018/0257448 | A1 | 9/2018 | Schreiner |
| 2018/0290561 | A1 | 10/2018 | Baumgartner |
| 2018/0341911 | A1* | 11/2018 | Daoura ............. G06Q 10/0833 |
| 2018/0366005 | A1 | 12/2018 | Seenumani et al. |
| 2019/0054630 | A1* | 2/2019 | Lewis .................... B25J 15/086 |
| 2019/0066032 | A1* | 2/2019 | Taveira ................ G06Q 10/083 |
| 2019/0232796 | A1 | 8/2019 | Applegate |
| 2020/0189335 | A1 | 6/2020 | Harmon et al. |
| 2020/0361324 | A1 | 11/2020 | Evans |
| 2021/0086683 | A1 | 3/2021 | Georgeson et al. |
| 2021/0089050 | A1 | 3/2021 | Georgeson et al. |
| 2021/0089053 | A1 | 3/2021 | Georgeson et al. |
| 2022/0089202 | A1 | 3/2022 | Gorman et al. |

FOREIGN PATENT DOCUMENTS

| | | |
|---|---|---|
| DE | 102017007151 A1 | 1/2019 |
| GB | 2461148 A | 12/2009 |

OTHER PUBLICATIONS

Knaian, A. N., "Electropermanent Magnetic Connectors and Actuators: Devices and Their Application in Programmable Matter", PhD dissertation MIT, Jun. 2010. (206 pages).

Gilpin, K., Knaian, A., and Rus, D. "Robot Pebbles: One Centimeter Modules for Programmable Matter through Self-Disassembly", 2010 IEEE Int. Conf. on Robotics and Automation, May 3-8, 2010, Anchorage, AK. (8 pages).

Techzone, "Amazing Technologies of the Future," YouTube Video, posted Oct. 31, 2017, accessed Feb. 4, 2020, Retrieved from the Internet: <URL:https://www.youtube.com/watch?v=rQFZdcPphwU> (1 page).

European Patent Office, "Extended European Search Report", issued in connection with EP patent application No. 20188367.5-1009, dated Jan. 12, 2021 (8 pages).

United States Patent and Trademark Office, "Non-Final Rejection," issued in corresponding U.S. Appl. No. 16/582,881 dated Jun. 15, 2022, 38 pages.

* cited by examiner

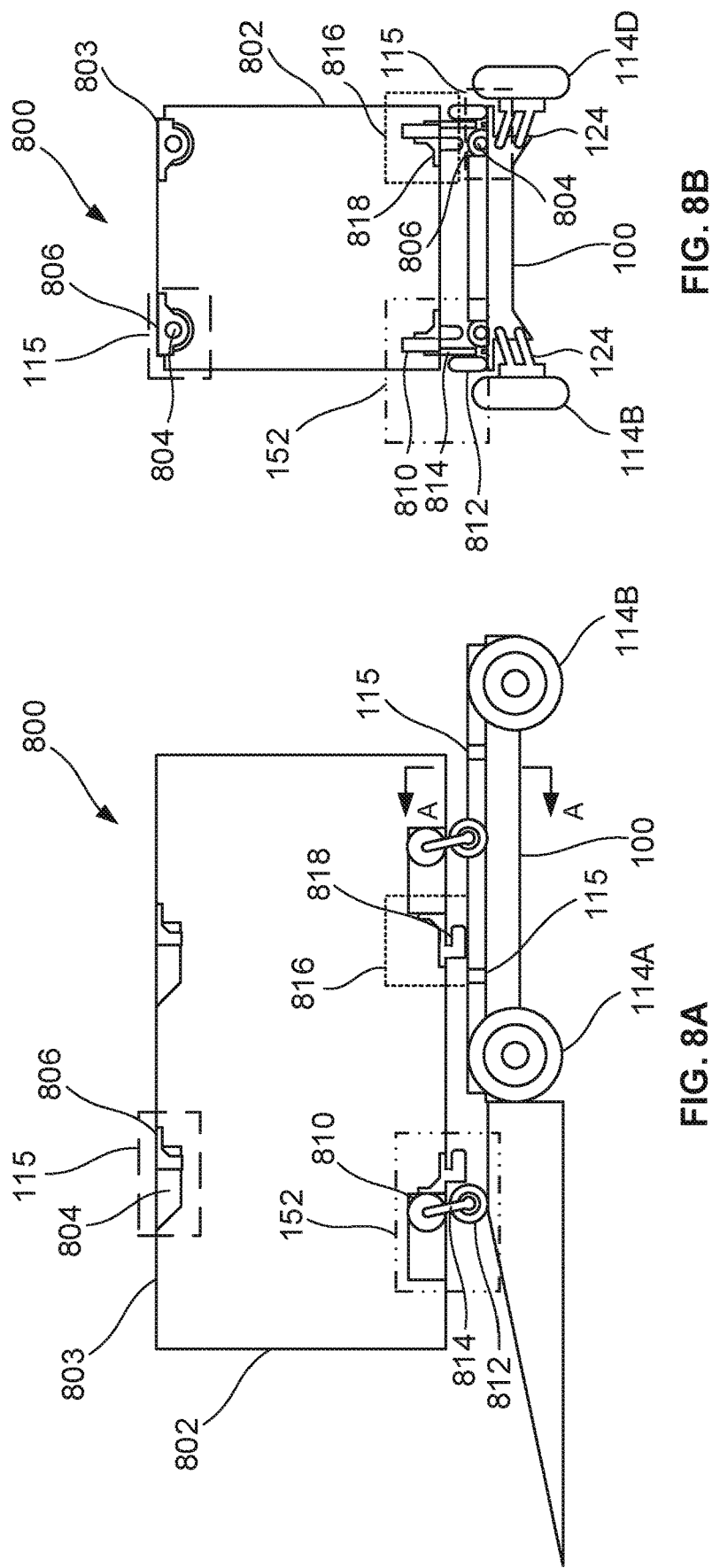

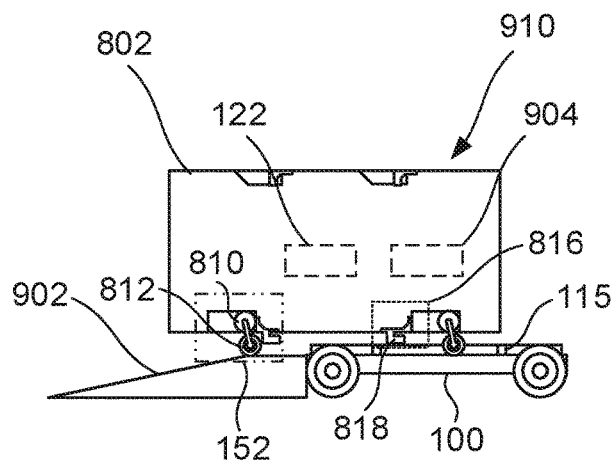
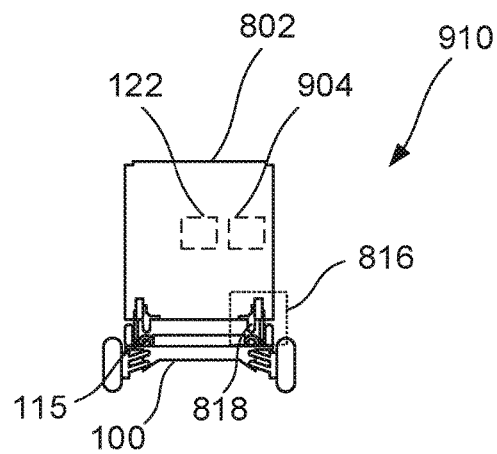
FIG. 9A    FIG. 9B
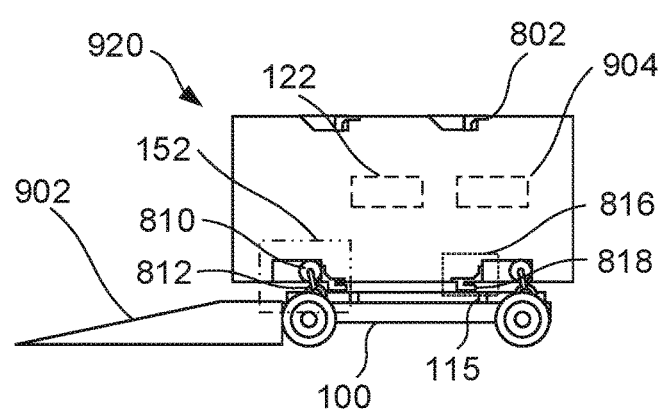
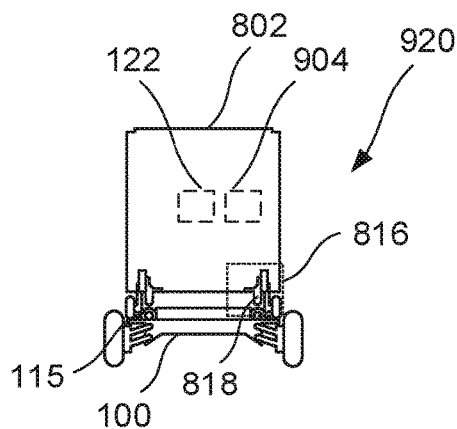
FIG. 9C    FIG. 9D
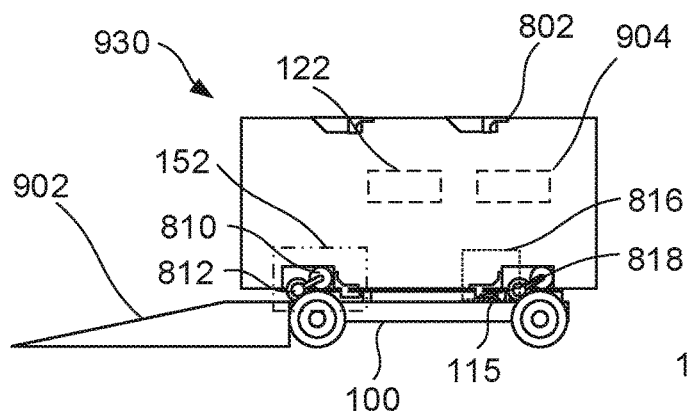
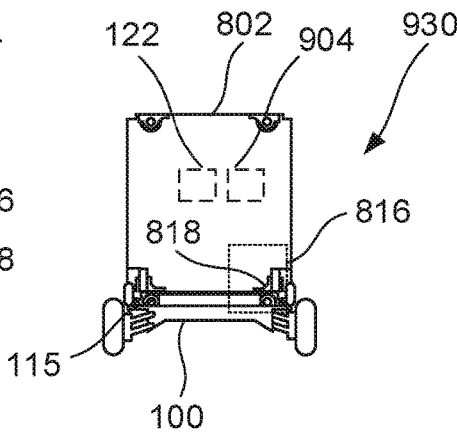
FIG. 9E    FIG. 9F

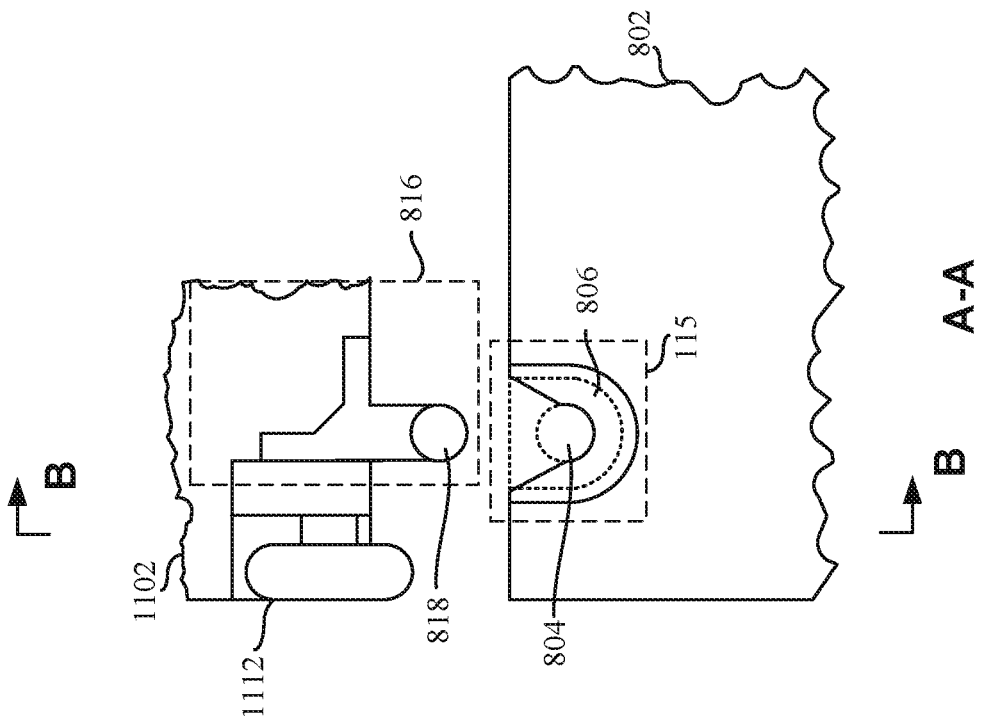
FIG. 11F  A-A
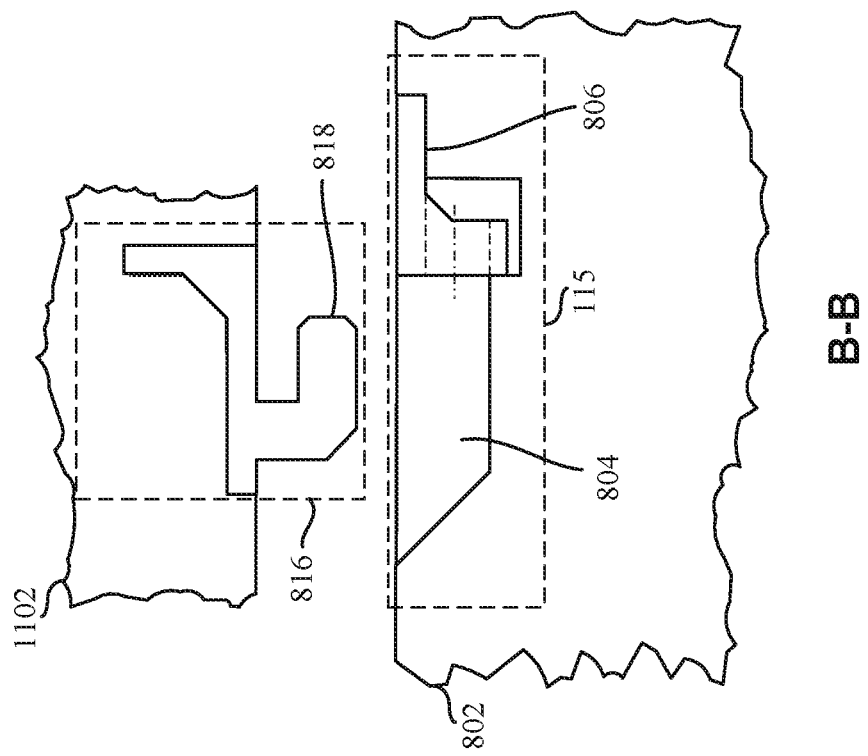
FIG. 11E  B-B

US 11,414,002 B2

SYSTEMS, METHODS, AND APPARATUS FOR HIGH-TRAFFIC DENSITY AIR TRANSPORTATION

FIELD OF THE DISCLOSURE

This disclosure relates generally to transportation and, more particularly, to systems, methods, and apparatus for high-traffic density air transportation.

BACKGROUND

In many countries, personalized travel is preferred over mass transportation, but overcrowding of roads and highways is increasing traffic density at the expense of transportation efficiency. Existing mass transportation systems have been unable to keep up with significant population influxes to urban areas. Increasing the capacity of existing mass transportation systems, such as bus, rail, and ride-sharing systems, requires large infrastructure and incurs significant costs. Further, the ability to grow and innovate existing mass transportation systems is limited by the lack of available acreage to put the additional infrastructure.

SUMMARY

An example system disclosed herein includes a land vehicle having a first location, the land vehicle including a transit carrier having a movement system, first stacking couplers, a first magnetic coupler, and a second magnetic coupler, and a transit pod having second stacking couplers configured to couple to the first stacking couplers, an unmanned aerial vehicle (UAV) having UAV couplers and a second location, and a controller to, in response to obtaining a request to direct the land vehicle to move from the first location to a third location, invoke the UAV to move to the third location, and in response to the land vehicle and the UAV arriving at the third location, invoke the UAV to couple to the transit pod to facilitate transport of the transit pod from the third location to a fourth location by coupling the UAV couplers to the second stacking couplers of the transit pod.

An example non-transitory computer readable storage medium disclosed herein includes instructions that, when executed, cause at least one processor to instruct a land vehicle to move from a first location to a second location, the land vehicle including a transit carrier having a movement system, first stacking couplers, a first magnetic coupler, and a second magnetic coupler, and a transit pod having second stacking couplers configured to couple to the first stacking couplers, direct a UAV to move from a third location to the second location, the UAV having transport couplers, and in response to the land vehicle and the UAV arriving at the third location, invoke the UAV to couple to the transit pod to facilitate transport of the transit pod from the third location to a fourth location by coupling the UAV couplers to the second stacking couplers of the transit pod.

An example method disclosed herein includes instructing a land vehicle to move from a first location to a second location, the land vehicle including a transit carrier having a movement system, first stacking couplers, a first magnetic coupler, and a second magnetic coupler, and a transit pod having second stacking couplers configured to couple to the first stacking couplers, directing a UAV to move from a third location to the second location, the UAV having transport couplers, and in response to the land vehicle and the UAV arriving at the third location, invoking the UAV to couple to the transit pod to facilitate transport of the transit pod from the third location to a fourth location by coupling the UAV couplers to the second stacking couplers of the transit pod.

BRIEF DESCRIPTION OF THE DRAWINGS

FIGS. 8A-8B depict an example land vehicle in a pre-coupling stage.

FIGS. 9A-9J depict example coupling operations to form the example land vehicle of FIGS. 8A-8B.

FIGS. 11E-11F depict views of an example coupling operation of the example air vehicle of FIGS. 11A-11B in the pre-coupling stage.

Figure 1A:
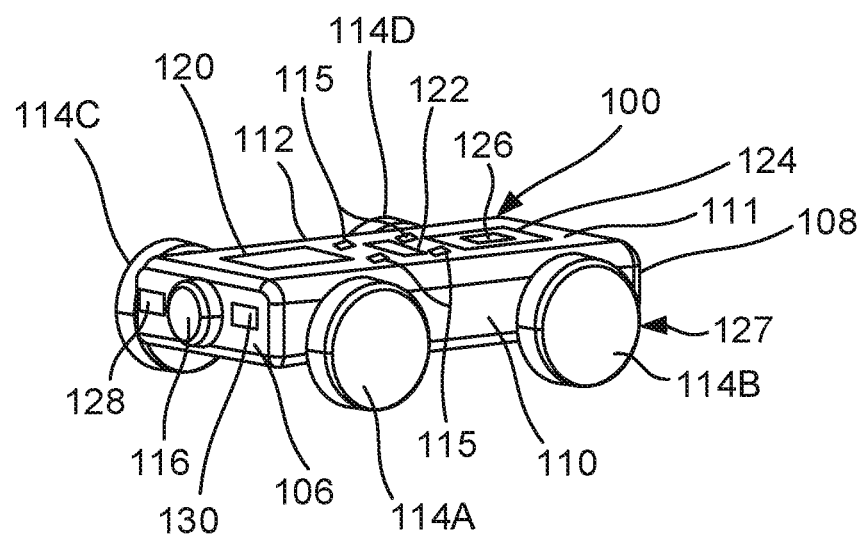
FIGS. 1A-1B depict isometric views of an example implementation of a transit carrier to implement the examples disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, transportation infrastructure is becoming increasingly congested. Mass transportation systems are excessively costly and time consuming to build, manage, and maintain, and do not take advantage of existing efficiency opportunities. As citizens of many countries prefer personalized travel, such as operating their own automobiles, transportation efficiency has decreased over time with the increase in congestion. Transportation operators, such as automobile drivers, are not synchronized with other automobile drivers and efficiencies are lost throughout the transportation infrastructure. For example, a first automobile driver stopped at a traffic light must wait for a second automobile driver in front of the first automobile driver to move prior to moving forward. In such examples, transportation efficiency is lost as fewer automobile drivers can pass through the traffic light due to latency generated from non-synchronized transportation operations.

Examples disclosed herein include an example mass transportation system facilitated by autonomous transit pods to enable a personal transportation experience or, in some instances, the delivery of goods, packages, or other items. In some disclosed examples, the autonomous transit pods can be passenger pods (e.g., autonomous passenger pods) that transport one or more persons (e.g., passengers) or parcel pods (e.g., autonomous parcel pods) that transport goods, packages, or other items. An autonomous transit pod can be coupled and de-coupled to an autonomous transit carrier that can be coupled and de-coupled to one or more other autonomous transit carriers using magnetic couplers to improve travel efficiency and throughput. Example types of an autonomous transit carrier can be a UAV, a road chassis, a rail chassis, a motorized hull, etc. Advantageously, by coupling multiple autonomous transit carriers together for high-density transport, the example mass transportation system can provide dynamically optimized traffic flow, power saving efficiencies, and enhanced traffic safety.

In some disclosed examples, convoys or groups of autonomous vehicles comprised of pods mated to carriers can be formed using magnetic couplers to facilitate the high-density transport of goods and persons. An example convoy can include a group of autonomous transit carriers, passenger vehicles, and/or parcel vehicles that are coupled between powertrain vehicles. For example, a vehicle (e.g., an autonomous vehicle, an autonomous land vehicle, a land transit assembly, etc.) may include a pod (e.g., a passenger pod, a parcel pod, etc.) coupled to and/or otherwise mated to a transit carrier. In some disclosed examples, a vehicle can be a passenger vehicle (e.g., an autonomous passenger vehicle, a land passenger vehicle, etc.) that corresponds to a passenger pod coupled to a transit carrier. In some disclosed examples, a vehicle can be a parcel vehicle (e.g., an autonomous parcel vehicle, a land parcel vehicle, etc.) that corresponds to a parcel pod coupled to a transit carrier. In some disclosed examples, a vehicle or an unmated transit carrier can join or leave the convoy at speed to facilitate high-density transport.

In some disclosed examples, the autonomous transit carriers transport autonomous transit pods to an example transportation hub, such as an air-travel-based transportation hub, a rail-based transportation hub, a water-based transportation hub, etc. For example, the autonomous transit carrier can transport an autonomous transit pod to an unmanned aerial vehicle (UAV) transportation hub, at which one or more UAVs can couple to and fly the autonomous transit pod to a different location. In other examples, the autonomous transit carrier can transport the autonomous transit pod to a platform of a rail facility, at which the autonomous transit pod can de-couple from the autonomous transit carrier and couple to another autonomous transit pod in a stacked configuration.

Figure 1B:
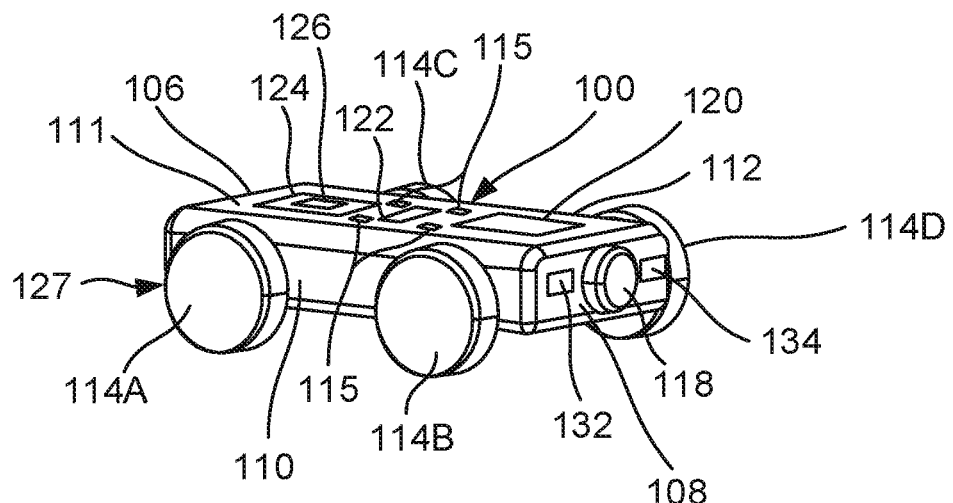

FIGS. 1A-1B depict isometric views of an example implementation of a transit carrier 100 to transport an example transit pod 102, 104 depicted in FIGS. 1F-1M. For example, the transit carrier 100 is a road or transit chassis configured to transport the transit pod 102 of FIGS. 1F-1I or the transit pod 104 of FIGS. 1J-1M on road-type surfaces. Alternatively, the transit carrier 100 may be referred to herein as a transit pod carrier. In FIGS. 1A-1B, the transit carrier 100 is an autonomous vehicle (e.g., an autonomous transit pod carrier, an autonomous road or transit chassis, etc.).

FIG. 1A is an isometric front view of the transit carrier 100 and FIG. 1B is an isometric rear view of the transit carrier 100. The transit carrier 100 has a front surface 106, a rear surface 108 opposite the front surface 106, a first side surface 110 on a first side, and a second side surface 112 on a second side opposite the first side surface 110. The transit carrier 100 has four wheels 114A-D including a first wheel 114A and a second wheel 114B on the first side of the transit carrier 100 and a third wheel 114C and a fourth wheel 114D on the second side of the transit carrier 100.

In the illustrated example of FIGS. 1A-1B, the transit carrier 100 includes first couplers 115 (e.g., first stacking couplers 115) to couple with the transit pod 102, 104 of FIGS. 1F-1M. In FIGS. 1A-1B, the first couplers 115 are on a top surface 111 of the transit carrier 100. The first couplers 115 of FIGS. 1A-1B are stacking couplers (e.g., first stacking couplers). For example, the transit carrier 100 includes the first couplers 115 to facilitate a stacking and/or a placement of the transit pod 102 of FIGS. 1F-1G or the transit pod 102 of FIGS. 1H-1I on top of the transit carrier 100. In some examples, the first couplers 115 include a lug-pin coupling system. For example, each of the first couplers 115 can correspond to a groove that leads to a receptacle that can receive a pin and latch to the pin when substantially received. The first couplers 115 are described below in connection with at least FIGS. 8A-8F, 9A-9J, and 10A-10B. In some examples, the first couplers 115 implement first means for coupling. For example, the first means for coupling can include at least one of a groove or a lug. In other examples, the first means for coupling can include at least one of a groove or a receptacle configured to receive a pin, a plug, etc.

The transit carrier 100 includes example magnetic couplers 116, 118 including a first example magnetic coupler 116 (e.g., 116A-116D) on the front surface 106 as depicted in FIG. 1A and a second example magnetic coupler 118 (e.g., 118A-118D) on the rear surface 108 as depicted in FIG. 1B. The magnetic couplers 116, 118 are electro-permanent (EP) magnets controlled by an example switching unit 120 and a transit controller 122. In FIGS. 1A-1B, the magnetic couplers 116, 118 are depicted as circular or disk-shaped structures protruding from the transit carrier 100. Alternatively, the magnetic couplers 116, 118 may have any other shape, size, and/or depth than depicted in FIGS. 1A-1B.

Figure 1C:
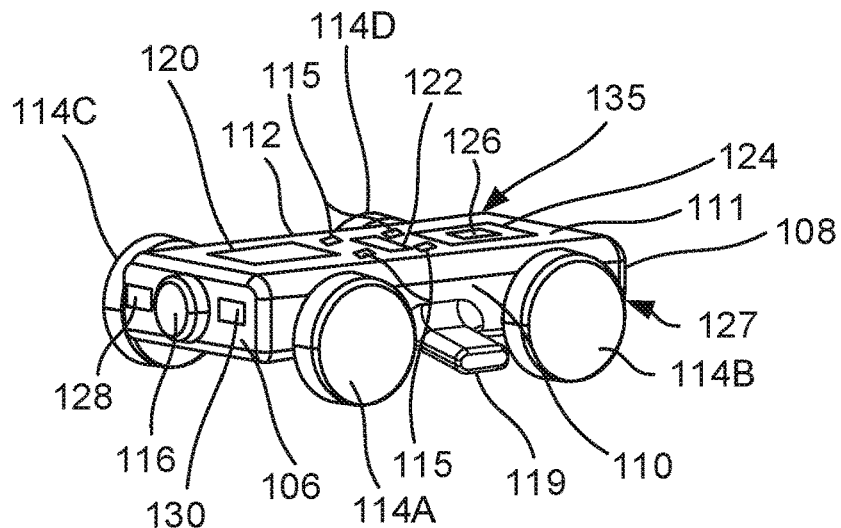
FIGS. 1C-1E depict isometric views of another example implementation of a transit carrier to implement the examples disclosed herein.
Figure 1D:
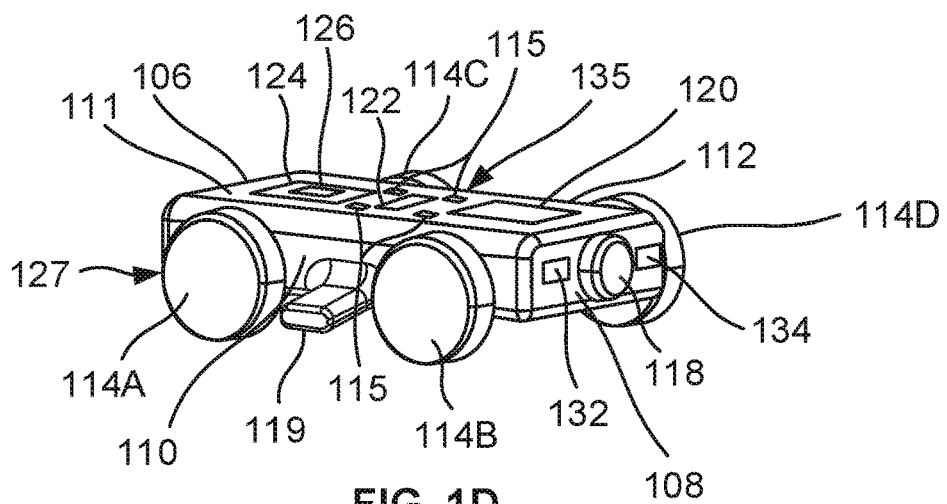
Figure 1E:
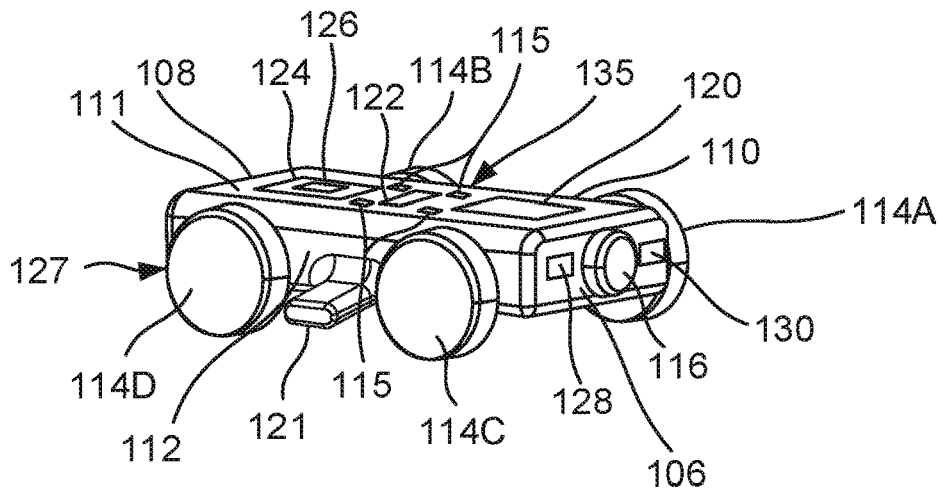

In FIGS. 1A-1B, the magnetic couplers 116, 118 have substantially flat circular exterior surfaces. Alternatively, the magnetic couplers 116, 118 may have a semi-spherical concave-shaped exterior surface that protrudes away from the transit carrier 100. In some examples, exterior surfaces of the magnetic couplers 116, 118 are metallic while, in other examples, the exterior surfaces are covered using a material (e.g., a protective material) such as rubber or a hardened plastic. Alternatively, two or more of the magnetic couplers 116, 118 may be used on the front surface 106 and/or the rear surface 108. Additionally or alternatively, one or more magnetic couplers may be used on the first side surface 110 and/or the second side surface 112 as depicted in FIGS. 1C-1E.

The magnetic couplers 116, 118 of FIGS. 1A-1B can include two or more magnets. For example, the magnetic couplers 116, 118 can include (1) a semi-hard reversible electromagnet including one or more coils and (2) a magnetically hard permanent magnet. In such examples, the electromagnet can be an aluminum, nickel, and cobalt (AlNiCo) magnet. In other examples, the permanent magnet can be a neodymium, iron, and boron (NdFeB) magnet. Alternatively, any other electromagnet and/or permanent magnet may be used.

In FIGS. 1A-1B, the permanent magnet and the electromagnet of the magnetic couplers 116, 118 are assembled in an arrangement or configuration where the magnets are sandwiched, pressed, and/or otherwise disposed between plates of magnetically soft material (e.g., iron, mild (low carbon) steel plates, etc.). The sandwich arrangement enables a magnetic field of the permanent magnet to be closed (i.e., turned off) based on flux cancellation. Flux cancellation can occur by transmitting a relatively brief, high-current electrical pulse in a first direction through the one or more coils of the electromagnet. Once the one or more coils of the electromagnet are energized, the semi-hard material of the electromagnet retains the new magnetic field after the magnetic field of the permanent magnet is closed (referred to as magnetic remanence). The magnetic field can be re-established by sending another high-current electrical pulse through the one or more coils of the electromagnet in a second direction opposite the first direction.

In FIGS. 1A-1B, the transit carrier 100 includes the switching unit 120 to control a coupling capability or strength of the magnetic couplers 116, 118. For example, the switching unit 120 can be a power switching unit that changes a polarity of one or more coils of the electromagnet. In such examples, the switching unit 120 can be electrically in circuit with the magnetic couplers 116, 118. In some examples, the switching unit 120 includes one or more switches (e.g., electromagnet switches, solid-state switches, etc.) or relays (e.g., electromagnet relays, solid-state relays, etc.) to facilitate handling of the high-current electrical pulses used to energize the electromagnet coil(s). For example, the switching unit 120 can be electrically in circuit with and/or otherwise be electrically coupled to the one or more switches or relays. In such examples, the one or more switches or relays can be electrically in circuit with and/or otherwise be electrically coupled to the magnetic couplers 116, 118.

In some examples, the switching unit 120 can increase the coupling strength (e.g., increase an attraction of one or both the magnetic couplers 116, 118) by turning on one or more switches or relays to increase a quantity of current provided to the electromagnet coil(s). In some examples, the switching unit 120 can decrease the coupling capability (e.g., decrease an attraction of one or both magnetic couplers 116, 118) by turning off one or more switches or relays to decrease a quantity of current provided to the electromagnet coil(s). In some examples, the switching unit 120 includes hardware logic, one or more hardware implemented state machines, one or more processor-based controllers, etc., and/or a combination thereof to obtain a switching command and control the magnetic couplers 116, 118 based on the switching command.

The transit carrier 100 of the illustrated example of FIGS. 1A-1B includes an example powertrain 124 to facilitate movement of the transit carrier 100. In FIGS. 1A-1B, the powertrain 124 includes one or more motors (e.g., electric motors, internal-combustion based motors, etc., and/or a combination thereof to constitute a hybrid motor system), one or more transmissions, one or more drive shafts, one or more differentials, one or more axles, a final drive, etc., to steer and/or otherwise control the wheels 114A-D to facilitate movement of the transit carrier 100. For example, the powertrain 124 may be an electric powertrain including one or more electric motors. In other examples, the powertrain 124 may be an internal combustion-based powertrain including one or more internal combustion engines. In yet other examples, the powertrain 124 may be a hybrid powertrain including one or more electric motors and/or one or more internal combustion engines.

In the illustrated example of FIGS. 1A-1B, the powertrain 124 includes an example power source 126. For example, the power source 126 can be one or more batteries (e.g., lithium-ion batteries) that provide power to the powertrain 124 to enable movement capability of the transit carrier 100. In other examples, the power source 126 can be one or more fuel storage units each including a combustible fuel (e.g., ethanol, gasoline, hydrogen, or other suitable combustible fuel) for use by an internal combustion engine. In yet other examples, the power source 126 may be a hybrid power source that includes one or more batteries and one or more fuel storage units.

In some examples, the power source 126 can provide power to the switching unit 120 (e.g., a relay or a switch of the switching unit 120) to change the polarity of the electromagnet coil(s). In FIGS. 1A-1B, the transit carrier 100 includes a first example movement system 127 that can correspond to at least one of one or more of the wheels 114A-D, the powertrain 124, or the power source 126. In some examples, the first movement system 127 implements first means for moving the transit carrier 100 or first means for transporting the transit carrier 100. For example, the first means for moving the transit carrier 100 can include and/or otherwise correspond to at least one of one or more of the wheels 114A-D, the powertrain 124, the power source 126, one or more joints, an air cushion handling system, one or more rails, one or more rollers (e.g., pallet handling rollers), etc., and/or a combination thereof. In other examples, the first means for transporting the transit carrier 100 can include and/or otherwise correspond to at least one of one or more of the wheels 114A-D, the powertrain 124, the power source 126, one or more joints, an air cushion handling system, one or more rails, one or more rollers (e.g., pallet handling rollers), etc., and/or a combination thereof.

The transit carrier 100 includes the transit controller 122 to obtain commands, instructions (e.g., machine readable instructions), etc., from an external computing system (e.g., a central server, a transportation computing system, etc.) and translate the obtained commands, instructions, etc., into operations (e.g., movement operations, transportation operations, etc.) of the transit carrier 100. In some examples, the transit controller 122 obtains a command to move the transit carrier 100 to a specified location using a Global Positioning System (GPS) based navigation system. In some examples, the transit controller 122 obtains an instruction to couple with another transit carrier 100 by activating and/or otherwise enabling one or both magnetic couplers 116, 118.

The transit controller 122 of FIGS. 1A-1B obtains data from example sensor systems 128, 130, 132, 134. In FIG. 1A, the transit carrier 100 includes a first example sensor system 128 on a first side of the first magnetic coupler 116 and a second example sensor system 130 on a second side of the first magnetic coupler 116, where the second side is opposite the first side. In FIG. 1B, the transit carrier 100 includes a third example sensor system 132 on a first side of the second magnetic coupler 118 and a fourth example sensor system 134 on a second side of the second magnetic coupler 118, where the second side is opposite the first side. Alternatively, the transit carrier 100 may include fewer or more sensor systems 128, 130, 132, 134 than depicted in FIGS. 1A-1B. For example, the transit carrier 100 may include one or more sensor systems 128, 130, 132, 134 on the first side surface 110 and/or the second side surface 112. Alternatively, the transit carrier 100 may have fewer or more sensor systems 128, 130, 132, 134 than depicted on the front surface 106 and/or the rear surface 108. Alternatively, one or more of the sensor systems 128, 130, 132, 134 may be in a different location or position than depicted in FIGS. 1A-1B.

In some examples, one or more of the sensor systems 128, 130, 132, 134 are camera systems to capture images of surroundings or an environment of the transit carrier 100. For example, the first sensor system 128 and the second sensor system 130 can correspond to a front-facing camera system to capture video of the environment in front of the transit carrier 100. In other examples, the third sensor system 132 and the fourth sensor system 134 can correspond to a rear-facing camera system to capture video of the environment behind the transit carrier 100. In some examples, the sensor systems 128, 130, 132, 134 include a single camera (e.g., a monocular camera) to generate mono images. Alternatively, the sensor systems 128, 130, 132, 134 may include two or more cameras to generate stereo images and/or stereo video.

In some examples, one or more of the sensor systems 128, 130, 132, 134 represent one or more instruments or sensors monitoring a characteristic or a parameter of the transit carrier 100 and/or environment or surroundings of the transit carrier 100. For example, one or more of the sensor systems 128, 130, 132, 134 can include an accelerometer, a depth sensor, a humidity sensor, a light sensor, a light detection and ranging (LIDAR) system, a moisture sensor, a pressure sensor, a speed sensor (e.g., a motor encoder, a wheel speed sensor, etc.), a radio detection and ranging (RADAR) system (e.g., a Doppler radar, a pulse-Doppler system, etc.), a temperature sensor, an ultrasound sensor, etc., or any other sensor and/or a combination thereof. For example, the transit controller 122 may obtain sensor data or information including measurements from one or more of the sensor systems 128, 130, 132, 134. In some examples, the sensor systems 128, 130, 132, 134 include hardware logic, one or more hardware implemented state machines, one or more processor-based controllers, etc., and/or a combination thereof to facilitate obtaining sensor information and/or translating the sensor information into a machine readable format that can be processed by at least the transit controller 122.

FIGS. 1C-1E depict isometric views of an example transit carrier 135, which is another example implementation of the transit carrier 100 of FIGS. 1A-1B. Unless specified otherwise, the operation and/or structure of the transit carrier 135 of FIGS. 1C-1E is the same as the operation and/or structure of the transit carrier 100 of FIGS. 1A-1B. For example, the transit carrier 135 of FIGS. 1C-1E is a road or transit chassis configured to transport the transit pod 102 of FIGS. 1F-1G or the transit pod 104 of FIGS. 1H-1I on road-type surfaces.

FIG. 1C is an isometric front view of a first side of the transit carrier 135. FIG. 1D is an isometric rear view of the first side of the transit carrier 135. FIG. 1E is an isometric front view of a second side of the transit carrier 135. The transit carrier 135 of FIGS. 1C-1E includes a third example magnetic coupler 119 on the first side surface 110 and a fourth example magnetic coupler 121 on the second side surface 112. The third and fourth magnetic couplers 119, 121 are EP magnets controlled by the switching unit 120 and the transit controller 122. In FIGS. 1C-1E, the third and fourth magnetic couplers 119, 121 are depicted as elliptical-shaped structures protruding from the transit carrier 135. Alternatively, the third and fourth magnetic couplers 119, 121 may have any other shape, size, and/or depth than depicted in FIGS. 1C-1E. In some examples, exterior surfaces of the third and fourth magnetic couplers 119, 121 are metallic while, in other examples, the exterior surfaces are covered using a material (e.g., a protective material) such as rubber or a hardened plastic. Alternatively, two or more of the third and fourth magnetic couplers 119, 121 may be used on the first side surface 110 and/or the second side surface 112.

The third and fourth magnetic couplers 119, 121 of FIGS. 1C-1E can include two or more magnets. For example, the third and fourth magnetic couplers 119, 121 can include (1) a semi-hard reversible electromagnet including one or more coils and (2) a magnetically hard permanent magnet. In such examples, the electromagnet can be an AlNiCo magnet. In other examples, the permanent magnet can be a NdFeB magnet. Alternatively, any other electromagnet and/or permanent magnet may be used.

In FIGS. 1C-1E, the permanent magnet and the electromagnet of the third and fourth magnetic couplers 119, 121 are assembled in an arrangement or configuration where the magnets are sandwiched, pressed, and/or otherwise disposed between plates of magnetically soft material (e.g., iron, mild (low carbon) steel plates, etc.). For example, the third and fourth magnetic couplers 119, 121 may be controlled and/or otherwise operated in the same or a substantially similar manner as the first and second magnetic couplers 116, 118 of FIGS. 1A-1B. In such examples, the switching unit 120 can control the third and fourth magnetic couplers 119, 121 in the same or the substantially similar manner as the first and second magnetic couplers 116, 118.

Figure 1F:
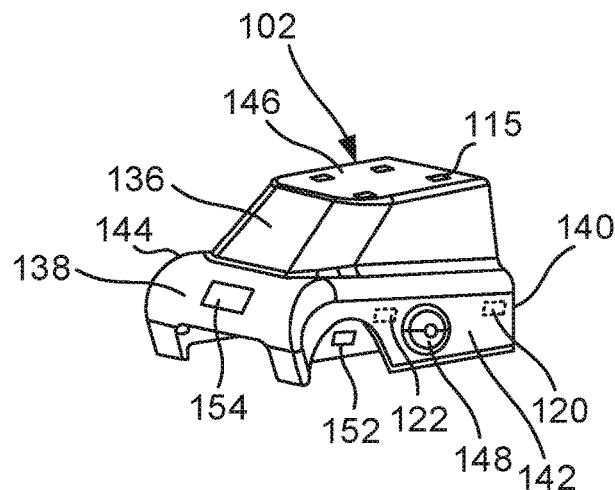
FIGS. 1F-1G depict isometric views of an example implementation of a passenger pod to implement the examples disclosed herein.
Figure 1G:
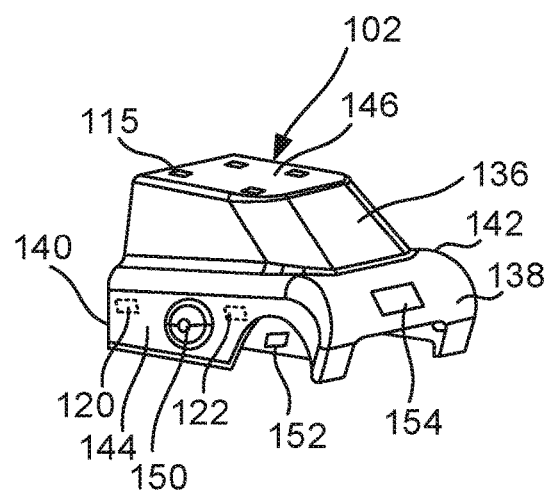

FIGS. 1F-1G depict front isometric views of an example implementation of the transit pod 102. FIG. 1F is a front isometric view of a first side of the transit pod 102. FIG. 1G is a front isometric view of a second side of the transit pod 102, where the second side is opposite the first side. The transit pod 102 of FIGS. 1F-1G is an autonomous transit pod. The transit pod 102 of FIGS. 1F-1G is referred to herein as a passenger pod and includes a cabin, a cockpit, or an interior that can hold one or more persons. For example, an interior of the passenger pod 102 may be substantially similar to a conventional automobile interior including one or more seats and seatbelts, a console dash including electronic screens and other controls (e.g., air conditioning and heating controls, entertainment (e.g., movies, music, Wi-Fi, etc.) controls, etc. The passenger pod 102 of FIGS. 1F-1G includes one or more windows 136.

In the illustrated example of FIG. 1F, the passenger pod 102 has a front surface 138 on a front side, a rear surface 140 on a rear side opposite the front side, a first side surface 142 on a first side, a second side surface 144 on a second side opposite the first side, and a top surface (e.g., a roof, a roof surface, etc.) 146 on a top side. For example, a frame, a structure, etc., of the surfaces 138, 140, 142, 144, 146 may be manufactured using metallic materials (e.g., aluminum, steel, etc.), non-metallic materials (e.g., carbon fiber, plastic, etc.), etc., and/or a combination thereof.

In the illustrated example of FIG. 1F, the passenger pod 102 has a first magnetic coupler 148 (e.g., 148A-D) on the first side surface 142. In FIG. 1G, the passenger pod 102 has a second magnetic coupler 150 (e.g., 150A-B) on the second side surface 144. The first and second magnetic couplers 148, 150 are the same as the first and second magnetic couplers 116, 118 of the transit carrier 100 of FIGS. 1A-1B. Alternatively, one or both magnetic couplers 148, 150 may be different. Alternatively, the first side surface 142 and/or the second side surface 144 may have more than one of the magnetic couplers 148, 150. Alternatively, the magnetic couplers 148, 150 may be in a different location and/or position on the first side surface 142 and/or the second side surface 144 than depicted in FIGS. 1F-1G.

In the illustrated example of FIGS. 1F-1G, the passenger pod 102 includes the first and second magnetic couplers 148, 150 to facilitate coupling (e.g., magnetic coupling) with one or more different passenger pods 102 and/or one or more of the transit pod 104 depicted in FIGS. 1J-1M. For example, the passenger pod 102 can couple to a first passenger pod using the first magnetic coupler 148 and/or can couple to a second passenger pod using the second magnetic coupler 150. In FIGS. 1F-1G, the passenger pod 102 includes the first couplers 115 of FIGS. 1A-1B to facilitate coupling with an aerial vehicle (e.g., an unmanned aerial vehicle (UAV), a drone, a helicopter, a vertical take-off and landing (VTOL) aircraft). The passenger pod 102 coupling with the aerial vehicle is described below in connection with FIGS. 11A-11F and 12A-12L.

The passenger pod 102 of FIGS. 1F-1G includes one or more second example movement systems 152 to control movement of the passenger pod 102 when not coupled to the transit carrier 100 of FIGS. 1A-1B or the transit carrier 135 of FIGS. 1C-1D. The second movement system 152 is described below in connection with FIGS. 8A-8F and 9A-9J. For example, the second movement system 152 of the passenger pod 102 may include and/or otherwise correspond to multiple wheels, one or more motors, one or more joints, one or more power sources (e.g., one or more batteries, one or more fuel storage units, etc.), etc., and/or a combination thereof. In such examples, the second movement system 152 can direct the passenger pod 102 to move and/or otherwise climb on top of the transit carrier 100, 135 to couple to the transit carrier 100, 135, etc.

In some examples, the second movement system 152 implements second means for moving the passenger pod 102 or second means for transporting the passenger pod 102. For example, the second means for moving the passenger pod 102 may include and/or otherwise correspond to multiple wheels, one or more electric motors, one or more joints, one or more power sources (e.g., one or more batteries), an air cushion handling system, one or more rails, one or more rollers (e.g., pallet handling rollers), etc., and/or a combination thereof. In other examples, the second means for transporting the passenger pod 102 can include and/or otherwise correspond to multiple wheels, one or more electric motors, one or more joints, one or more power sources (e.g., one or more batteries), an air cushion handling system, one or more rails, one or more rollers (e.g., pallet handling rollers), etc., and/or a combination thereof.

The passenger pod 102 of FIGS. 1F-1G includes the transit controller 122 of FIGS. 1A-1E to obtain sensor measurements from example sensor systems 154, 156. The sensor systems 154, 156 can correspond to the sensor systems 128, 130, 132, 134 of FIGS. 1A-1E. The sensor systems 154, 156 of the passenger pod 102 include a first example sensor system 154 on the front surface 138 and a second example sensor system 156 (depicted in FIGS. 2A-2B) on the rear surface 140. Alternatively, the passenger pod 102 may include fewer or more sensor systems 154, 156. For example, the passenger pod 102 may include one or more sensor systems 154, 156 on the front surface 138, the rear surface 140, the first side surface 142, the second side surface 144, the top surface 146, etc. Alternatively, one or both sensor systems 154, 156 may be in a different location or position than depicted in or described in connection with FIGS. 1F-1G.

The passenger pod 102 of FIGS. 1F-1G includes the switching unit 120 of FIGS. 1A-1E and the transit controller 122 to obtain commands, instructions, etc., from an external computing system and translate the obtained commands, instructions, etc., into operations (e.g., movement operations, transportation operations, etc.) of the passenger pod 102. In some examples, the transit controller 122 obtains a command to move the passenger pod 102 to a specified location using GPS. In some examples, the transit controller 122 obtains an instruction to couple with the transit carrier 100 of FIGS. 1A-1B and/or FIGS. 1C-1E. In some examples, the transit controller 122 obtains a command to couple the passenger pod 102 to (1) an aerial vehicle by instructing the second movement systems 152 to move to a position to couple to the aerial vehicle and/or (2) another passenger pod 102 by instructing the switching unit 120 to activate and/or otherwise enable one or both of the first and second magnetic couplers 148, 150.

Figure 1H:
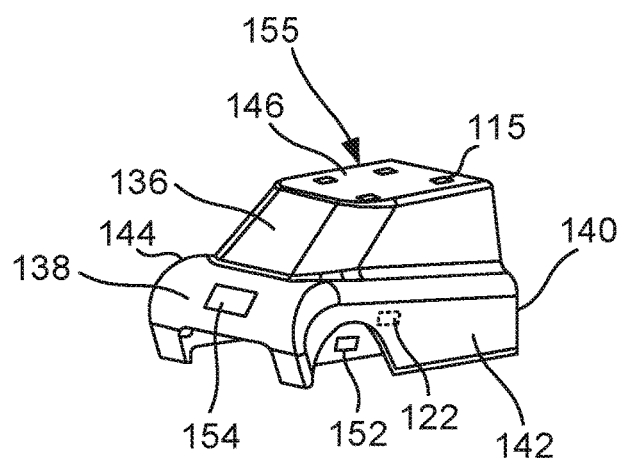
FIGS. 1H-1I depict isometric views of another example implementation of a passenger pod to implement the examples disclosed herein.
Figure 1I:
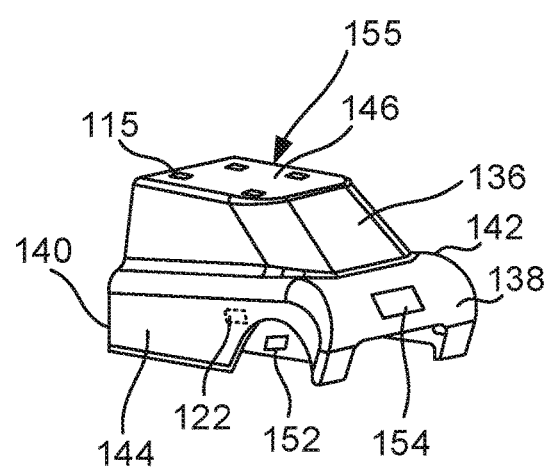

FIGS. 1H-1I depict isometric views of an example transit pod 155 (e.g., 155A-D), which is another example implementation of the transit pod 102 of FIGS. 1F-1G. Unless specified otherwise, the operation and/or structure of the transit pod 155 of FIGS. 1H-1I are the same as the operation and/or structure of the transit pod 102 of FIGS. 1F-1G. FIG. 1H is an isometric front view of a first side of the transit pod 155. FIG. 1I is an isometric front view of the second side of the transit pod 155, where the second side is opposite the first side. The transit pod 155 of FIGS. 1H-1I is an autonomous transit pod. The transit pod 155 of FIGS. 1H-1I is referred to herein as a passenger pod. The passenger pod 155 of FIGS. 1H-1I does not include the switching unit 120 and the magnetic couplers 148, 150 of FIGS. 1F-1G.

Figure 1J:
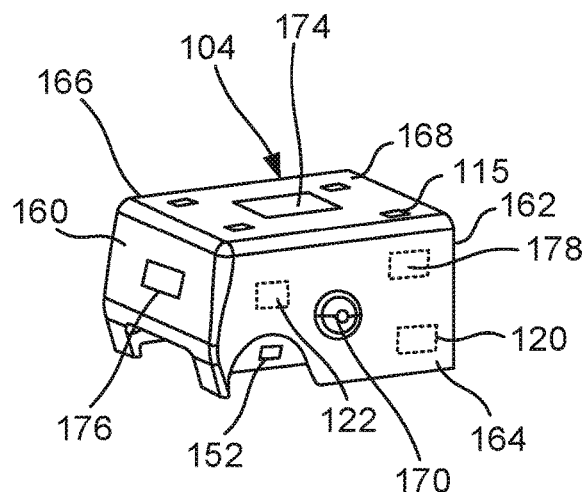
FIGS. 1J-1K depict isometric views of an example implementation of a parcel pod to implement the examples disclosed herein.
Figure 1K:
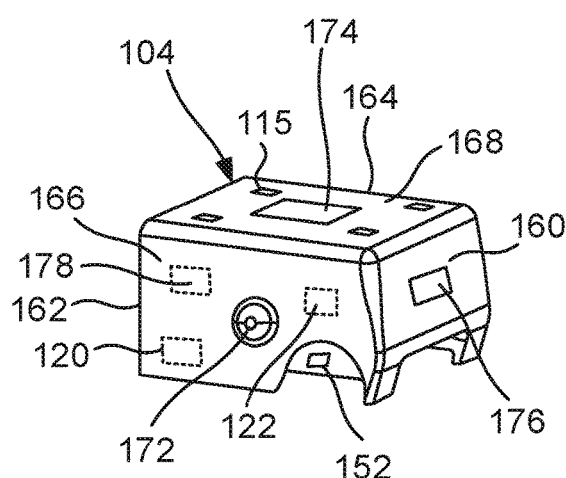

FIGS. 1J-1K depict front isometric views of an example implementation of the transit pod 104. FIG. 1J is a front isometric view of a first side of the transit pod 104. FIG. 1K is a front isometric view of a second side of the transit pod 104, where the second side is opposite the first side. The transit pod 104 of FIGS. 1J-1K is an autonomous transit pod. The transit pod 104 of FIGS. 1J-1K is referred to herein as a parcel pod and can hold or stow cargo, goods, packages, or other items. For example, an interior of the parcel pod 104 may be substantially similar to a conventional automobile trunk, a parcel space of a delivery truck, etc. In some examples, the transit pod 104 can hold or stow live animals (e.g., birds, cattle, chickens, horses, pigs, etc.) for transport. In some examples, the transit pod 104 can hold or stow items that are not packaged but can be placed into the transit pod 104 for transport. For example, the transit pod 104 can transport items such as an art painting or sculpture, an automobile, a bicycle, building material, furniture, etc. In some examples, the transit pod 104 can be a specialized pod outfitted for the transportation of refrigerated items (e.g., meat products, produce, etc.), heated items (e.g., cooked foods such as pizza, complete meal kits, etc.), bulk items (e.g., grain, topsoil, lumber, firewood, etc.), bulky items (e.g., vending machines, pinball machines, etc.). In some examples, the transit pod 104 can store a different one of the transit pod 102 of FIGS. 1F-1G or FIGS. 1H-1I or any other type of transit pod described herein.

In the illustrated example of FIGS. 1J-1K, the parcel pod 104 has a front surface 160, a rear surface 162 opposite the front surface 160, a first side surface 164 on a first side, a second side surface 166 on a second side opposite the first side, and a top surface (e.g., a roof, a roof surface, etc.) 168. For example, a frame, a structure, etc., of the surfaces 160, 162, 164, 166, 168 may be manufactured using metallic materials (e.g., aluminum, steel, etc.), non-metallic materials (e.g., carbon fiber, plastic, etc.), etc., and/or a combination thereof.

In the illustrated example of FIGS. 1J-1K, the parcel pod 104 has a first example magnetic coupler 170 on the first side surface 164 and a second example magnetic coupler 172 on the second side surface 166. The first and second magnetic couplers 170, 172 are the same as the first and second magnetic couplers 116, 118 of the transit carrier 100, 135 of FIGS. 1A-1E and/or the first and second magnetic couplers 148, 150 on the passenger pod 102 of FIGS. 1F-1G. Alternatively, one or both of the first and second magnetic couplers 170, 172 may be different. Alternatively, the first side surface 164 and/or the second side surface 166 may have more than one of the magnetic couplers 170, 172. Alternatively, the magnetic couplers 170, 172 may be in a different location and/or position on the first side surface 164 and/or the second side surface 166 than depicted in FIGS. 1J-1K.

In the illustrated example of FIGS. 1J-1K, the parcel pod 104 includes the first and second magnetic couplers 170, 172 to facilitate coupling (e.g., magnetic coupling) with one or more different parcel pods 104 and/or one or more of the passenger pod 102 depicted in FIGS. 1F-1G. For example, the parcel pod 104 can couple to the passenger pod 102 using the first magnetic coupler 170 and/or can couple to a different parcel pod 104 using the second magnetic coupler 172. In FIGS. 1J-1K, the parcel pod 104 includes the first couplers 115 of FIGS. 1A-1E to facilitate coupling with an aerial vehicle (e.g., a UAV, a drone, a helicopter, etc.). The parcel pod 104 coupling with the aerial vehicle is described below in connection with FIGS. 11A-11F and 12A-12L.

In the illustrated example of FIGS. 1J-1K, the parcel pod 104 has an example hatch 174. The hatch 174 is a slidably moveable surface (e.g., a sunroof, a sliding roof, etc.) to expose an interior of the parcel pod 104 to ambient air to facilitate interaction with another entity, such as a UAV. For example, the transit controller 122 of the parcel pod 104 may open the hatch 174. In such examples, the parcel pod 104 can include means for identifying a package stored in the parcel pod 104. For example, the means for identifying the package can include a barcode scanner, a quick response (QR) code scanner, a computer vision system, etc., and/or a combination thereof. The parcel pod 104 can include means for lifting the package up and/or through the hatch 174. For example, the means for lifting the package can include an elevatable platform, a liftable surface, a hoist, etc., and/or a combination thereof. By opening the hatch 174, the transit controller 122 of the parcel pod 104 may facilitate an aerial vehicle to fly to the parcel pod 104 and take possession of the package as described below in connection with FIG. 18A.

The parcel pod 104 of FIGS. 1J-1K includes the second movement system 152 of FIGS. 1F-1I to control movement of the parcel pod 104 when not coupled to the transit carrier 100 of FIGS. 1A-1B. The second movement system 152 is described below in connection with FIGS. 8A-8F and 9A-9J. For example, the second movement system 152 can direct the parcel pod 104 to move and/or otherwise climb on top of the transit carrier 100, 135 to couple to the transit carrier 100, 135, etc.

The parcel pod 104 of FIGS. 1J-1K includes the transit controller 122 of FIGS. 1A-1E to obtain sensor measurements from example sensor systems 176, 178. The sensor systems 176, 178 can correspond to the sensor systems 128, 130, 132, 134 of FIGS. 1A-1E. The sensor systems 176, 178 of FIGS. 1J-1K include a first example sensor system 176 on the front surface 160 and a second example sensor system 178 on the rear surface 162. Alternatively, the parcel pod 104 may include fewer or more sensor systems 176, 178. For example, the parcel pod 104 may include one or more sensor systems 176, 178 on the front surface 160, the rear surface 162, the first side surface 164, the second side surface 166, the top surface 168, etc. Alternatively, one or both sensor systems 176, 178 may be in a different location or position than depicted in FIGS. 1J-1K.

The parcel pod 104 of FIGS. 1J-1K includes the switching unit 120 of FIGS. 1A-1E and the transit controller 122 to obtain commands, instructions, etc., from an external computing system and translate the obtained commands, instructions, etc., into operations (e.g., movement operations, transportation operations, etc.) of the parcel pod 104. In some examples, the transit controller 122 obtains a command to move the parcel pod 104 to a specified location using GPS. In some examples, the transit controller 122 obtains an instruction to couple with the transit carrier 100, 135 of FIGS. 1A-1E. In some examples, the transit controller 122 obtains a command to couple the parcel pod 104 to (1) an aerial vehicle by instructing the second movement system 152 to move to a position to couple to the aerial vehicle and/or (2) another parcel pod 104 and/or the passenger pod 102 of FIGS. 1F-1G by instructing the switching unit 120 to activate and/or otherwise enable one or both of the first and second magnetic couplers 170, 172.

Figure 1L:
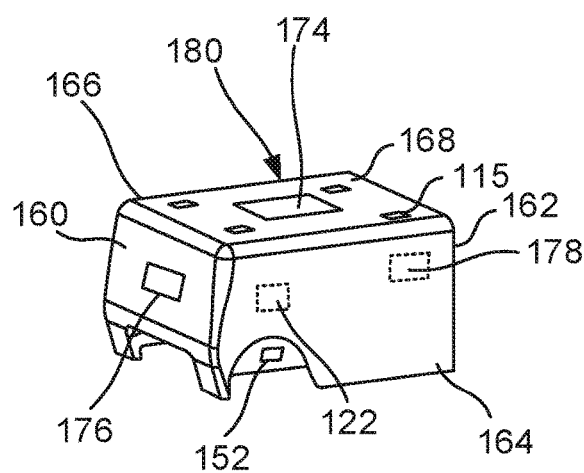
FIGS. 1L-1M depict isometric views of another example implementation of a parcel pod to implement the examples disclosed herein.
Figure 1M:
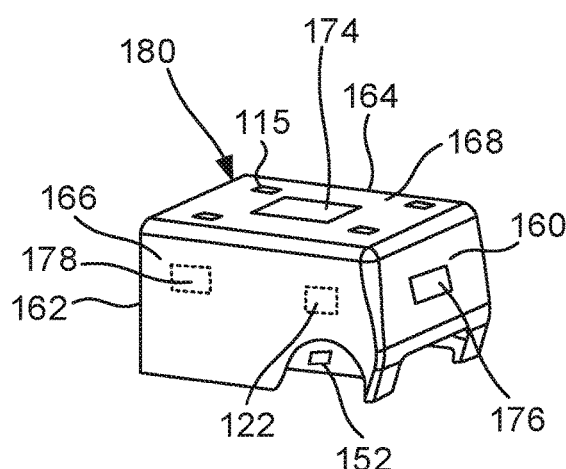

FIGS. 1L-1M depict isometric views of an example transit pod 180, which is another example implementation of the transit pod 104 of FIGS. 1J-1K. Unless specified otherwise, the operation and/or structure of the transit pod 180 of FIGS. 1L-1M are the same as the operation and/or structure of the transit pod 104 of FIGS. 1J-1K. FIG. 1L is an isometric front view of a first side of the transit pod 180. FIG. 1M is an isometric front view of the second side of the transit pod 180, where the second side is opposite the first side. The transit pod 180 of FIGS. 1L-1M is an autonomous transit pod. The transit pod 180 of FIGS. 1L-1M is referred to herein as a parcel pod. The parcel pod 180 of FIGS. 1L-1M does not include the switching unit 120 and the magnetic couplers 170, 172 of FIGS. 1J-1K.

Figure 2A:
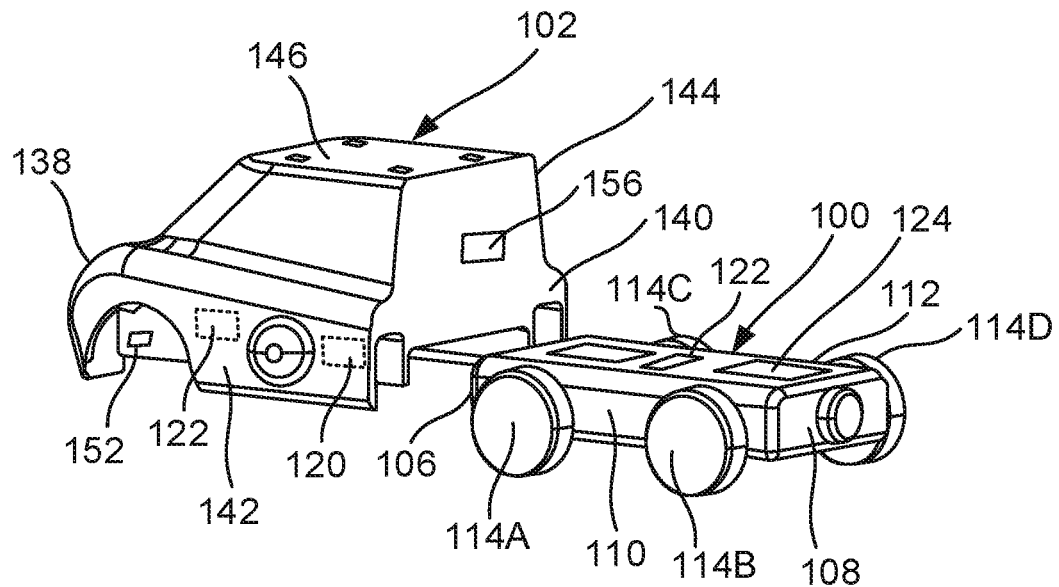
FIGS. 2A-2B depict first isometric views of the transit carrier of FIGS. 1A-1B coupling to the passenger pod of FIGS. 1F-1G to form an example land vehicle.
Figure 2B:
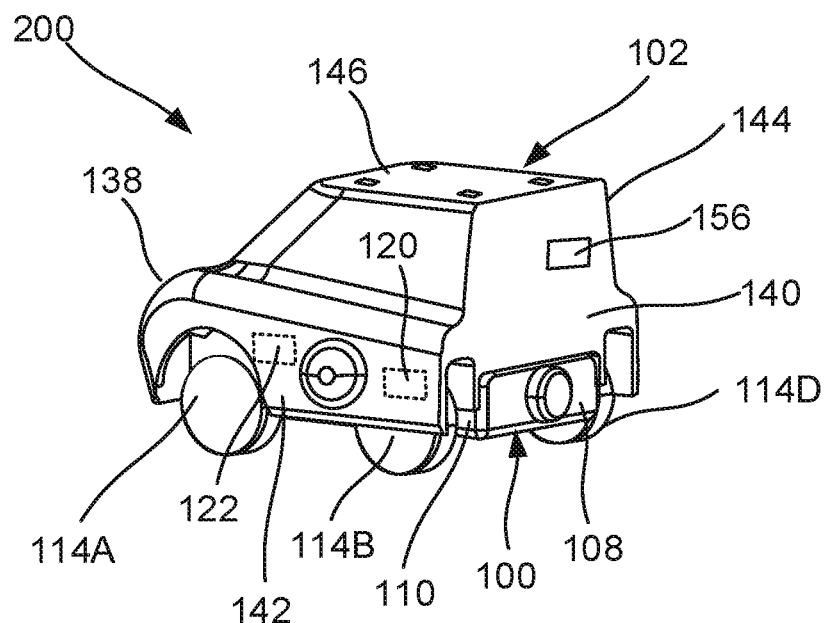
Figure 3A:
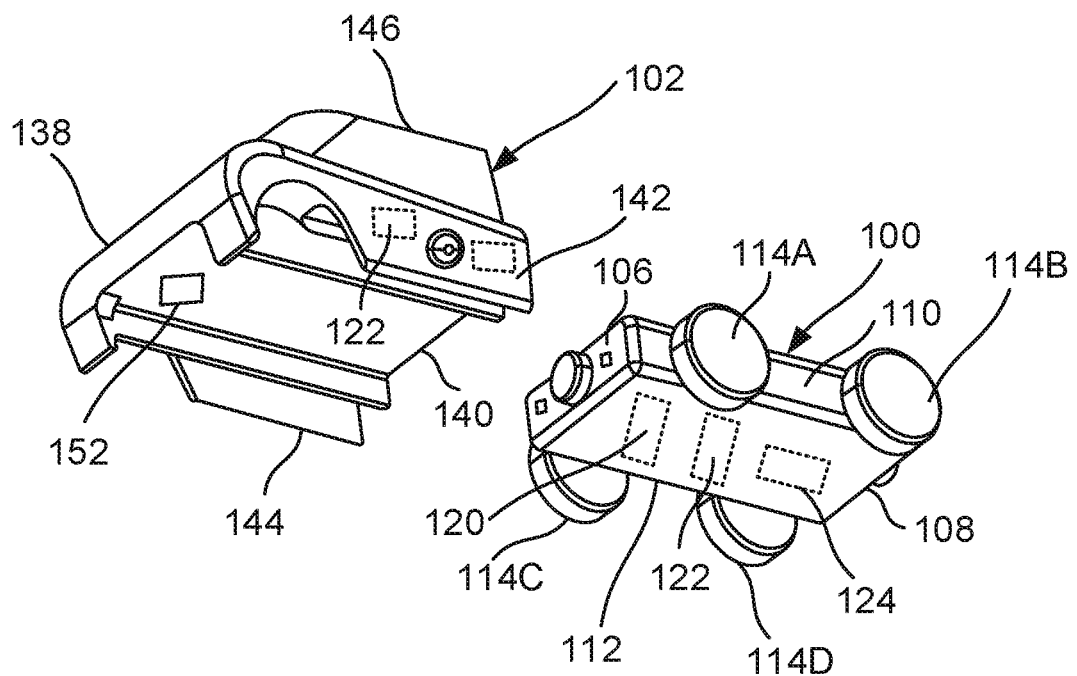
FIGS. 3A-3B depict second isometric views of the transit carrier of FIGS. 1A-1B coupling to the passenger pod of FIGS. 1F-1G to form the example land vehicle of FIG. 2B.
Figure 3B:
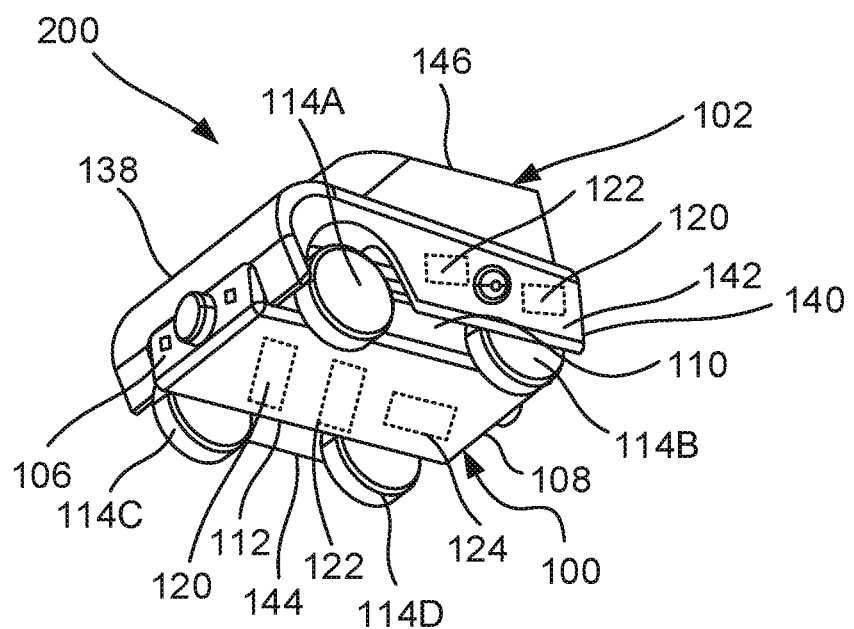
Figure 4A:
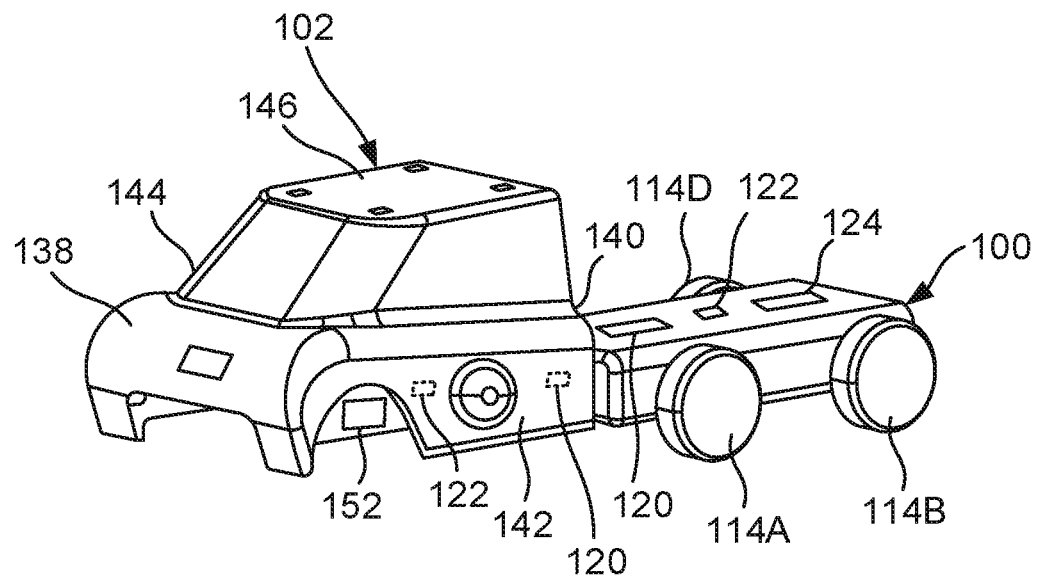
FIGS. 4A-4B depict third isometric views of the transit carrier of FIGS. 1A-1B coupling to the passenger pod of FIGS. 1F-1G to form the example land vehicle of FIG. 2B.
Figure 4B:
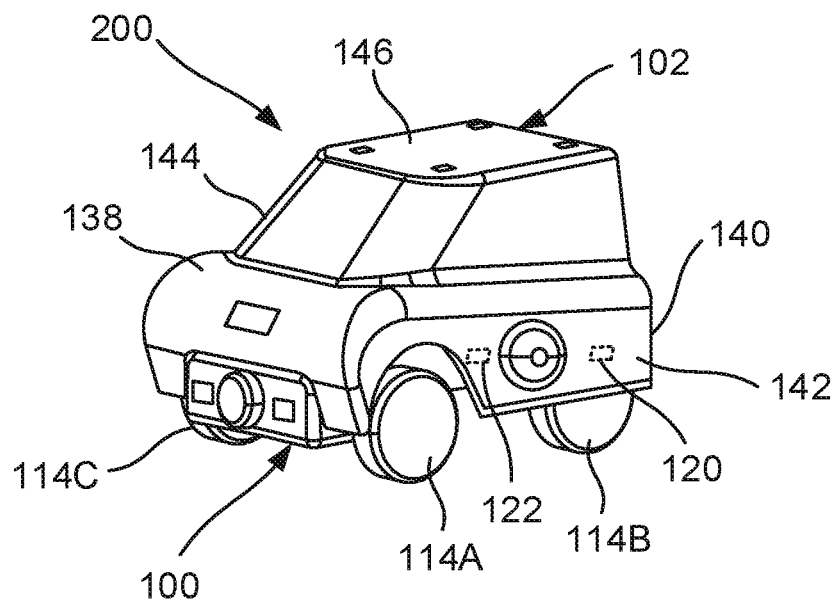

FIGS. 2A, 3A, and 4A depict isometric views of the transit carrier 100 of FIGS. 1A-1B separated from the passenger pod 104 of FIGS. 1F-1G. FIG. 2A is a rear isometric view, FIG. 3A is a bottom isometric view, and FIG. 4A is a front isometric view. FIGS. 2B, 3B, and 4B depict isometric views of a first example land vehicle 200 that includes the transit carrier 100 of FIGS. 1A-1B coupled to the passenger pod 102 of FIGS. 1F-1G. FIG. 2B is a rear isometric view, FIG. 3B is a bottom isometric view, and FIG. 4B is a front isometric view.

In some examples, FIG. 2A depicts the transit carrier 100 after decoupling from the passenger pod 102 and moving away from the passenger pod 102 after the decoupling. For example, the transit controller 122 of the passenger pod 102 may obtain a first request (e.g., from an external computing system) to decouple from the transit carrier 100 and the transit controller 122 of the transit carrier 100 may obtain a second request (e.g., from the external computing system) to move to a different location from the passenger pod 102 after the decoupling. In such examples, the transit controller 122 of the passenger pod 102 can direct the second movement systems 152 of the passenger pod 102 to decouple and move away from the transit carrier 100. The transit controller 122 of the transit carrier 100 may direct the powertrain 124 to engage the wheels 114A-D to move the transit carrier 100 to a different location.

In some examples, FIG. 2A depicts the transit carrier 100 moving towards the passenger pod 102 to couple to the passenger pod 102. For example, the transit controller 122 of the transit carrier 100 may obtain a first request (e.g., from an external computing system) to move from a first location to a second location of the passenger pod 102 and the transit controller 122 of the passenger pod 102 may obtain a second request (e.g., from the external computing system) to couple to the transit carrier 100 in response to the transit carrier 100 moving to the second location. In such examples, the transit controller 122 of the passenger pod 102 can direct the second movement systems 152 of the passenger pod 102 to move towards the transit carrier 100 and couple to the transit carrier 100. The transit controller 122 of the transit carrier 100 may direct the powertrain 124 to engage the wheels 114A-D to move the transit carrier 100 towards the passenger pod 102 to couple to the passenger pod 102.

Figure 4C:
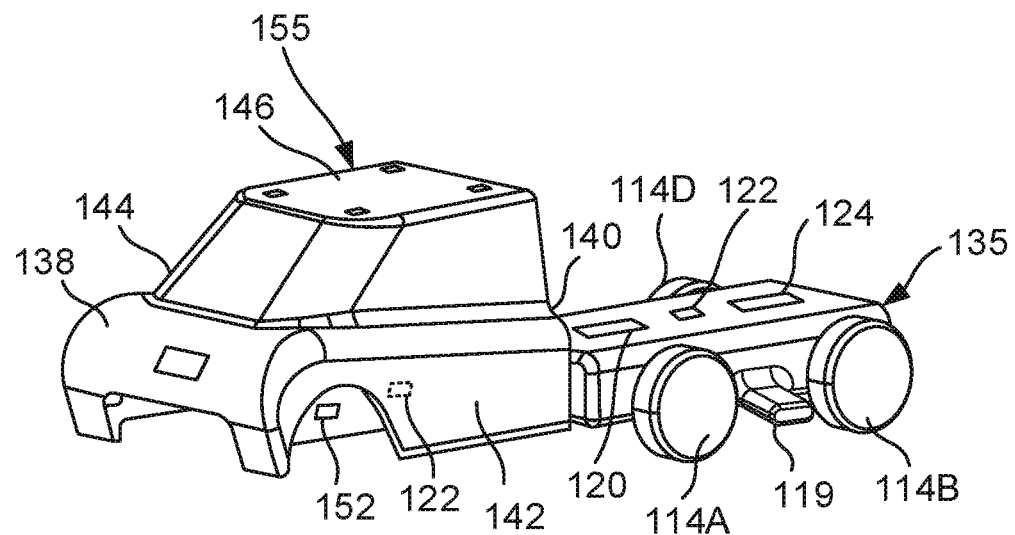
FIGS. 4C-4D depict isometric views of the transit carrier of FIGS. 1C-1E coupling to the passenger pod of FIGS. 1H-1I to form an example land vehicle.
Figure 4D:
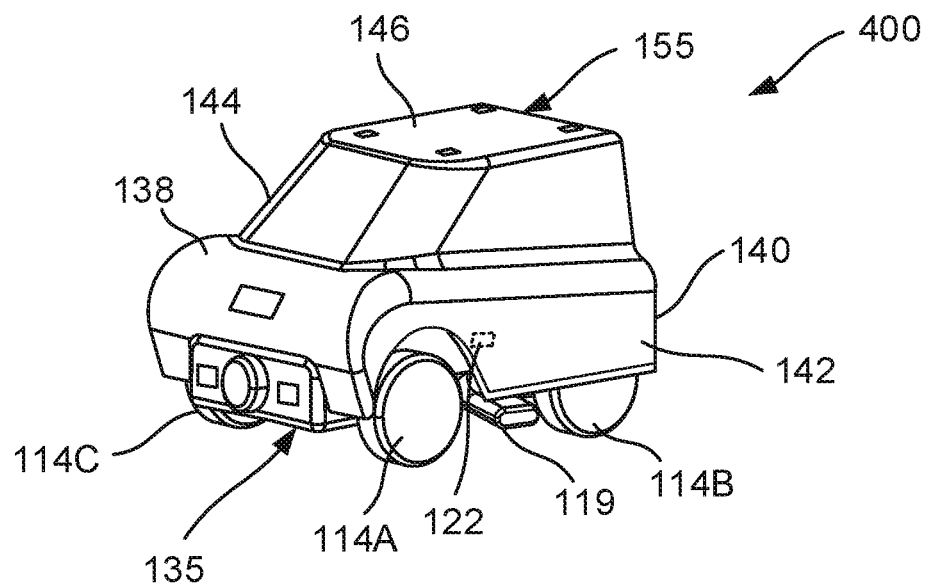

FIG. 4C depicts an isometric view of the transit carrier 135 of FIGS. 1C-1E separated from the passenger pod 155 of FIGS. 1H-1I. FIG. 4D depicts an isometric view of a second example land vehicle 400 that includes the transit carrier 135 of FIGS. 1C-1E coupled to the passenger pod 155 of FIGS. 1H-1I.

Figure 5A:
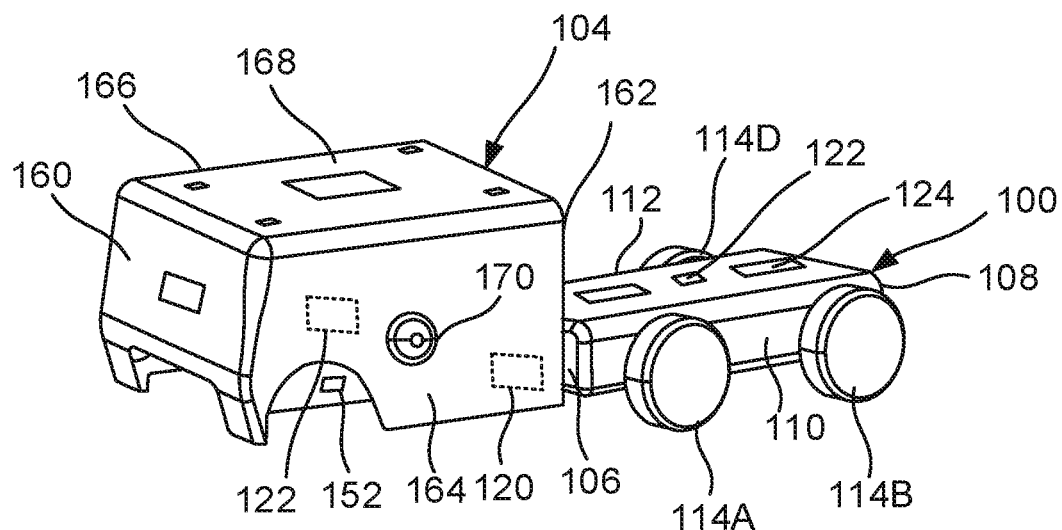
FIGS. 5A-5B depict isometric views of the transit carrier of FIGS. 1A-1B coupling to the parcel pod of FIGS. 1J-1K to form an example land vehicle.
Figure 5B:
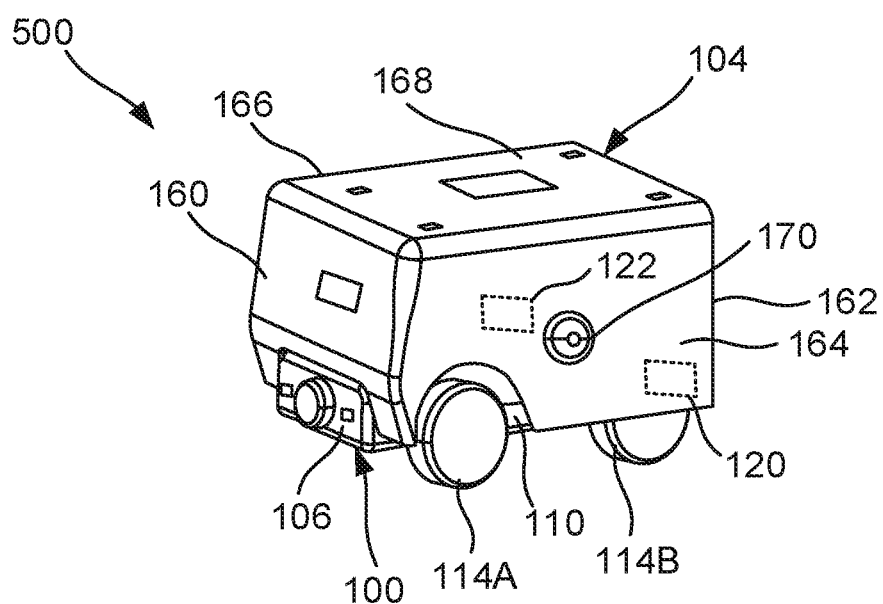

FIG. 5A depicts an isometric view of the transit carrier 100 of FIGS. 1A-1B separated from the parcel pod 104 of FIGS. 1J-1K. FIG. 5B depicts an isometric view of a third example land vehicle 500 that includes the transit carrier 100 of FIGS. 1A-1B coupled to the parcel pod 104 of FIGS. 1J-1K.

In some examples, FIG. 5A depicts the transit carrier 100 after decoupling from the parcel pod 104 and moving away from the parcel pod 104 after the decoupling. For example, the transit controller 122 of the parcel pod 104 may obtain a first request (e.g., from an external computing system) to decouple from the transit carrier 100 and the transit controller 122 of the transit carrier 100 may obtain a second request (e.g., from the external computing system) to move to a different location from the parcel pod 104 after the decoupling. In such examples, the transit controller 122 of the parcel pod 104 can direct the second movement systems 152 of the parcel pod 104 to decouple and move away from the transit carrier 100. The transit controller 122 of the transit carrier 100 may direct the powertrain 124 to engage the wheels 114A-D to move the transit carrier 100 to a different location.

In some examples, FIG. 5A depicts the transit carrier 100 moving towards the parcel pod 104 to couple to the parcel pod 104. For example, the transit controller 122 of the transit carrier 100 may obtain a first request (e.g., from an external computing system) to move from a first location to a second location of the parcel pod 104 and the transit controller 122 of the parcel pod 104 may obtain a second request (e.g., from the external computing system) to couple to the transit carrier 100 in response to the transit carrier 100 moving to the second location. In such examples, the transit controller 122 of the parcel pod 104 can direct the second movement systems 152 of the parcel pod 104 to move towards the transit carrier 100 and couple to the transit carrier 100. The transit controller 122 of the transit carrier 100 may direct the powertrain 124 to engage the wheels 114A-D to move the transit carrier 100 towards the parcel pod 104 to couple to the parcel pod 104.

Figure 5C:
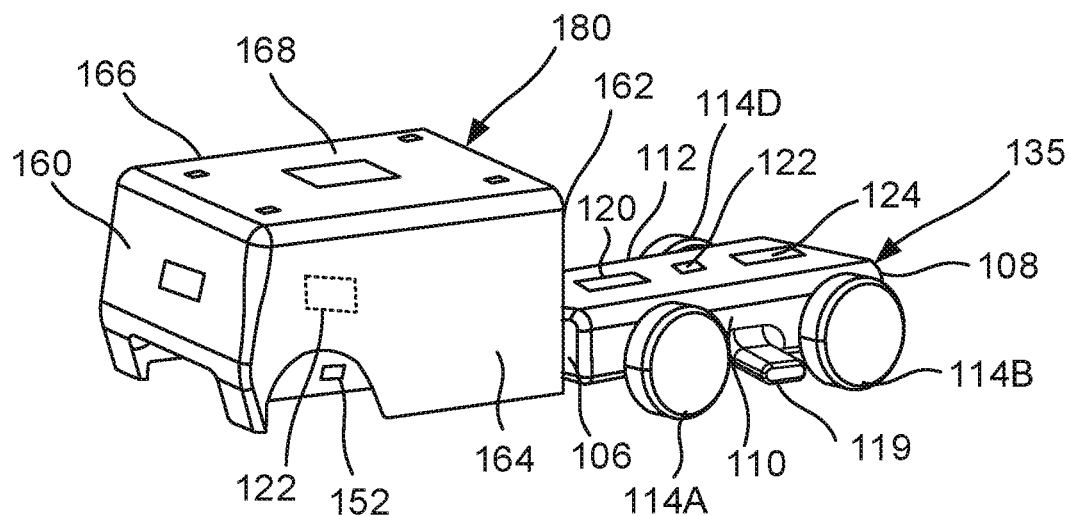
FIGS. 5C-5D depict isometric views of the transit carrier of FIGS. 1C-1E coupling to the parcel pod of FIGS. 1L-1M to form an example land vehicle.
Figure 5D:
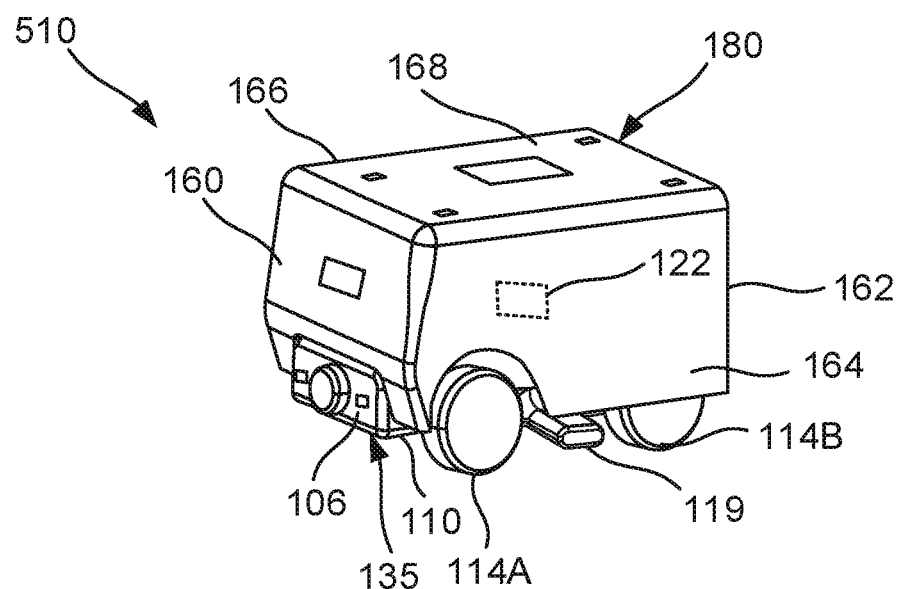

FIG. 5C depicts an isometric view of the transit carrier 135 of FIGS. 1C-1E separated from the parcel pod 180 of FIGS. 1L-1M. FIG. 5D depicts an isometric view of a fourth example land vehicle 510 that includes the transit carrier 135 of FIGS. 1C-1E coupled to the parcel pod 180 of FIGS. 1L-1M.

Figure 6A:
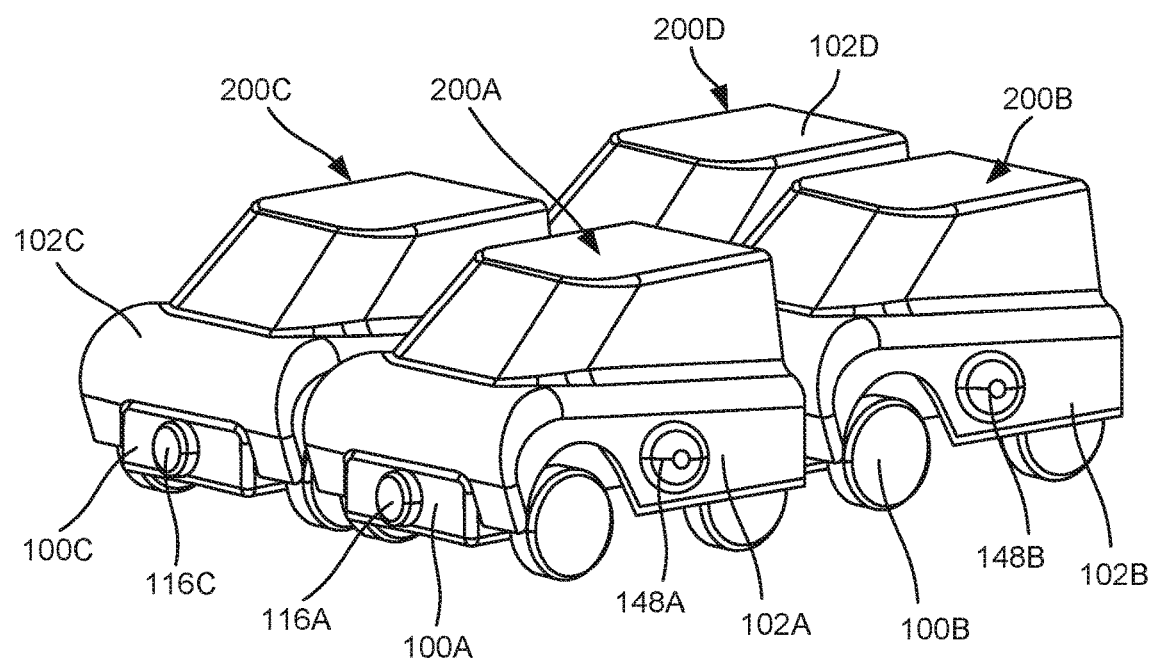
FIGS. 6A-6B depict isometric views of four example land vehicles coupled together.
Figure 6B:
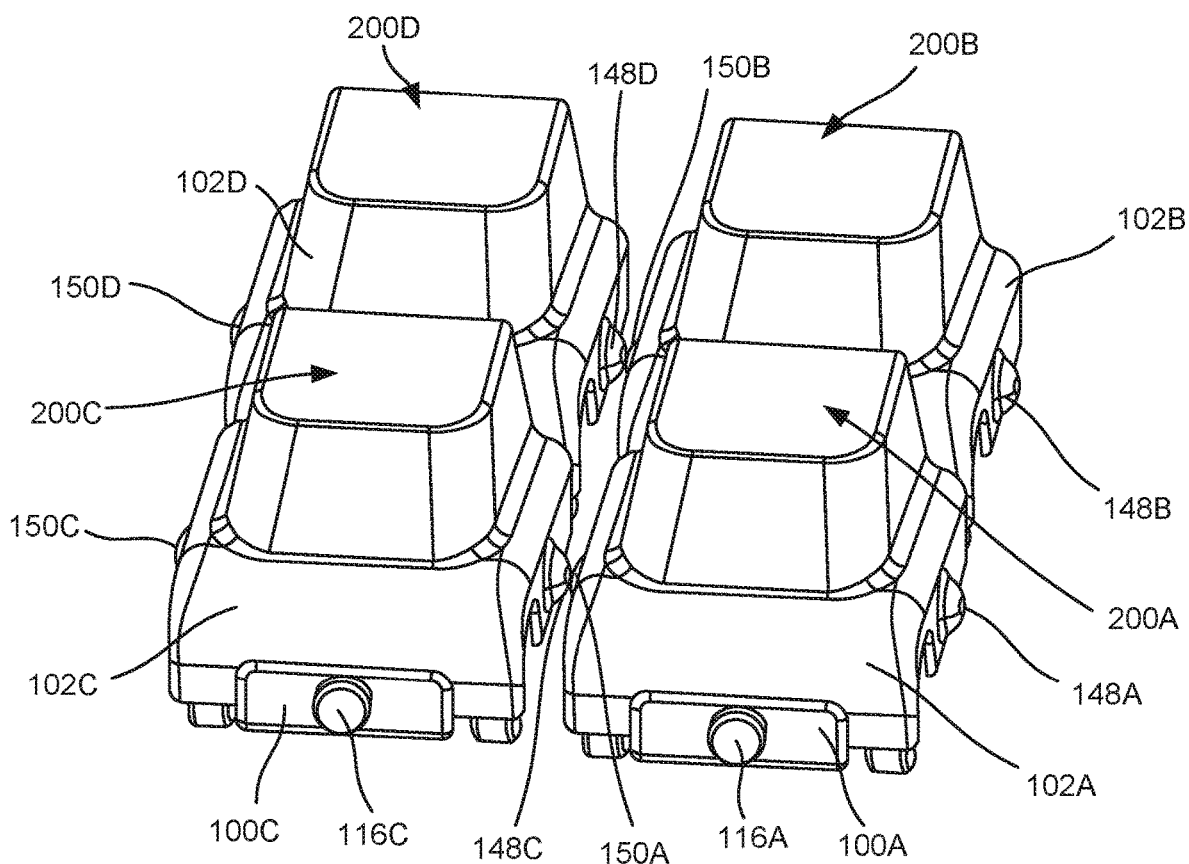

FIG. 6A depicts a front isometric view of four example vehicles (e.g., land vehicles) 200A-D coupled together. FIG. 6B depicts a top isometric view of the four land vehicles 200A-D. Each of the four land vehicles 200A-D can correspond to the first land vehicle 200 of FIGS. 2B, 3B, and 4B. For example, each of the land vehicles 200A-D can include the transit carrier 100 of FIGS. 1A-1B and the passenger pod 102 of FIGS. 1F-1G. In FIGS. 6A-6B, the four land vehicles 200A, 200B, 200C, 200D include a first land vehicle 200A, a second land vehicle 200B, a third land vehicle 200C, and a fourth land vehicle 200D. For example, the first land vehicle 200A includes a first transit carrier 100A coupled to a first passenger pod 102A, the second land vehicle 200B includes a second transit carrier 100B coupled to a second passenger pod 102B, the third land vehicle 200C includes a third transit carrier 100C coupled to a third passenger pod 102C, and the fourth land vehicle 200D includes a fourth transit carrier 100D coupled to a fourth passenger pod 102D.

In the illustrated example of FIGS. 6A-6B, linear connections (e.g., a straight-line connection) between ones of the land vehicles 200A-D are depicted. For example, in FIGS. 6A-6B, the second magnetic coupler 118 of the first transit carrier 100A is coupled to the first magnetic coupler 116 of the second transit carrier 100B. In FIGS. 6A-6B, the second magnetic coupler 118 of the third transit carrier 100C is coupled to the first magnetic coupler 116 of the fourth transit carrier 100D. Alternatively, one or more of the passenger pods 102A-D of FIGS. 6A-6B may be replaced with the parcel pod 104 of FIGS. 1J-1K.

In the illustrated example of FIGS. 6A-6B, side-by-side connections between ones of the land vehicles 200A-D are depicted. For example, in FIGS. 6A-6B, the second magnetic coupler 150A of the first passenger pod 102A is coupled to the first magnetic coupler 148C of the third passenger pod 102C. In FIGS. 6A-6B, the second magnetic coupler 150B of the second passenger pod 102B is coupled to the first magnetic coupler 148D of the fourth passenger pod 102D.

Figure 6C:
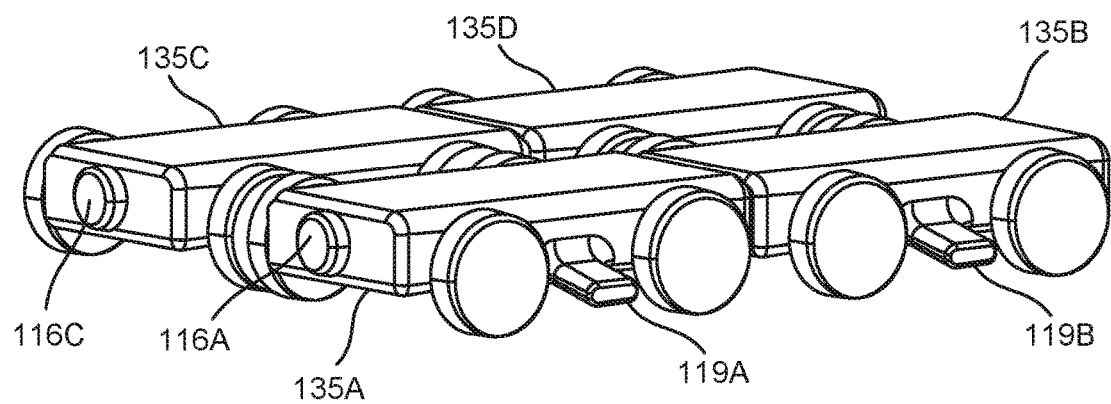
FIG. 6C depicts an isometric view of four of the transit carrier of FIGS. 1C-1E coupled together.
Figure 6D:
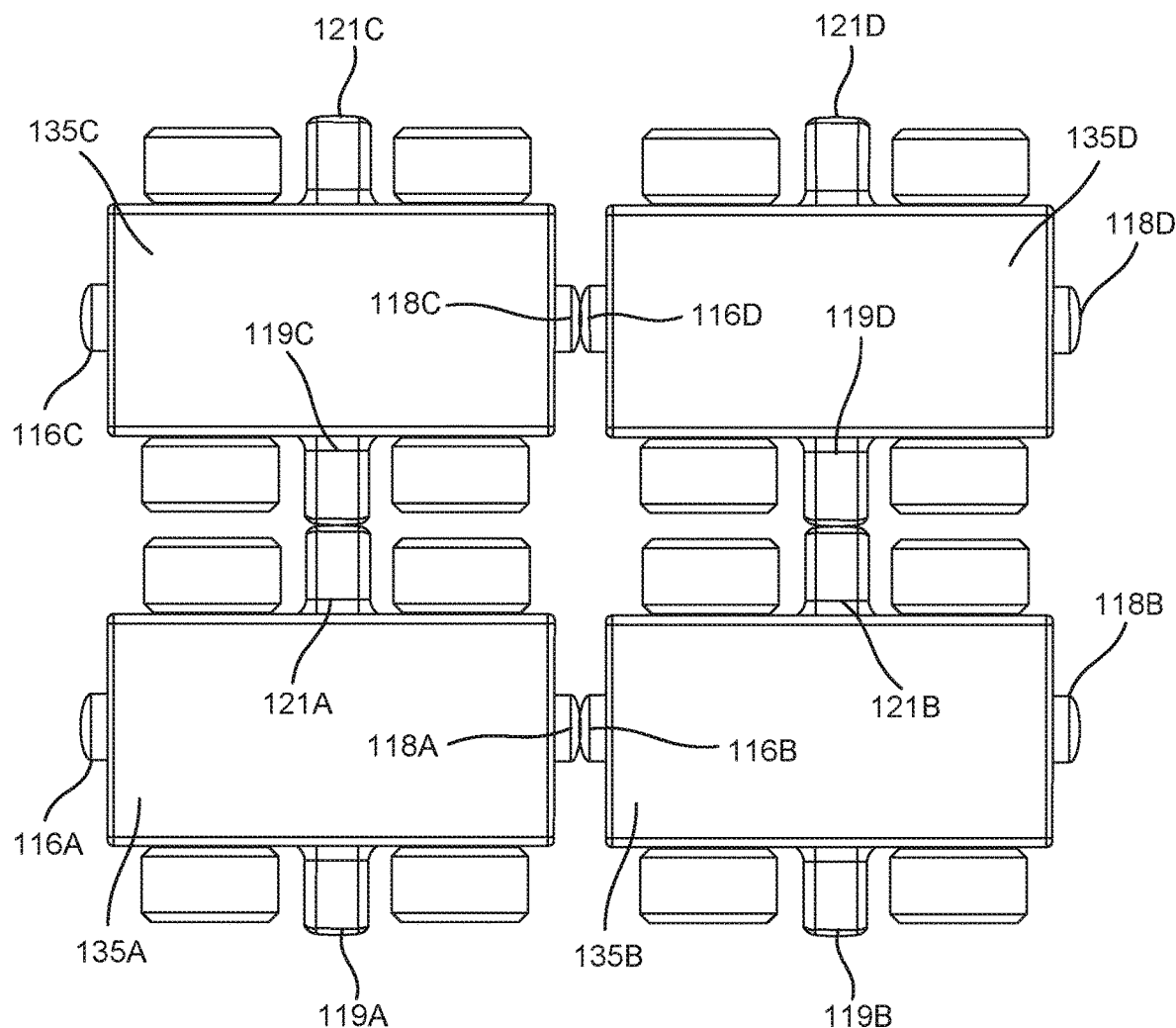
FIG. 6D depicts a top view of four of the transit carrier of FIGS. 1C-1E coupled together.

FIG. 6C depicts an isometric view of four instances 135A-D of the transit carrier 135 of FIGS. 1C-1E coupled together. FIG. 6D depicts a top view of the four instances 135A-D of the transit carrier 135 of FIGS. 1C-1E. In FIGS. 6C-6D, the four instances 135A-D include a first transit carrier 135A, a second transit carrier 135B, a third transit carrier 135C, and a fourth transit carrier 135D.

In the illustrated example of FIGS. 6C-6D, linear connections (e.g., a straight-line connection) between ones of the transit carriers 135A-D are depicted. For example, in FIG. 6D, the second magnetic coupler 118A of the first transit carrier 135A is coupled to the first magnetic coupler 116B of the second transit carrier 135B. In FIG. 6D, the second magnetic coupler 118C of the third transit carrier 135C is coupled to the first magnetic coupler 116D of the fourth transit carrier 135D.

In the illustrated example of FIGS. 6C-6D, side-by-side connections between ones of the transit carriers 135A-D are depicted. For example, in FIG. 6D, the fourth magnetic coupler 121A of the first transit carrier 135A is coupled to the third magnetic coupler 119C of the third transit carrier 135C. In FIG. 6D, the fourth magnetic coupler 121B of the second transit carrier 135B is coupled to the third magnetic coupler 119D of the fourth transit carrier 135D.

Figure 6E:
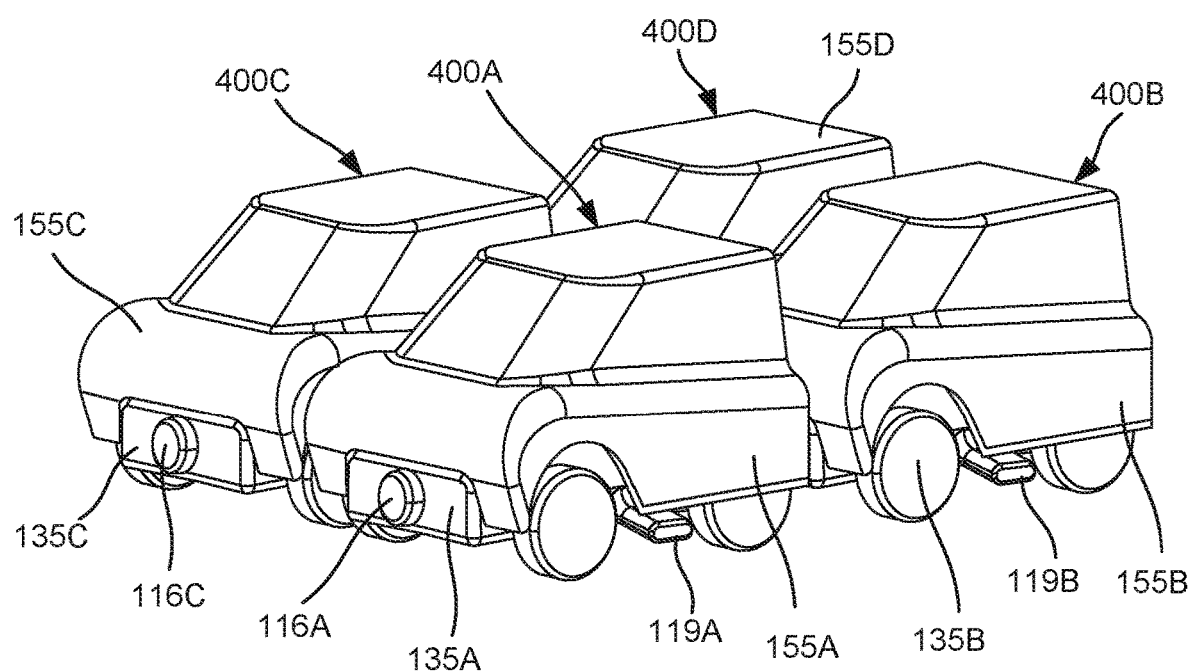
FIG. 6E depicts an isometric view of four example land vehicles coupled together.
Figure 6F:
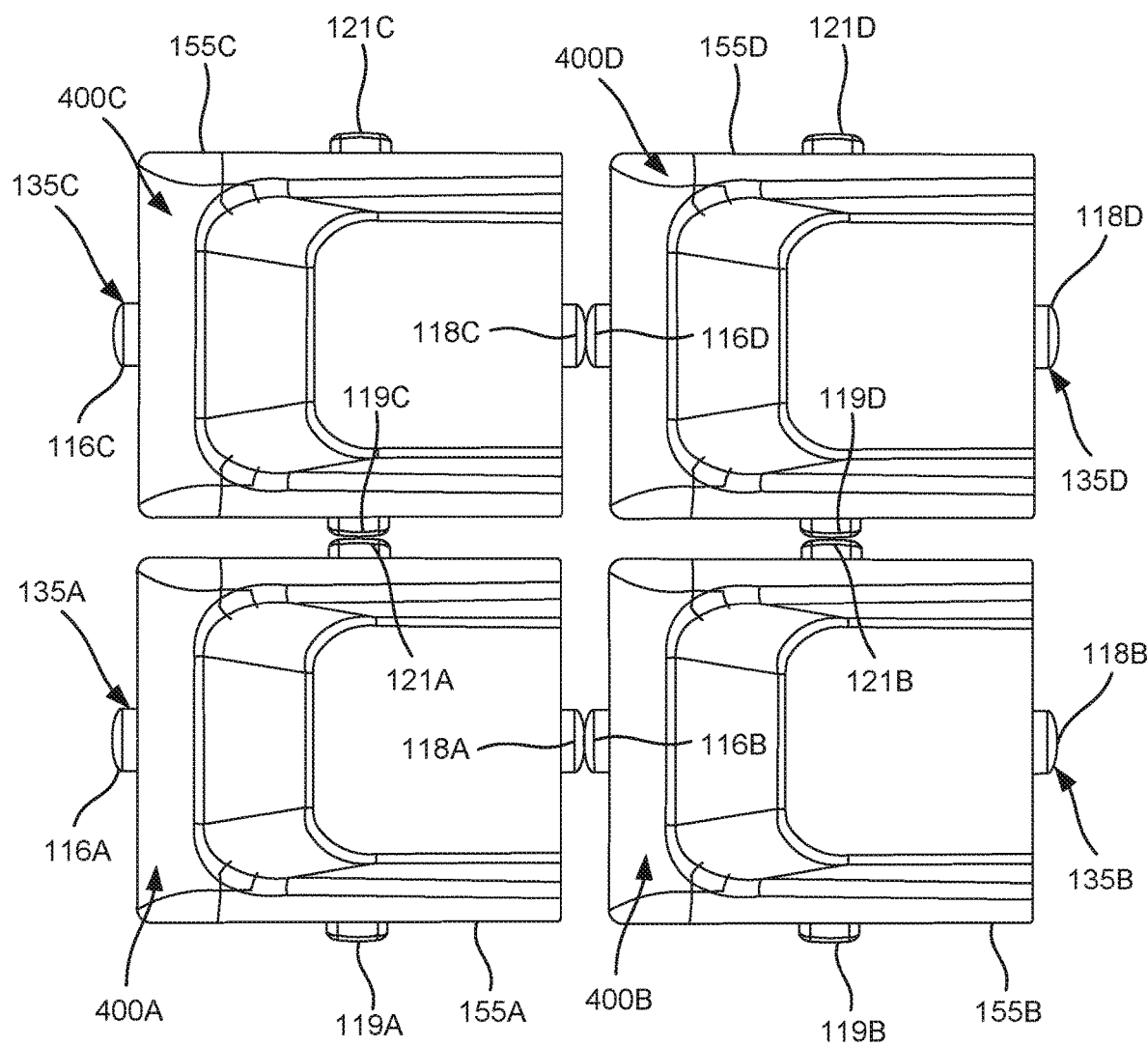
FIG. 6F depicts a top view of four example land vehicles coupled together.

FIG. 6E depicts an isometric view of four instances 400A-D of the second land vehicle 400 of FIG. 4D coupled together. FIG. 6F depicts a top view of the four instances 400A-D of the second land vehicle 400 of FIG. 4D coupled together. Each of the four land vehicles 400A-D depicted in FIG. 6E can correspond to the second land vehicle 400 of FIG. 4D. For example, each of the land vehicles 400A-D of FIG. 6E can include the transit carrier 135 of FIGS. 1C-1E and the passenger pod 155 of FIGS. 1H-1I. In FIG. 6E, the four land vehicles 400A, 400B, 400C, 400D include a first land vehicle 400A, a second land vehicle 400B, a third land vehicle 400C, and a fourth land vehicle 400D. For example, the first land vehicle 400A includes a first transit carrier 135A coupled to a first passenger pod 155A, the second land vehicle 400B includes a second transit carrier 135B coupled to a second passenger pod 155B, the third land vehicle 400C includes a third transit carrier 135C coupled to a third passenger pod 155C, and the fourth land vehicle 400D includes a fourth transit carrier 135D coupled to a fourth passenger pod 155D.

In the illustrated example of FIGS. 6E-6F, linear connections (e.g., a straight-line connection) between ones of the land vehicles 400A-D are depicted. For example, in FIG. 6F, the second magnetic coupler 118A of the first transit carrier 135A is coupled to the first magnetic coupler 116B of the second transit carrier 135B. In FIG. 6F, the second magnetic coupler 118C of the third transit carrier 135C is coupled to the first magnetic coupler 116D of the fourth transit carrier 135D.

In the illustrated example of FIGS. 6E-6F, side-by-side connections between ones of the land vehicles 400A-D are depicted. For example, in FIG. 6F, the fourth magnetic coupler 121A of the first transit carrier 135A is coupled to the third magnetic coupler 119C of the third transit carrier 135C. In FIG. 6F, the fourth magnetic coupler 121B of the second transit carrier 135B is coupled to the third magnetic coupler 119D of the fourth transit carrier 135D.

Figure 7A:
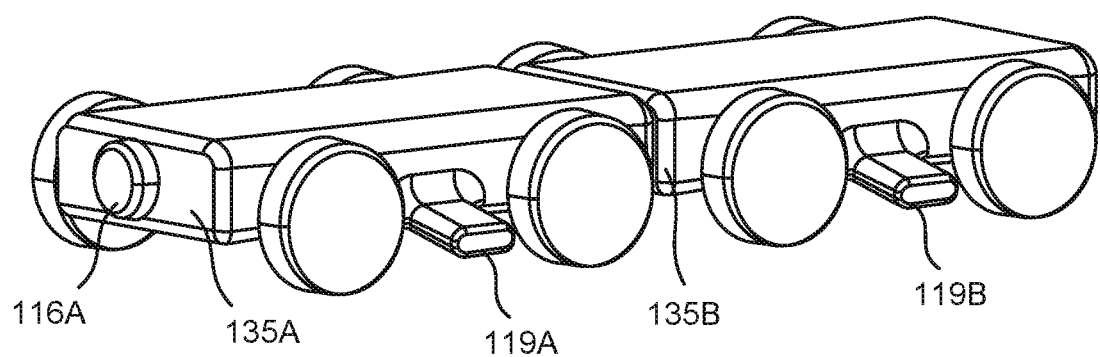
FIG. 7A depicts two of the transit carrier of FIGS. 1C-1E coupled together.

FIG. 7A depicts two instances 135A-B of the transit carrier 135 of FIGS. 1C-1E coupled together. In FIG. 7A, the two instances 135A-B include a first transit carrier 135A and a second transit carrier 135B. In FIG. 7A, the transit carriers 135A-B are coupled together because the second magnetic coupler 118A of the first transit carrier 135A is coupled to the first magnetic coupler 116B of the second transit carrier 135B as illustrated in FIG. 6D.

Figure 7B:
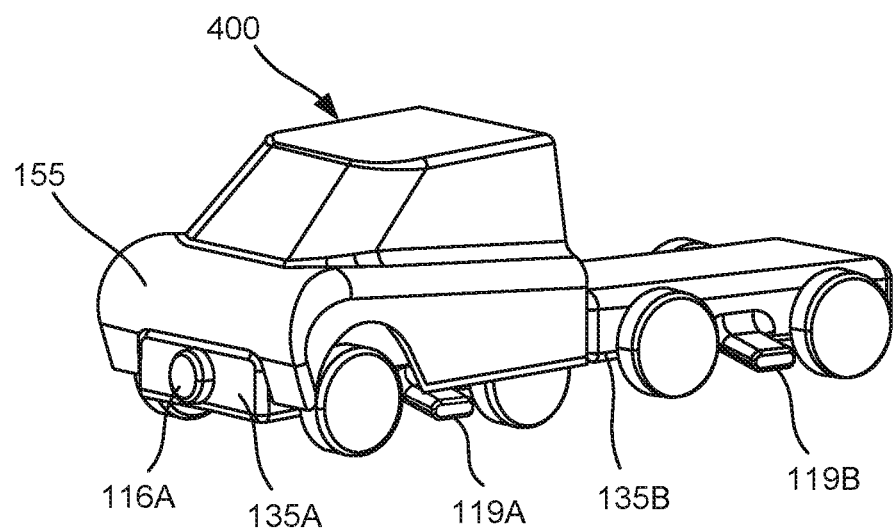
FIG. 7B depicts an example land vehicle coupled to the transit carrier of FIGS. 1C-1E.

FIG. 7B depicts the second land vehicle 400 of FIG. 4D coupled to the transit carrier 135 of FIGS. 1C-1E. In FIG. 7B, the second land vehicle 400 is coupled to the transit carrier 135 because the second magnetic coupler 118A of the first transit carrier 135A (e.g., of the second land vehicle 400) is coupled to the first magnetic coupler 116B of the second transit carrier 135B as illustrated in FIG. 6D.

Figure 7C:
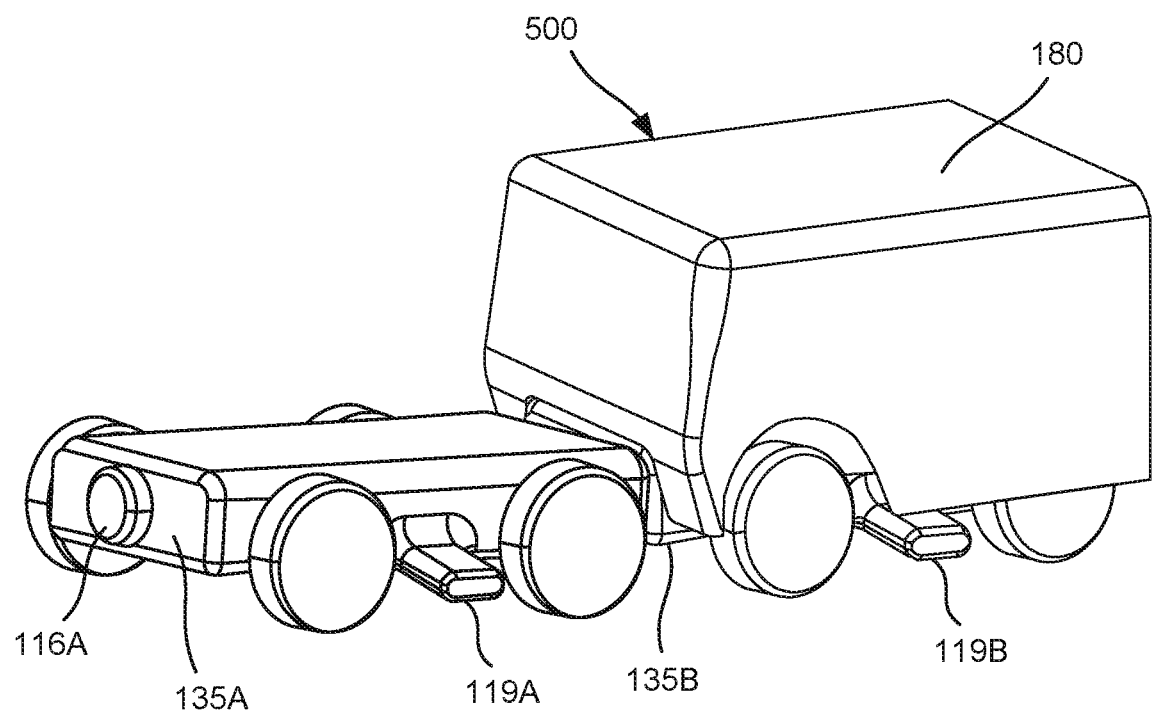
FIG. 7C depicts the transit carrier of FIGS. 1C-1E coupled to an example land vehicle.

FIG. 7C depicts the transit carrier 135 of FIGS. 1C-1E coupled to the third land vehicle 500 of FIG. 5B. In FIG. 7C, the transit carrier 135 is coupled to the third land vehicle 500 because the second magnetic coupler 118A of the first transit carrier 135A is coupled to the first magnetic coupler 116B of the second transit carrier 135B (e.g., of the third land vehicle 500) as illustrated in FIG. 6D.

Figure 7D:
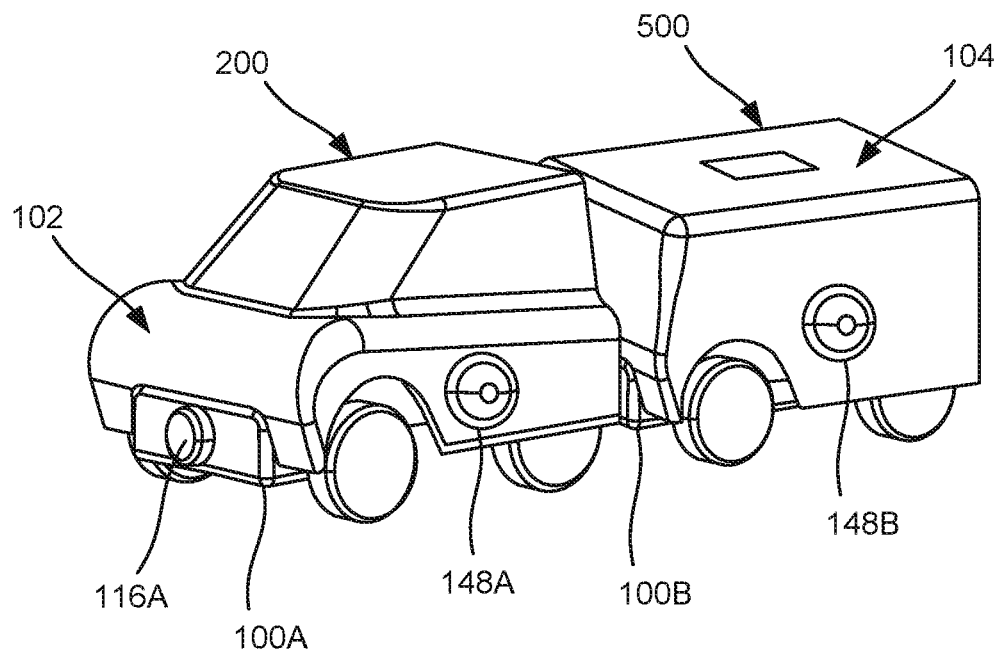
FIGS. 7D-7E depict two example land vehicles coupled together.

FIG. 7D depicts the first land vehicle 200 of FIGS. 2B, 3B, and 4B coupled to the third land vehicle 500 of FIG. 5B. In FIG. 7D, the first land vehicle 200 and the third land vehicle 500 are coupled together because the second magnetic coupler 118A of the first land vehicle 200 is coupled to the first magnetic coupler 116B of the third land vehicle 500.

Figure 7E:
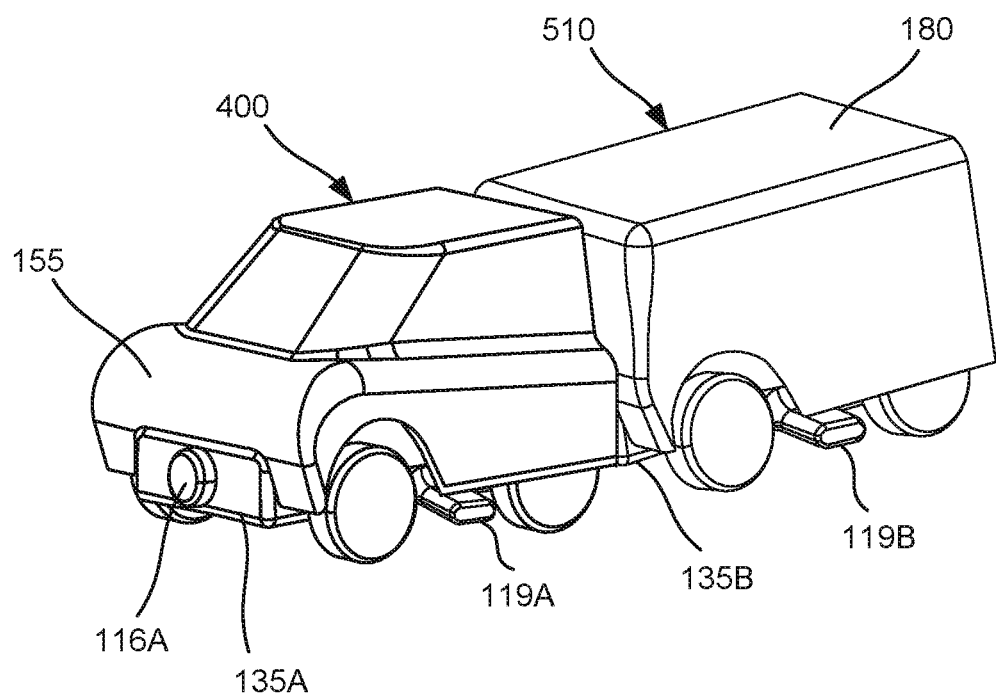

FIG. 7E depicts the second land vehicle 400 of FIG. 4D coupled to the fourth land vehicle 510 of FIG. 5D. In FIG. 7E, the second land vehicle 400 and the fourth land vehicle 510 are coupled together because the second magnetic coupler 118A of the second land vehicle 400 is coupled to the first magnetic coupler 116B of the fourth land vehicle 510.

Figure 8D:
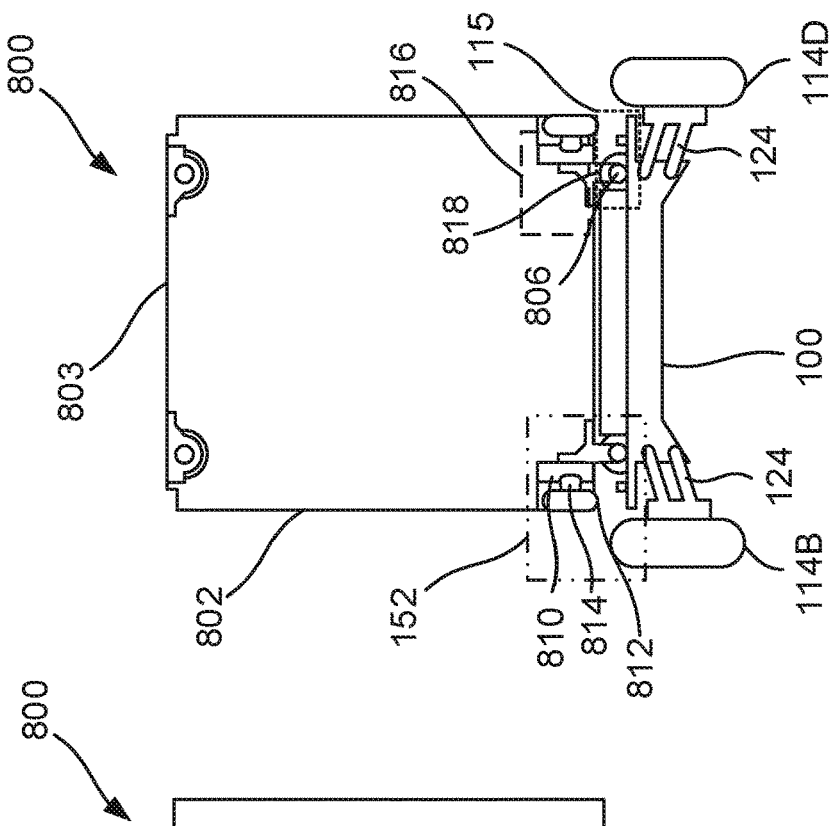
FIGS. 8C-8D depict the example land vehicle of FIGS. 8A-8B in a post-coupling stage.

FIG. 8A depicts a side view of an example land vehicle 800 in a pre-coupling stage. FIG. 8B depicts a rear view of the land vehicle 800 of FIG. 8A in the pre-coupling stage. The land vehicle 800 is illustrated in a generalized manner to improve clarity when describing example coupling operations associated with the land vehicle 800. For example, the land vehicle 800 can correspond to the first land vehicle 200 of FIGS. 2B, 3B, and 4B, the second land vehicle 400 of FIG. 4D, the third land vehicle 500 of FIG. 5B, or the fourth land vehicle 510 of FIG. 5D. In such examples, any description (e.g., functional and/or structural description) in connection with FIGS. 8A-8F is applicable to the first land vehicle 200 of FIGS. 2B, 3B, and 4B, the second land vehicle 400 of FIG. 4D, the third land vehicle 500 of FIG. 5B, or the fourth land vehicle 510 of FIG. 5D.

In the illustrated example of FIGS. 8A-8B, the land vehicle 800 after coupling includes the transit carrier 100 of FIGS. 1A-1B and an example transit pod 802. Alternatively, the land vehicle 800 of FIG. 8A may include the transit carrier 135 of FIGS. 1C-1E. The transit pod 802 is illustrated in a generalized manner to improve clarity when describing example coupling operations associated with the transit pod 802. For example, the transit pod 802 can correspond to the passenger pod 102 of FIGS. 1F-1G or FIGS. 1H-1I or the parcel pod 104 of FIGS. 1J-1K or FIGS. 1L-1M. In such examples, any description (e.g., functional and/or structural description) in connection with FIGS. 8A-8F is applicable is to the passenger pod 102 of FIGS. 1F-1G or FIGS. 1H-1I or the parcel pod 104 of FIGS. 1J-1K or FIGS. 1L-1M.

In the illustrated example of FIGS. 8A-8B, the land vehicle 800 is in a pre-coupling stage. For example, the transit pod 802 and the transit carrier 100 are in a pre-latched or pre-coupled position, where the transit pod 802 and the transit carrier 100 are not coupled. The transit pod 802 includes the first couplers 115 of FIGS. 1A-1M on a top surface of the transit pod 802. In FIGS. 8A-8B, the first couplers 115 include an example groove 804 and an example lug (e.g., a pin lug) 806. For example, the lug 806 can be configured to receive and/or otherwise obtain a pin from couplers associated with a UAV. Alternatively, the first couplers 115 may include a cavity and/or a receptacle to receive a plug or other coupler insertion structure associated with a UAV.

The transit pod 802 includes the second movement systems 152 of FIGS. 1F-1I and/or 1J-1M. The transit pod 802 includes four instances of the second movement systems 152. Alternatively, the transit pod 802 may have fewer or more than four instances of the second movement systems 152. As used herein, the four instances of the second movement systems 152 may in combination be referred to as a transit pod movement system. In FIGS. 8A-8B, the second movement systems 152 includes an example motor 810 and an example wheel (e.g., a mobility wheel) 812. In FIGS. 8A-8B, the motor 810 is a trunnion motor. Alternatively, any other type of motor may be used such as a compressed air (or other gas) motor. In FIGS. 8A-8B, the mobility wheel 812 is in an extended or deployed position. For example, the transit pod 802 can travel at a non-zero speed when the mobility wheel 812 is in the extended position.

In some examples, the second movement systems 152 correspond to and/or otherwise include a powertrain, a power source, and/or the mobility wheel 812. Alternatively, fewer or more than four mobility wheels 812 may be used. For example, the powertrain of the second movement systems 152 may include one or more electric motors, one or more transmissions, one or more drive shafts, one or more differentials, one or more axles, a final drive, etc., to steer and/or otherwise control the four mobility wheels 812 to facilitate movement of the transit pod 802.

In some examples, the power source of the second movement systems 152 includes one or more batteries (e.g., lithium-ion batteries) that provide electrical power to the one or more electric motors of the powertrain of the second movement systems 152 to facilitate movement of the transit pod 802. Alternatively, the power source of the second movement systems 152 may be any other power storage element or device (e.g., a capacitor bank, a chemical or liquid reservoir (e.g., a compressed air tank, a gasoline tank, a hydrogen tank, etc.). In some examples, the power source of the second movement systems 152 can provide power to the switching unit 120 of the passenger pod 102 to change the polarity of the electromagnet coil(s) of one or more of the first and second magnetic couplers 148, 150 of the passenger pod 102. In some examples, the power source of the second movement systems 152 can provide power to the switching unit 120 of the parcel pod 104 to change the polarity of the electromagnet coil(s) of one or more of the first and second magnetic couplers 170, 172 of the parcel pod 104.

In FIGS. 8A-8B, the mobility wheels 812 are coupled to an example joint (e.g., a pivot joint) 814. For example, the joint 814 can facilitate the movement of the mobility wheels 812 from a first position (e.g., an extended or deployed position) depicted in FIGS. 8A and 8B to a second position (e.g., an intermediate position, a transition position, etc.) depicted in FIGS. 9E-9H or a third position (e.g., a stowed position) depicted in FIGS. 8C-8D. In some examples, the joint 814 implements means for pivoting that can include and/or otherwise correspond to an elbow, hinge, pivot, or any other type of moveable, pivotable, and/or otherwise rotatable joint. Alternatively, the means for pivoting may include any other mechanical means or structure that facilitates a pivoting or rotation of the mobility wheel 812 about an axis, such as a ball and socket or saddle type joint.

In FIGS. 8A-8B, the transit carrier 100 includes the first couplers 115 to couple to second example couplers 816 of the transit pod 802. In FIGS. 8A-8B, the second couplers 816 are on a top surface 803 of the transit pod 802. For example, the top surface 803 of the transit pod 802 can correspond to the top surface 146 of the passenger pod 102 of FIGS. 1F-1G and/or the passenger pod 155 of FIGS. 1H-1I. In other examples, the top surface 803 of the transit pod 802 can correspond to the top surface 168 of the parcel pod 104 of FIGS. 1J-1K and/or the parcel pod 180 of FIGS. 1L-1M.

The second couplers 816 of FIGS. 8A-8B are stacking couplers (e.g., second stacking couplers). For example, the transit pod 802 includes the second couplers 816 to facilitate a stacking and/or a placement of the transit pod 802 on top of the transit carrier 100 of FIGS. 1A-1B or the transit carrier 135 of FIGS. 1C-1E. The second couplers 816 include an example pin 818. For example, the pin 818 can be configured to be coupled, inserted, and/or mated to the lug 806 of the first couplers 115 of the transit carrier 100. In some examples, the second couplers 816 implement second means for coupling. For example, the second means for coupling can include and/or otherwise be implemented by at least one of a base or a pin. In other examples, the second means for coupling can include at least one of the base or an elongated member (e.g., a lug, a plug, etc.) configured to be received by a receptacle. The first and second couplers 115, 816 are further described below in connection with FIGS. 8E-8F and FIGS. 10A-10B.

Figure 8C:
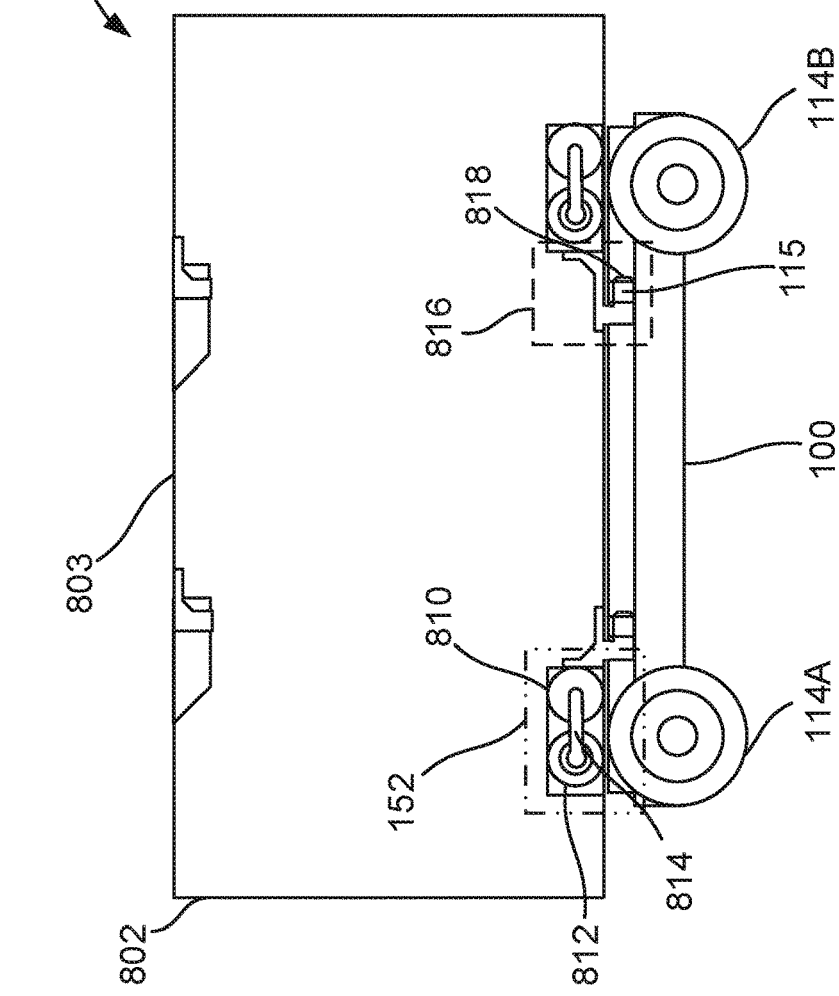

FIG. 8C depicts a side view of the land vehicle 800 of FIGS. 8A-8B in a post-coupling stage. FIG. 8D depicts a rear view of the land vehicle 800 of FIGS. 8A-8C in the post-coupling stage. In FIGS. 8C-8D, the transit pod 802 and the transit carrier 100 are in a latched or coupled position, where the transit pod 802 and the transit carrier 100 are coupled.

Figure 8F:
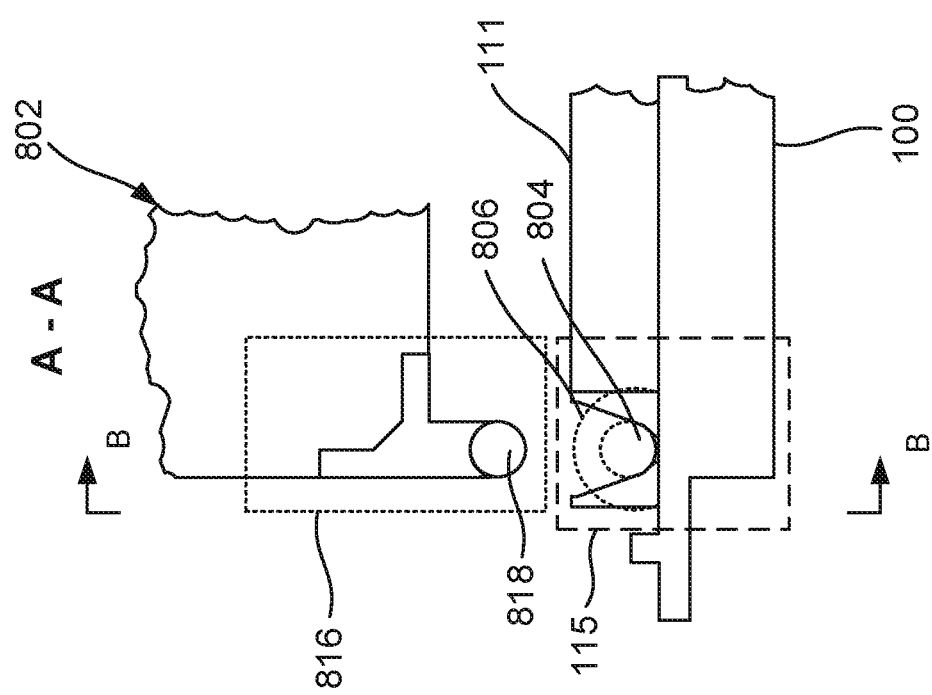
FIGS. 8E-8F depict views of an example coupling operation of the example land vehicle of FIGS. 8A-8B in the pre-coupling stage.
Figure 8E:
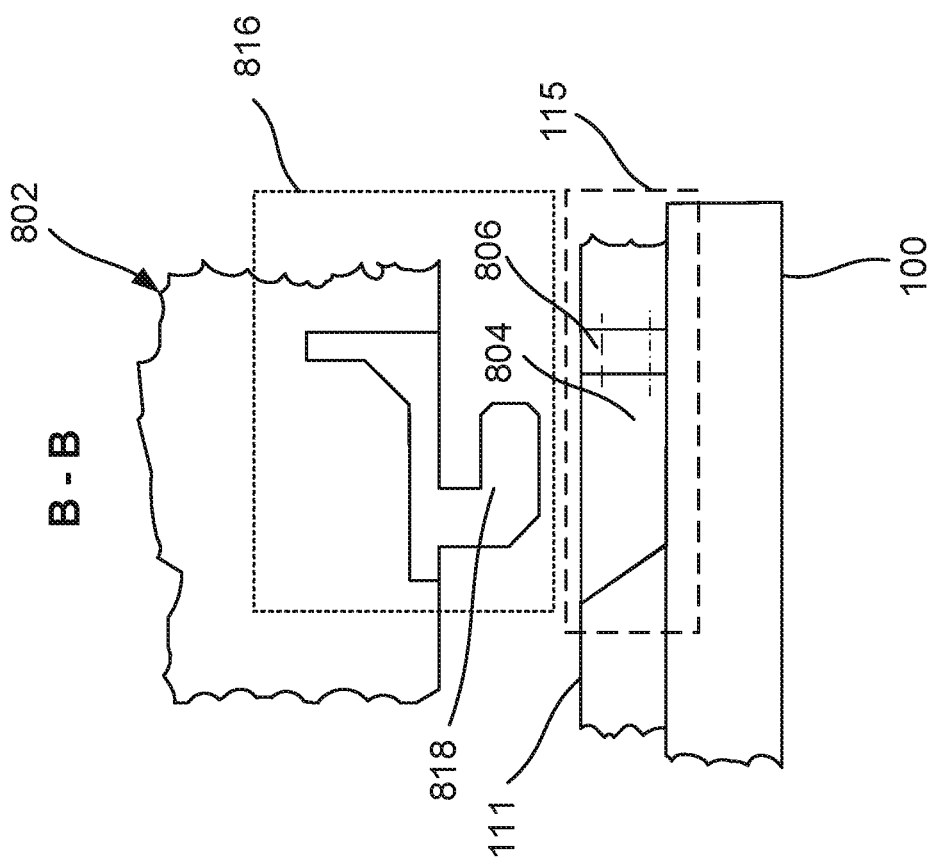

FIGS. 8E-8F depict views of an example coupling operation of the land vehicle 800 of FIGS. 8A-8D in the pre-coupling stage. FIG. 8E depicts a side view B-B of a first portion of the transit pod 802 of FIGS. 8A-8D and a second portion of the transit carrier 100 of FIGS. 8A-8D. In FIG. 8E, the first couplers 115 of the transit carrier 100 are proximate to but not coupled to the second couplers 816 of the transit pod 802. FIG. 8F depicts a rear view A-A also depicted in FIG. 8A. In FIG. 8F, A-A is a rear view of the first portion and the second portion of FIG. 8E. In FIG. 8F, the first couplers 115 of the transit carrier 100 are proximate to but not coupled to the second couplers 816 of the transit pod 802.

FIGS. 9A-9J depict example operations 910, 920, 930, 940, 950 for the transit pod 802 of FIGS. 8A-8F coupling to the transit carrier 100 of FIGS. 1A-1B. The operations 910, 920, 930, 940, 950 include a first example operation 910, a second example operation 920, a third example operation 930, a fourth example operation 940, and a fifth example operation 950.

FIG. 9A depicts a side view of the first operation 910 and FIG. 9B depicts a rear view of the first operation 910. The first operation 910 corresponds to an example where the transit pod 802 is moving onto an example sloped platform or ramp 902 towards the transit carrier 100. For example, the transit controller 122 of the transit pod 802 may direct the second movement systems 152 to move the mobility wheels 812 to climb on top of and/or otherwise move onto the top of the transit carrier 100.

FIG. 9C depicts a side view of the second operation 920 and FIG. 9D depicts a rear view of the second operation 920. The second operation 920 corresponds to an example where the transit pod 802 is on top of the transit carrier 100. For example, a sensor system 904 of the transit pod 802 can determine that the transit pod 802 has traveled and/or otherwise moved to a first land coupling position. The first land coupling position can correspond to a position where the transit controller 122 determines that the mobility wheels 812 do not have to move further onto the transit carrier 100 and the coupling of the transit pod 802 and the transit carrier 100 can be initiated. In some examples, the sensor system 904 corresponds to one or both sensor systems 154, 156 of the passenger pod 102 of FIGS. 1F-1I and FIGS. 2A-2B. In some examples, the sensor system 904 corresponds to one or both sensor systems 176, 178 of the parcel pod 104 of FIGS. 1J-1M. For example, the transit controller 122 can obtain an output from a LIDAR system of the transit pod 802 and determine that the transit pod 802 is at the first land coupling position based on the LIDAR system output. Additionally or alternatively, a series of guides (e.g., mechanical guides, physical guides, etc.) and/or blocks (e.g., mechanical blocks, physical blocks, barriers, etc.) may be used to maneuver the transit pod 802 onto the transit chassis 100.

FIG. 9E depicts a side view of the third operation 930 and FIG. 9F depicts a rear view of the third operation 930. The third operation 930 corresponds to an example where the transit pod 802 performs a kneel-down operation on top of the transit carrier 100 by lowering a height of the transit pod 802 from a first height to a second height. By pivoting the mobility wheels 812 clockwise into the intermediate position, the transit pod 802 can be lowered to align the second couplers 816 of the transit pod 802 to the first couplers 115 of the transit carrier 100. For example, in response to the transit controller 122 determining that the transit pod 802 is at the first land coupling position, the transit controller 122 can instruct the second movement systems 152 to pivot the mobility wheels 812 clockwise about a pivot axis to drop a height of the transit pod 802 from the first height (e.g., a deployed or extended height) to the second height (e.g., a coupling height, a kneel-down height, a stowed height, etc.), where the second height is lower than the first height. In such examples, the first height can correspond to the mobility wheels 812 in the extended position to facilitate movement of the transit pod 802 at typical speeds. In other examples, the second height can correspond to the mobility wheels 812 in the intermediate position, the transition position, etc., to place and/or otherwise move the transit pod 802 into a second land coupling position.

Figure 9G:
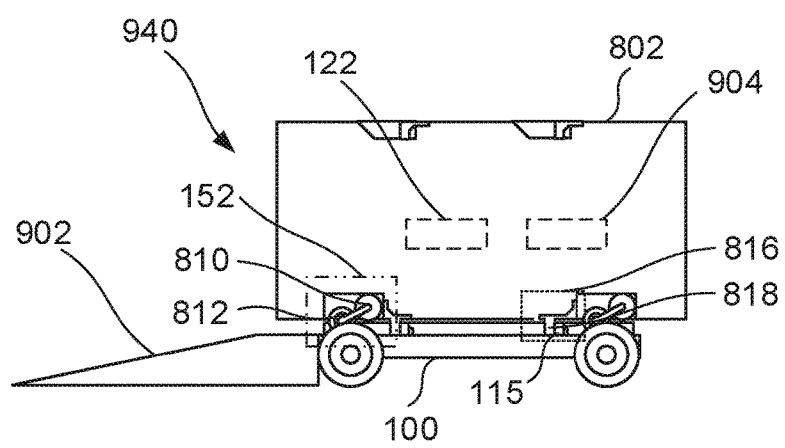
Figure 9H:
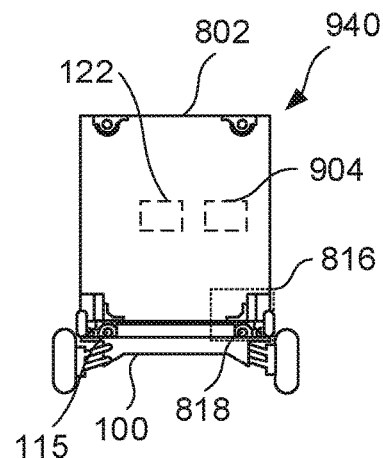

FIG. 9G depicts a side view of the fourth operation 940 and FIG. 9H depicts a rear view of the fourth operation 940. The fourth operation 940 corresponds to an example where the second couplers 816 of the transit pod 802 interlock, mate, and/or otherwise engage with the first couplers 115 of the transit carrier 100. For example, in response to the transit controller 122 determining that the transit pod 802 is at the second land coupling position, the transit controller 122 can instruct the second movement systems 152 to rotate the mobility wheels 812 to move the transit pod 802 forward to couple the second couplers 816 of the transit pod 802 to the first couplers 115 of the transit carrier 100. In response to the transit controller 122 determining that the second couplers 816 are coupled to the first couplers 115, the transit controller 122 instructs the second movement systems 152 to disengage the mobility wheels 812 to stop movement of the transit pod 802.

In some examples, the transit controller 122 of the transit pod 802 obtains a measurement from a sensor (e.g., a pressure switch, a position sensor, etc.) of the sensor system 904 monitoring the second couplers 816 that the second couplers 816 have coupled to the first couplers 115. In other examples, the transit controller 122 of the transit carrier 100 can transmit wireless data (e.g., one or more wireless messages, one or more wireless data packets, etc.) to the transit controller 122 of the transit pod 802. For example, the wireless data can be indicative of a sensor associated with the sensor systems 128, 130, 132, 134 of the transit carrier 100 monitoring the first couplers 115 that the first couplers 115 have coupled to the second couplers 816. In such examples, the sensor can be a pressure sensor, a position sensor, a torque sensor, etc. In other examples, the pin 818 can have one or more conductive rings or contacts that, when in contact with one or more conductive rings or contacts of the lug 806, generate an electrical signal to be obtained by the transit controller 122 of the transit pod 802 and/or the transit chassis 100. In such examples, the transit controller 122 of the transit pod 802 and/or the transit chassis 100 can determine a position of the transit pod 802 relative to the transit chassis 100.

Figure 9I:
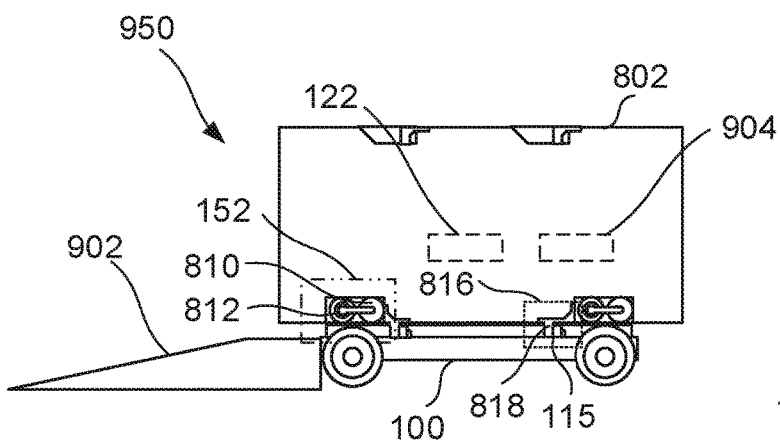
Figure 9J:
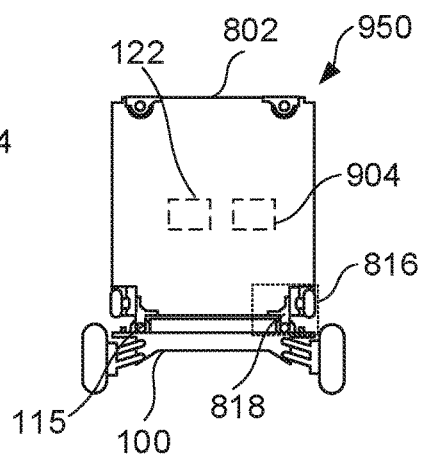

FIG. 9I depicts a side view of the fifth operation 950 and FIG. 9J depicts a rear view of the fifth operation 950. The fifth operation 950 corresponds to an example where the second couplers 816 of the transit pod 802 have interlocked and/or otherwise engaged with the first couplers 115 of the transit carrier 100. For example, in response to the transit controller 122 of the transit pod 802 determining that the second couplers 816 have coupled to the first couplers 115, the transit controller 122 of the transit pod 802 instructs the second movement systems 152 to pivot the mobility wheels 812 from the intermediate position to the stowed position. In response to moving the mobility wheels 812 to the stowed position, the transit controller 122 of the transit pod 802 can transmit wireless data to the transit controller 122 of the transit carrier 100 indicative of the transit pod 802 being coupled to the transit carrier 100 and ready for transportation to a different location. In response to obtaining the wireless data from the transit pod 802, the transit controller 122 of the transit carrier 100 can instruct the transit carrier 100 to move the transit carrier 100 and the transit pod 802 to the different location.

Figure 10A:
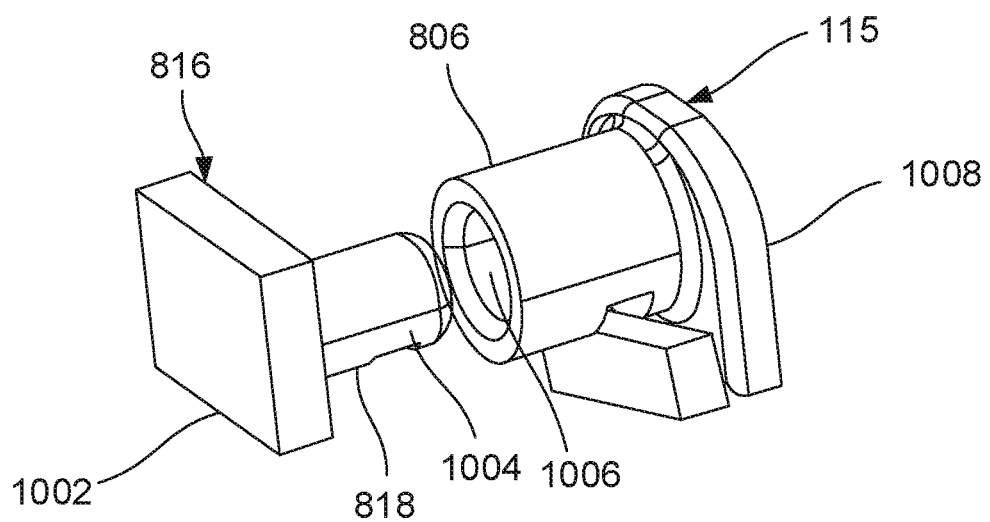
FIGS. 10A-10B depict an example connection system of the example land vehicle of FIGS. 8A-8B.
Figure 10B:
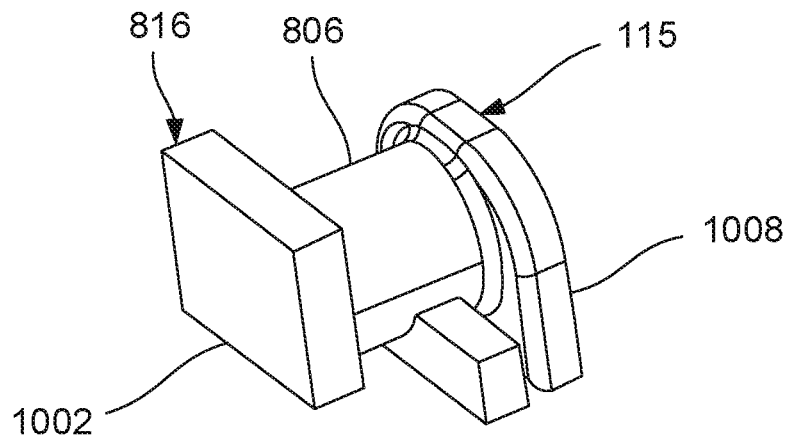

FIG. 10A depicts a first portion of the first couplers 115 of FIGS. 8A-8F separated from a second portion of the second couplers 816 of FIGS. 8A-8F. FIG. 10B depicts the first portion of the first couplers 115 of FIGS. 8A-8F coupled, interlocked, and/or otherwise mated to the second portion of the second couplers 816 of FIGS. 8A-8F.

In the illustrated example of FIG. 10A, the second coupler 816 includes the pin 818 of FIGS. 8A-8F coupled to a first example base 1002. In FIG. 10A, the pin 818 is a cylindrical pin or plug including an example indented notch 1004. Alternatively, the pin 818 may have any other shape. In FIG. 10A, the indented notch 1004 can be used to key the first couplers 115 to the second couplers 816. In FIG. 10A, the first base 1002 is a rectangular base. Alternatively, the first base 1002 may have any other shape. In some examples, the first base 1002 is coupled to the transit pod 802 of FIGS. 8A-8F.

In the illustrated example of FIG. 10A, the first coupler 115 includes the lug 806 of FIGS. 8A-8F with an example cavity 1006 therein to receive the pin 818 of the second coupler 816. The lug 806 is a cylindrical receptacle. Alternatively, the lug 806 may have any other shape. In FIG. 10A, the lug 806 is coupled to a second example base 1008. In some examples, the second base 1008 is coupled to the transit carrier 100 of FIGS. 1A-1B or FIGS. 1C-1E. In some examples, the second base 1008 is coupled to the passenger pod 102 of FIGS. 1F-1G or the passenger pod 155 of FIGS. 1H-1I. In some examples, the second base 1008 is coupled to the parcel pod 104 of FIGS. 1J-1K or the parcel pod 180 of FIGS. 1L-1M. In some examples, the second base 1008 is coupled to the transit pod 802 of FIGS. 8A-8F.

Figure 11A:
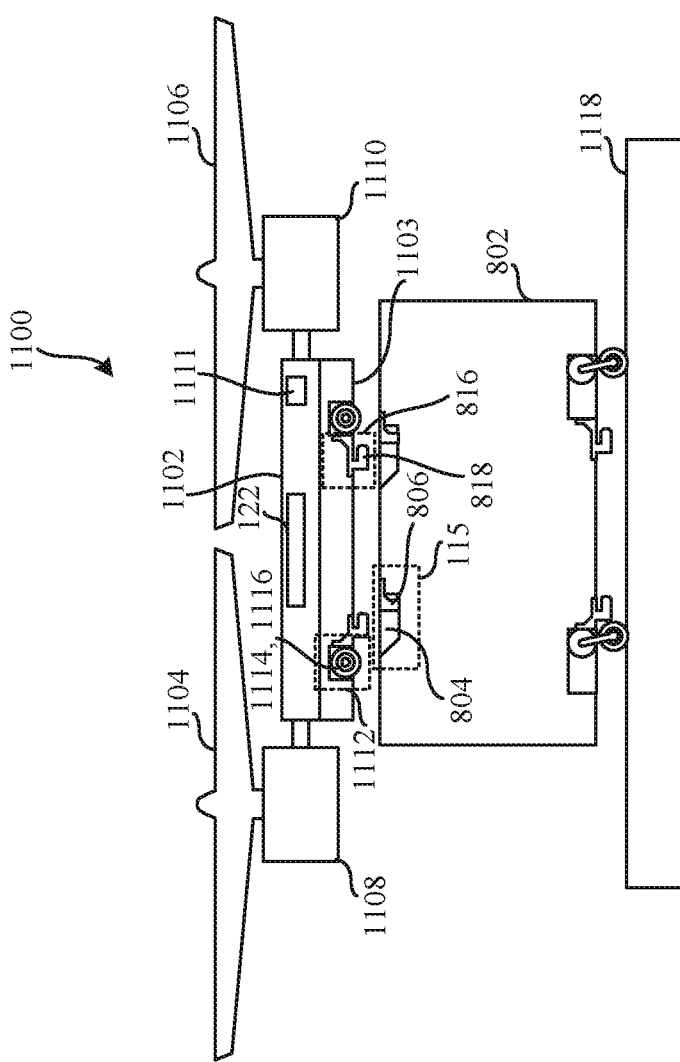
FIGS. 11A-11B depict an example air vehicle in a pre-coupling stage.
Figure 11B:
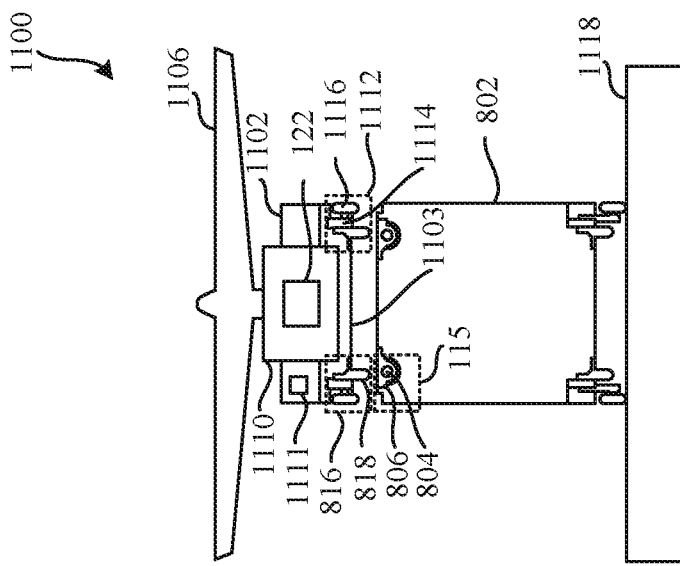

FIG. 11A depicts a side view of an example air vehicle 1100 in a pre-coupling stage. FIG. 11B depicts a rear view of the air vehicle 1100 of FIG. 11A in the pre-coupling stage. The air vehicle 1100 after coupling includes the transit pod 802 of FIGS. 8A-8F and an example UAV 1102. The air vehicle 1100 is illustrated in a generalized manner to improve clarity when describing example coupling operations associated with the air vehicle 1100.

In FIGS. 11A-11B, the UAV 1102 is a dual-rotor UAV (e.g., a dual-rotor drone) including a first example rotor 1104 and a second example rotor 1106. For example, the UAV 1102 may be a drone, a helicopter, etc. Alternatively, the UAV 1102 may have fewer or more than the two rotors 1104, 1106 depicted in FIGS. 11A-11B. Alternatively, the UAV 1102 may be a helicopter or any other type of rotary aircraft. The UAV 1102 is illustrated in a generalized manner to improve clarity when describing example coupling operations associated with the UAV 1102.

In FIGS. 11A-11B, the UAV 1102 can lift and move the transit pod 802 by generating lift with the rotors 1104, 1106 using example powertrains 1108, 1110. In FIGS. 11A-11B, a first example powertrain 1108 is coupled to the first rotor 1104 and a second example powertrain 1110 is coupled to the second rotor 1106. The powertrains 1108, 1110 may include one or more pistons, one or more turbines, one or more electric motors (e.g., battery powered), one or more gasoline motors (e.g., gasoline fueled), etc., and/or a combination thereof. The UAV 1102 includes the transit controller 122 of FIGS. 1A-1M to obtain instructions from an external computing system and execute the instructions to facilitate a transportation operation (e.g., a UAV transportation operation including transporting the transit pod 802, picking up the transit pod 802, dropping off the transit pod 802, etc.).

The UAV 1102 of FIGS. 11A-11B includes an example sensor system 1111. In some examples, the sensor system 1111 corresponds to one or both sensor systems 154, 156 of the passenger pod 102 of FIGS. 1F-1I and FIGS. 2A-2B. In some examples, the sensor system 1111 corresponds to one or both sensor systems 176, 178 of the parcel pod 104 of FIGS. 1J-1M. For example, the transit controller 122 can obtain an output from a LIDAR system, a GPS system, a computer vision system, etc., of the UAV 1102 and determine that the UAV 1102 is at a desired position or location based on the LIDAR system output, the GPS system output, the computer vision system output, etc.

The transit pod 802 includes the first couplers 115 of FIGS. 1A-1M and 8A-8F on the top surface of the transit pod 802 to facilitate interaction with the UAV 1102. The first couplers 115 on the top surface of the transit pod 802 are described above in connection with FIGS. 8A-8F and FIGS. 10A-10B. For example, the lug 806 of FIGS. 8A-8F and FIGS. 10A-10B can be configured to receive and/or otherwise obtain the pin 818 of FIGS. 8A-8F and FIGS. 10A-10B from the second couplers 816 associated with the UAV 1102.

In FIGS. 11A-11B, the UAV 1102 includes the second couplers 816 to couple to the first couplers 115 on the top surface of the transit pod 802. In FIGS. 11A-11B, the second couplers 816 are on a bottom surface 1103 of the UAV 1102. In FIGS. 11A-11B, the second couplers 816 of the UAV 1102 can be referred to herein as couplers (e.g., UAV couplers), cargo couplers (e.g., UAV cargo couplers), pickup couplers (e.g., UAV pickup couplers, transit pod pickup couplers, etc.), transport couplers (e.g., UAV transport couplers), flight couplers, etc. The UAV 1102 includes four instances of the second couplers 816 that are configured to couple with respective ones of the first couplers 115 of the transit pod 802. Alternatively, the UAV 1102 may have fewer or more instances of the second couplers 816. Operations associated with the second couplers 816 of the UAV 1102 and the first couplers 115 of the transit pod 802 are described below in connection with FIGS. 12A-12L.

The UAV 1102 includes third example movement systems 1112. The UAV 1102 includes four instances of the third movement system 1112. Alternatively, the UAV 1102 may have fewer or more than four instances of the third movement system 1112. As used herein, the four instances of the third movement system 1112 may in combination be referred to herein as a UAV movement system.

In FIGS. 11A-11B, the third movement system 1112 includes an example motor 1114 and an example wheel (e.g., a mobility wheel) 1116. In FIGS. 11A-11B, the motor 1114 is a trunnion motor. Alternatively, any other type of motor may be used. In FIGS. 11A-11B, the mobility wheel 1116 is used to move the UAV 1102 on top of the transit pod 802 to align the second couplers 816 of the UAV 1102 to the first couplers 115 of the transit pod 802. For example, the UAV 1102 can travel at a non-zero speed (e.g., a non-zero horizontal or lateral speed) across the top of the transit pod 802 when the mobility wheels 1116 are engaged to move. Alternatively, fewer or more than four mobility wheels 1116 may be used. For example, the powertrain of the third movement system 1112 may include one or more electric motors, one or more transmissions, one or more drive shafts, one or more differentials, one or more axles, a final drive, etc., to steer and/or otherwise control the four mobility wheels 1116. Alternatively, one or both of the first and second powertrains 1108, 1110 may be used to control movement of the mobility wheels 1116.

In some examples, the third movement system 1112 implements second means for moving the UAV 1102 or second means for transporting the UAV 1102. The second means for moving the UAV 1102 or the second means for transporting the UAV 1102 can correspond to and/or otherwise include a powertrain, a power source, and/or the mobility wheel 1116, one or more joints, an air cushion handling system, one or more rails, one or more rollers (e.g., pallet handling rollers), etc., and/or a combination thereof.

In some examples, the power source of the third movement system 1112 includes one or more batteries (e.g., lithium-ion batteries) that provide electrical power to the one or more electric motors of the powertrain of the third movement system 1112 to facilitate movement of the UAV 1102. Alternatively, the power source of the third movement system 1112 may be any other power storage element or device (e.g., a capacitor bank, a chemical or liquid reservoir (e.g., a gasoline tank, a hydrogen tank, etc.).

Figure 11D:
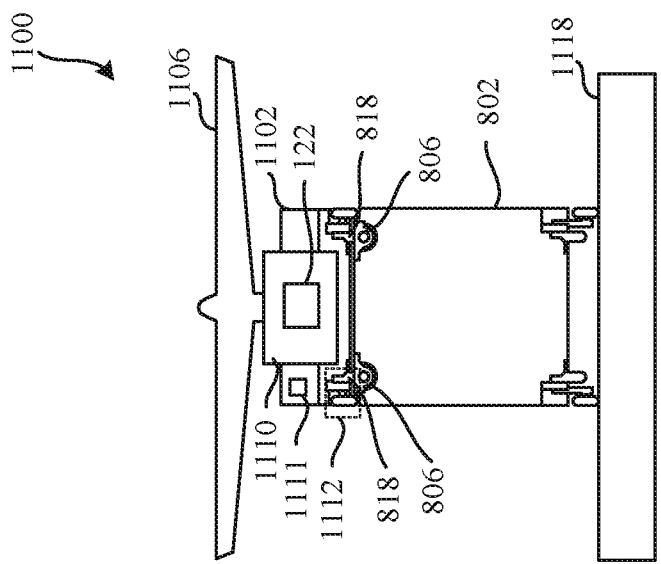
FIGS. 11C-11D depict the example air vehicle of FIGS. 11A-11B in a post-coupling stage.
Figure 11C:
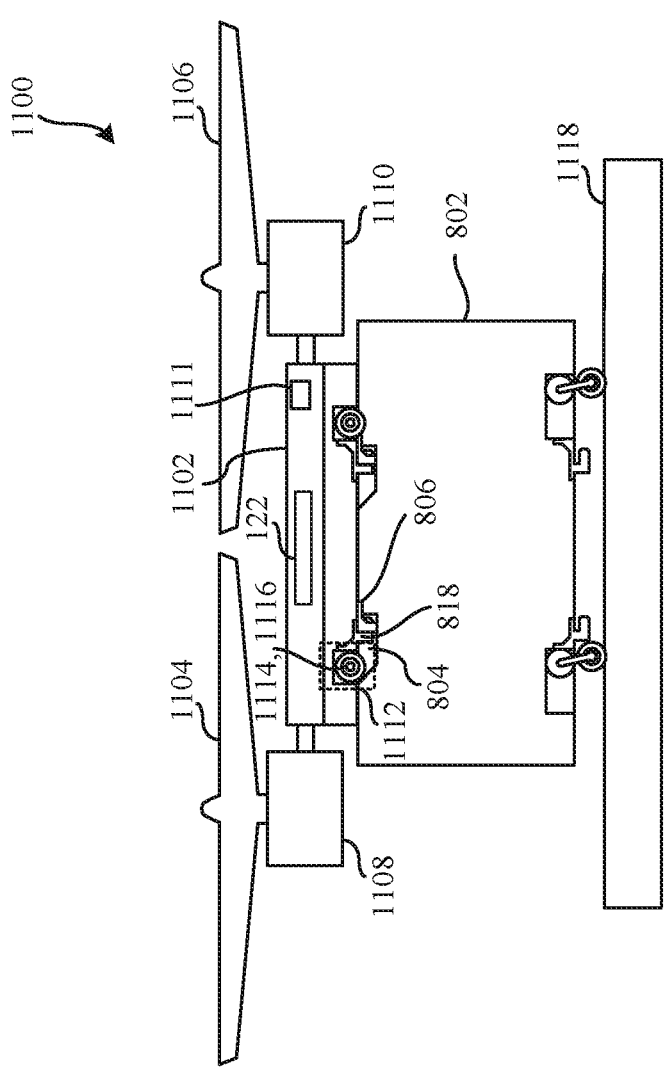

In FIGS. 11A-11B, the air vehicle 1100 is in a pre-coupling stage. For example, the transit pod 802 and the UAV 1102 are in a pre-latched or pre-coupled position, where the transit pod 802 is on a ground surface 1118 and the UAV 1102 has not coupled to the transit pod 802 or, in some examples, contacted the transit pod 802. In FIGS. 11C-11D, the air vehicle 1100 is in a post-coupling stage. For example, the transit pod 802 and the UAV 1102 are in a latched or coupled position, where the transit pod 802 and the transit carrier 100 are coupled.

FIGS. 11E-11F depict views of an example coupling operation of the air vehicle 1100 of FIGS. 11A-11D in the pre-coupling stage. FIG. 11E depicts a side view B-B of a first portion of the transit pod 802 of FIGS. 11A-11D and a second portion of the UAV 1102 of FIGS. 11A-11D. In FIG. 11E, the first couplers 115 of the transit pod 802 are proximate to but not coupled to the second couplers 816 of the UAV 1102. FIG. 11F depicts a rear view A-A depicted in FIG. 11A. In FIG. 11F, A-A is a rear view of the first portion and the second portion of FIG. 11E. In FIG. 11F, the first couplers 115 of the transit pod 802 are proximate to but not coupled to the second couplers 816 of the UAV 1102.

FIGS. 12A-12L depict example operations 1210, 1220, 1230, 1240, 1250, 1260 for the transit pod 802 of FIGS. 11A-11F coupling to the UAV 1102 of FIGS. 11A-11F. The operations 1210, 1220, 1230, 1240, 1250, 1260 include a first example operation 1210, a second example operation 1220, a third example operation 1230, a fourth example operation 1240, a fifth example operation 1250, and a sixth example operation 1260.

Figure 12B:
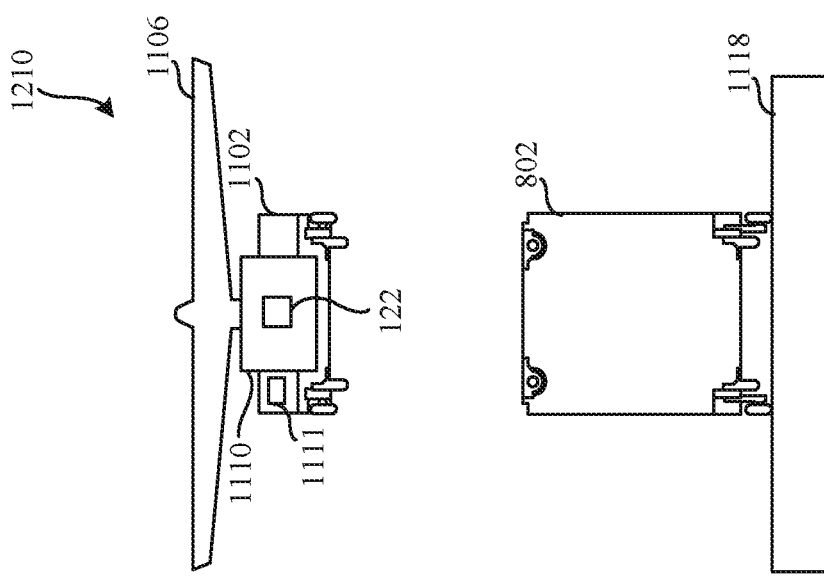
FIGS. 12A-12L depict example coupling operations to form the example air vehicle of FIGS. 11A-11B.
Figure 12A:
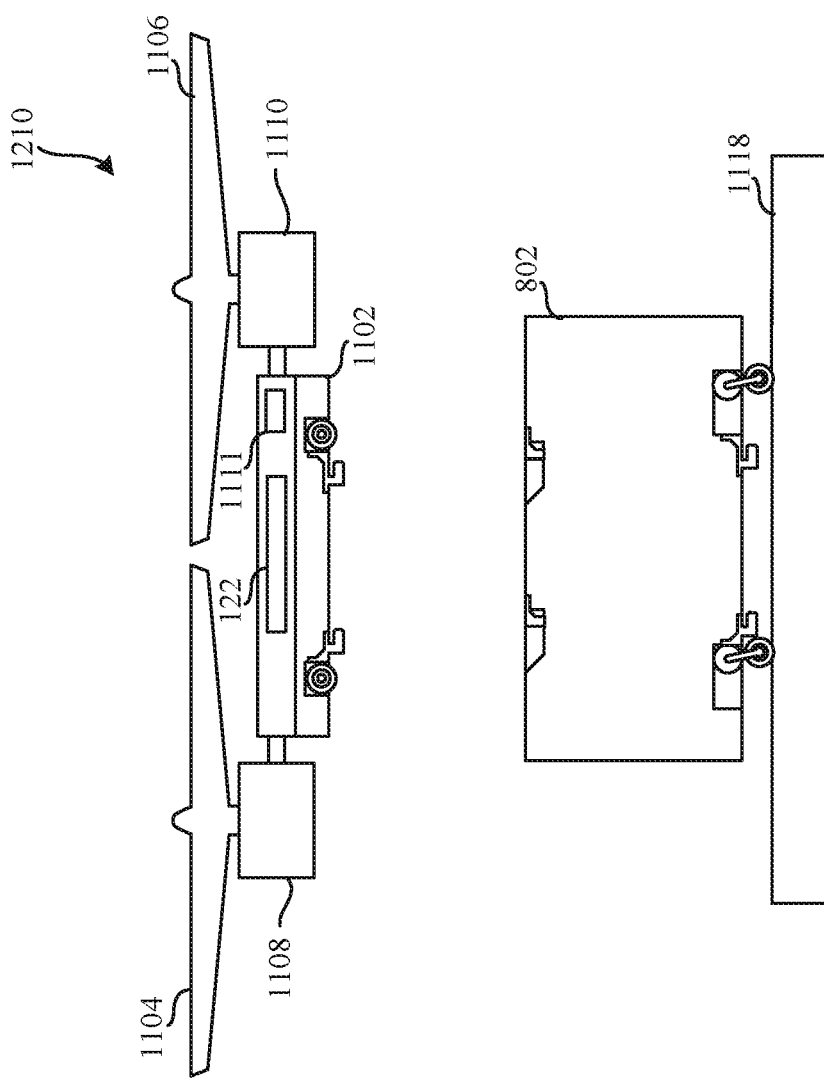

FIG. 12A depicts a side view of the first operation 1210 and FIG. 12B depicts a rear view of the first operation 1210. The first operation 1210 corresponds to an example where the UAV 1102 is moving towards and/or otherwise approaching a position of the transit pod 802. For example, the transit controller 122 of the UAV 1102 may instruct the powertrains 1108, 1110 to control the rotors 1104, 1106 to move the UAV 1102 to a position proximate a top surface of the transit pod 802.

Figure 12D:
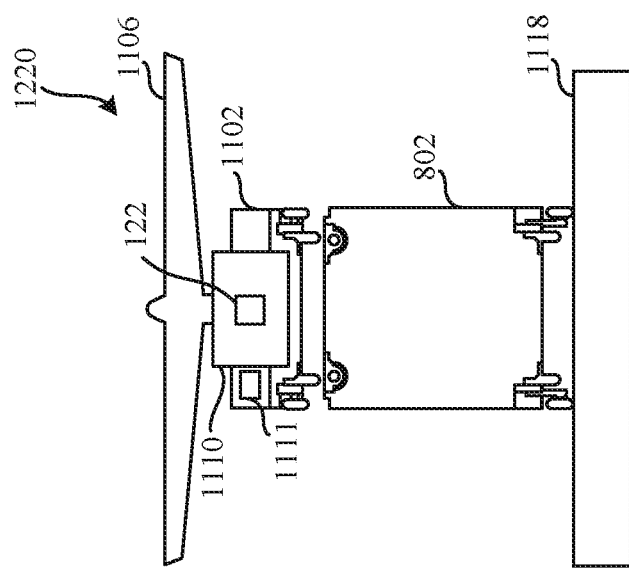
Figure 12C:
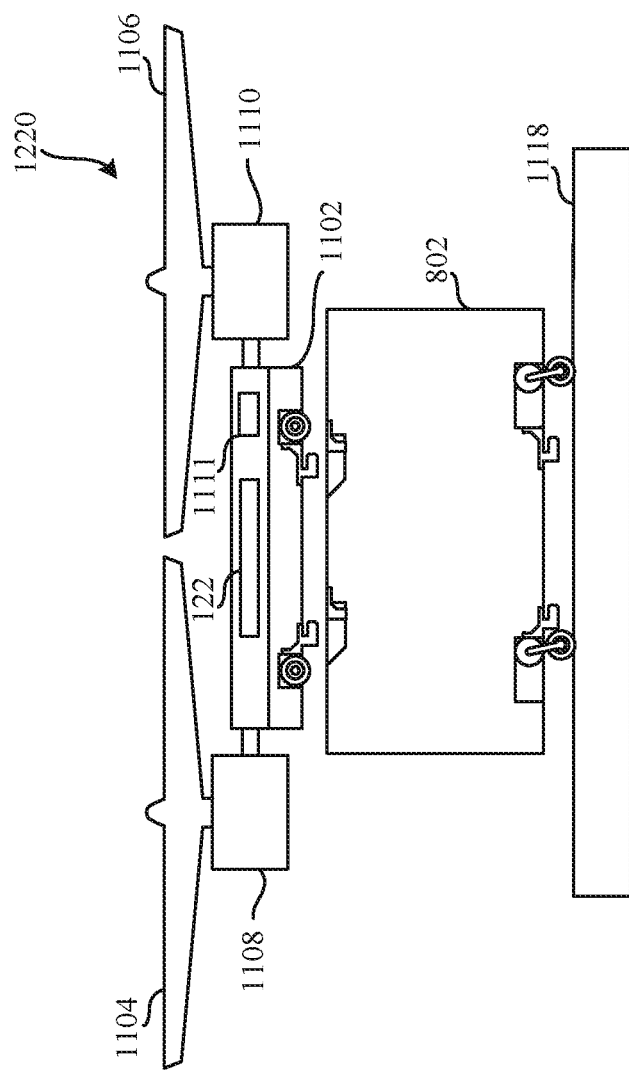

FIG. 12C depicts a side view of the second operation 1220 and FIG. 12D depicts a rear view of the second operation 1220. The second operation 1220 corresponds to an example where the UAV 1102 is at a position substantially above the transit pod 802. For example, the sensor system 1111 of the UAV 1102 can determine that the UAV 1102 has traveled and/or otherwise moved to a first air coupling position. The first air coupling position can correspond to a position where the transit controller 122 of the UAV 1102 determines that the UAV 1102 can initiate contact with the transit pod 802 to begin coupling.

Figure 12F:
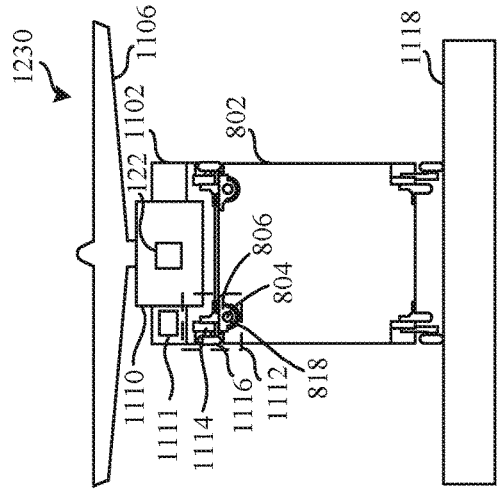
Figure 12H:
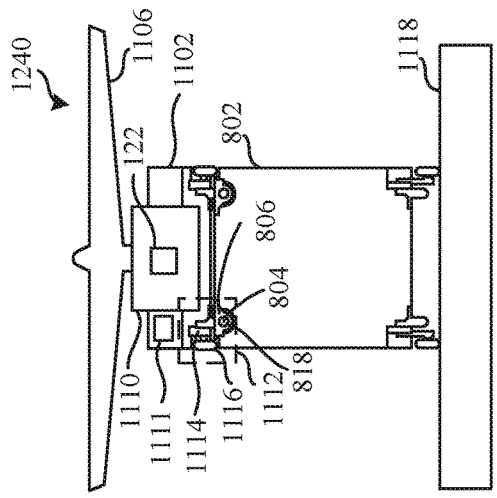
Figure 12E:
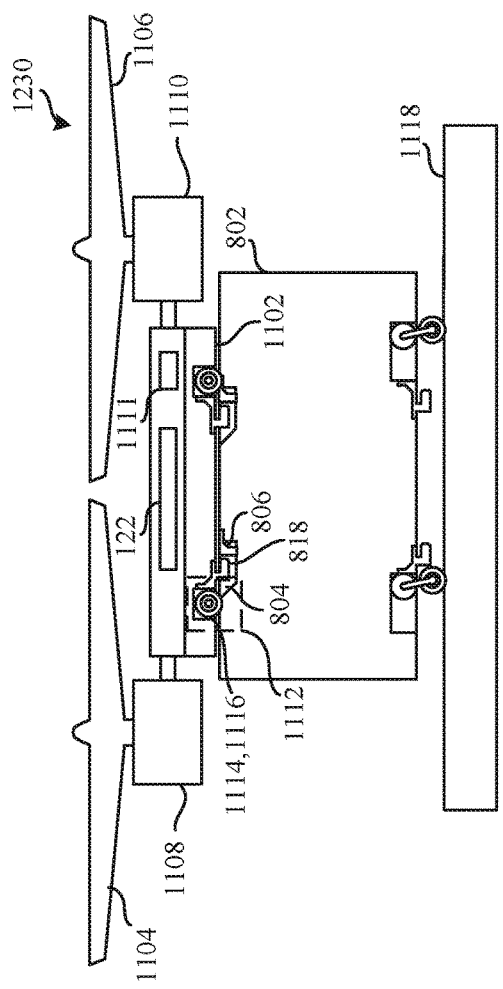

FIG. 12E depicts a side view of the third operation 1230 and FIG. 12F depicts a rear view of the third operation 1230. The third operation 1230 corresponds to an example where the UAV 1102 is in contact with the transit pod 802 prior to coupling to the transit pod 802. For example, the sensor system 1111 of the UAV 1102 can determine that the UAV 1102 has traveled and/or otherwise moved to a second air coupling position. At the second air coupling position, the UAV 1102 has lowered the pin 818 of the second couplers 816 of the UAV 1102 into the groove 804 of the first couplers 115 of the transit pod 802.

Figure 12G:
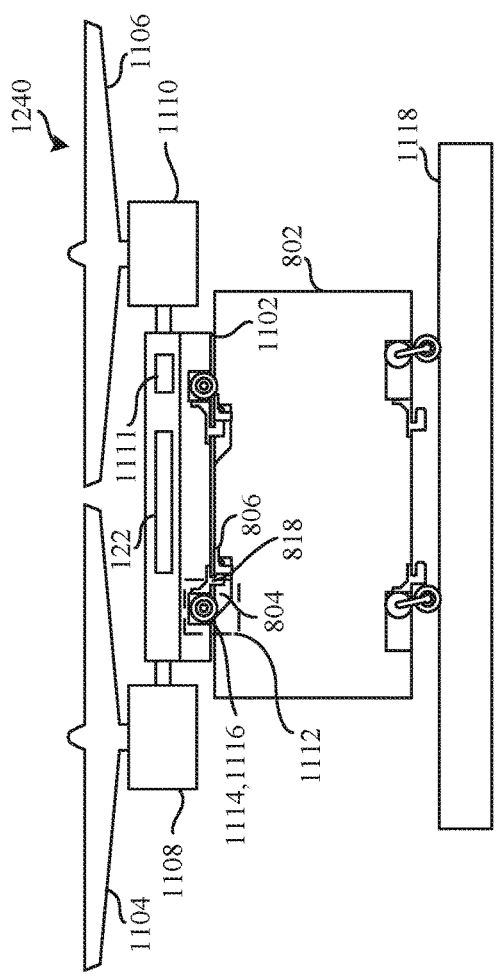

FIG. 12G depicts a side view of the fourth operation 1240 and FIG. 12H depicts a rear view of the fourth operation 1240. The fourth operation 1240 corresponds to an example where the UAV 1102 has coupled to the transit pod 802 at a third air coupling position. The third air coupling position can correspond to a position where the transit controller 122 of the UAV 1102 determines that the mobility wheels 1116 do not have to move further onto the transit pod 802 and the coupling of the transit pod 802 and the UAV 1102 is complete. For example, in response to the UAV 1102 being at the second coupling position, the transit controller 122 of the UAV 1102 can instruct the mobility wheels 1116 to move from the second coupling position to the third coupling position by directing the mobility wheels 1116 to move across the top of the transit pod 802.

By moving the mobility wheels 1116 horizontally across the top of the transit pod 802, the UAV 1102 can be lowered into the groove 804 to align the second couplers 816 of the UAV 1102 to the first couplers 115 of the transit pod 802. For example, in response to the transit controller 122 determining that the UAV 1102 is at the second coupling position, the transit controller 122 can instruct the third movement systems 1112 to move the mobility wheels 1116 into the groove 804 to drop a height of the UAV 1102 from a first height to a second height, where the second height is lower than the first height. In such examples, the first height can correspond to the mobility wheels 1116 being above and/or otherwise not in the groove 804 and the second height can correspond to the mobility wheels 1116 being in the groove 804.

During the fourth operation 1240, the second couplers 816 of the UAV 1102 interlock, mate, and/or otherwise engage with the first couplers 115 of the transit pod 802. For example, in response to the transit controller 122 of the UAV 1102 determining that the UAV 1102 is at the second coupling position, the transit controller 122 of the UAV 1102 can instruct the third movement systems 1112 of the UAV 1102 to rotate the mobility wheels 1116 to move the UAV 1102 horizontally forward across the top of the transit pod 802 to couple the first couplers 115 of the transit pod 802. In response to the transit controller 122 of the UAV 1102 determining that the second couplers 816 are coupled to the first couplers 115, the transit controller 122 instructs the third movement systems 1112 to disengage the mobility wheels 1116 to stop movement of the UAV 1102. For example, the transit controller 122 of the UAV 1102 may obtain a measurement from a sensor (e.g., a pressure switch, a position sensor, etc.) of the sensor system 1111 of the UAV 1102 monitoring the second couplers 816 indicating that the second couplers 816 have coupled to the first couplers 115. In other examples, the transit controller 122 of the transit pod 802 can transmit wireless data (e.g., one or more wireless messages, one or more wireless data packets, etc.) to the transit controller 122 of the UAV 1102. For example, the wireless data can be indicative of a sensor associated with the sensor systems 154, 156 of the transit pod 802 monitoring the first couplers 115 that the first couplers 115 have coupled to the second couplers 816 of the UAV 1102. In such examples, the sensor can be a pressure sensor, a position sensor, a torque sensor, etc.

Figure 12J:
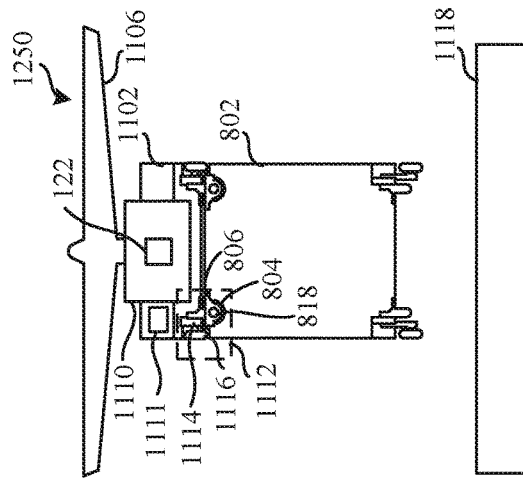
Figure 12L:
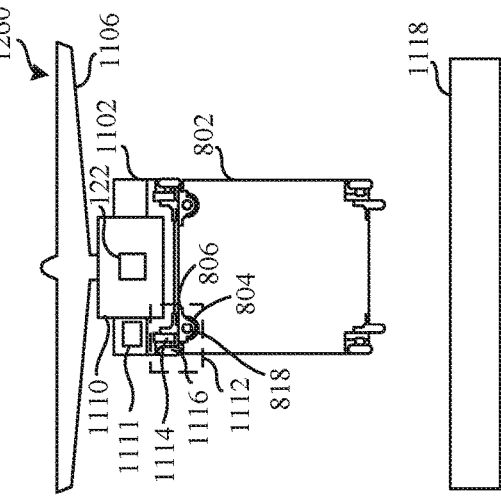
Figure 12I:
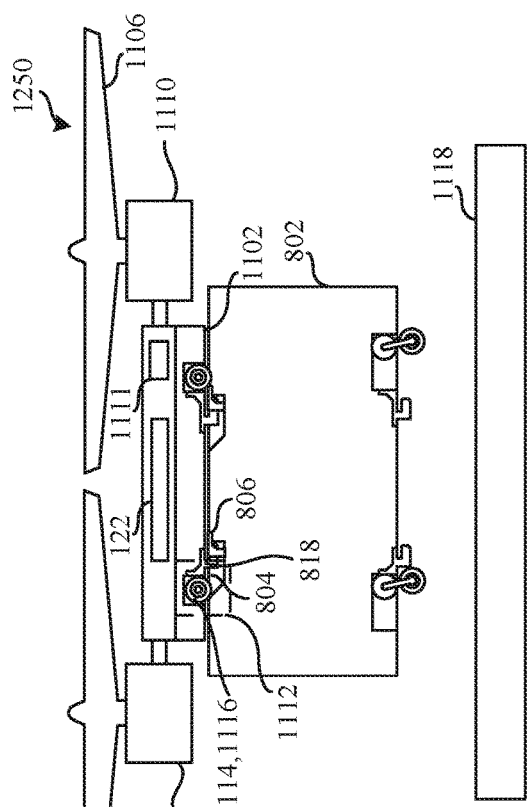

FIG. 12I depicts a side view of the fifth operation 1250 and FIG. 12J depicts a rear view of the fifth operation 1250. The fifth operation 1250 corresponds to an example where the UAV 1102 is lifting the transit pod 802 in preparation for transport. For example, in response to the transit controller 122 of the UAV 1102 determining that the second couplers 816 have coupled to the first couplers 115 of the transit pod 802, the transit controller 122 of the UAV 1102 can instruct the powertrains 1108, 1110 to control the rotors 1104, 1106 to generate sufficient lift to pick up the transit pod 802.

Figure 12K:
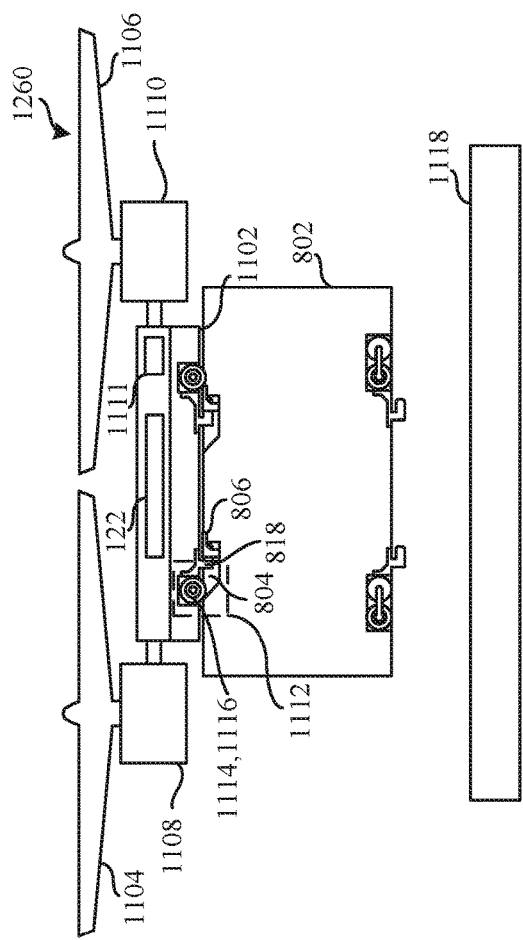

FIG. 12K depicts a side view of the sixth operation 1260 and FIG. 12L depicts a rear view of the sixth operation 1260. The sixth operation 1260 corresponds to an example where the transit pod 802 pivots the mobility wheels 812 from the extended position to the stowed position. In response to moving the mobility wheels 812 to the stowed position, the transit controller 122 of the transit pod 802 can transmit wireless data to the transit controller 122 of the UAV 1102 indicative of the transit pod 802 being coupled to the UAV 1102 and ready for transportation to a different location. In response to obtaining the wireless data from the transit pod 802, the transit controller 122 of the UAV 1102 can instruct the UAV 1102 to fly the transit pod 802 to the different location.

Figure 13:
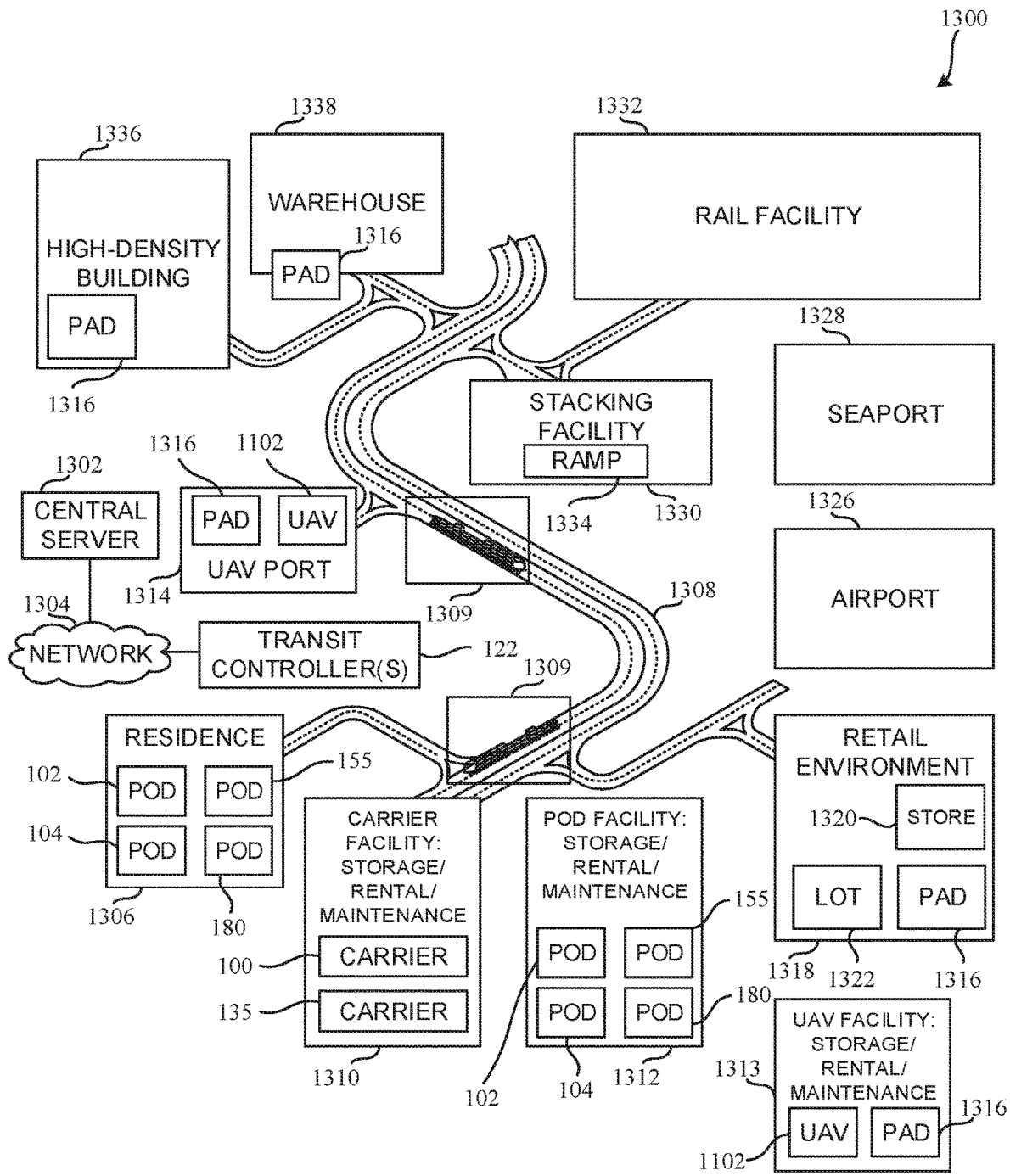
FIG. 13 is an example infrastructure to implement the examples disclosed herein

FIG. 13 is an example infrastructure 1300 including an example central server 1302 controlling and/or otherwise managing a plurality of autonomous vehicles including the transit carrier 100 of FIGS. 1A-1B, the transit carrier 135 of FIGS. 1C-1E, the passenger pod 102 of FIGS. 1F-1G, the passenger pod 155 of FIGS. 1H-1I, the parcel pod 104 of FIGS. 1J-1K, the parcel pod 180 of FIGS. 1L-1M, and/or the UAV 1102 of FIGS. 11A-11F. In FIG. 13, the infrastructure 1300 is a mass transportation system. In FIG. 13, the central server 1302 is a controller (e.g., a system controller, a transportation system controller, etc.) that can correspond to one or more computing devices. The infrastructure 1300 includes an example network 1304 to facilitate the coordination and control of the autonomous vehicles by communicating with respective ones of the transit controller 122 of FIGS. 1A-1M associated with the transit carrier 100, 135, the passenger pod 102, 155, the parcel pod 104, 180, and/or the UAV 1102.

The example network 1304 of the illustrated example of FIG. 13 is the Internet. However, the network 1304 may be implemented using one or more of any suitable wired and/or wireless network(s) including, for example, one or more data buses, one or more Local Area Networks (LANs), one or more wireless LANs, one or more cellular networks, one or more private networks, one or more public networks, one or more satellite networks, etc. The network 1304 may be implemented via one or more direct wireless connections including, for example, one or more radiofrequency connections, one or more vehicles-to-everything (V2X) protocol connections, one or more Bluetooth connections, one or more Wi-Fi Direct connections, one or more GPS connections, etc. The network 1304 enables the central server 1302 to be in communication with one or more transit controllers 122 or any other device or vehicle associated with the infrastructure 1300.

The infrastructure 1300 of FIG. 13 includes example residences 1306. In FIG. 13, the residences 1306 are homes associated with one or more persons or users that are associated with one or more passenger pods 102, 155, one or more parcel pods 104, 180, etc., and/or a combination thereof. For example, a first one of the residences 1306 can include at least one of the passenger pod 102 of FIGS. 1F-1G, the passenger pod 155 of FIGS. 1H-1I, the parcel pod 104 of FIGS. 1J-1K, or the parcel pod 180 of FIGS. 1L-1M. In such examples, a user associated with the passenger pod 102 of FIGS. 1F-1G can generate a request via a software application (e.g., a software application executing on an Internet-enabled handset, a tablet, etc., and/or any other computing device) for one of the transit carrier 100 of FIGS. 1A-1B or the transit carrier 135 of FIGS. 1C-1E to come to the first one of the residences 1306. The user may transmit the request via the application to the central server 1302 via the network 1304.

In some examples, in response to receiving the request, the central server 1302 identifies an available one of the transit carrier 100, 135 moving on an example roadway (e.g., a road, a highway, etc.) 1308 or stored in an example carrier facility 1310. For example, the carrier facility 1310 may be a depot used for maintenance, rental, and/or storage of one or more of the transit carrier 100 of FIGS. 1A-1B and/or one or more of the transit carrier 135 of FIGS. 1C-1E. In response to identifying the available one of the transit carrier 100, 135, the central server 1302 may dispatch the available one of the transit carrier 100, 135 to the first one of the residences 1306. Further depicted on the roadway 1308 are example convoys 1309 described below in connection with FIGS. 15A-15B. In other examples, a user associated with the first one of the residences 1306 can own (e.g., personally own) one or more of the transit carriers 100, 135 for personal use.

The infrastructure 1300 includes an example pod facility 1312. In some examples, the pod facility 1312 is a depot used for maintenance (e.g., repair, charging, and/or fueling operations), rental, and/or storage of one or more of the passenger pod 102 of FIGS. 1F-1G, one or more of the passenger pod 155 of FIGS. 1H-1I, one or more of the parcel pod 104 of FIGS. 1J-1K, and/or one or more of the parcel pod 180 of FIGS. 1L-1M. For example, a user who does not own a passenger pod 102, 155, a parcel pod 104, 180, etc., may generate and transmit a request to the central server 1302 to rent or temporarily use one or more passenger pods 102, 155, one or more parcel pods 104, 180, etc. In such examples, the central server 1302 can identify an available one of the passenger pods 102, 155, an available one of the parcel pods 104, 180, etc., at the pod facility 1312 and dispatch the available one of the passenger pods 102, 155, the available one of the parcel pods 104, 180, etc., to a location of the user or a location identified by the user. In other examples, the user can own (e.g., personally own) one or more passenger pods 102, 155, one or more parcel pods 104, 180, etc., for personal use.

The infrastructure 1300 includes an example UAV facility 1313. In some examples, the UAV facility 1313 is a depot used for maintenance (e.g., repair, charging, and/or fueling operations), rental, and/or storage of one or more of the UAV 1102 of FIGS. 11A-11F. For example, a user may generate and transmit a request to the central server 1302 to rent or temporarily use one or more of the UAV 1102 to transport one of the passenger pod 102, 155 of FIGS. 1G-1I, one of the parcel pod 104, 180 of FIGS. 1J-1M, etc. In such examples, the central server 1302 can identify an available one of the UAV 1102 at the UAV facility 1313 and dispatch the available one of the UAV 1102 to a location of the user or a location identified by the user (e.g., a location of the passenger pod 102, 155 of interest, a location of the parcel pod 104, 180 of interest, etc.). In FIG. 13, the UAV facility 1313 includes one or more instances of the pad 1316 to facilitate flight operations (e.g., landings, takeoffs, etc.,) of one or more of the UAV 1102.

The infrastructure 1300 includes an example UAV port 1314 to facilitate transportation operations (e.g., UAV transportation operations). In some examples, the passenger pod 102, 155, the parcel pod 104, 180, etc., can be picked up by one or more of the UAVs 1102 at an example pad 1316 (e.g., a transportation pad, a UAV pad, a UAV transportation pad, etc.) and transported to a requested or desired second location. For example, the pad 1316 may be a takeoff/landing pad for the UAV 1102. Alternatively, the passenger pod 102, 155, the parcel pod 104, 180, etc., can be picked up by one or more of the UAVs 1102 at a location different from the pad 1316. For example, the passenger pod 102, 155, the parcel pod 104, 180, etc., may be picked up from a corresponding transit carrier 100, 135 at the residence 1306. In some examples, the passenger pod 102, 155, the parcel pod 104, 180, etc., can be dropped off by one or more of the UAVs 1102 after being transported to the UAV port 1314 from a different location. Operations associated with the UAVs 1102 at the UAV port 1314 are described below in connection with FIG. 17.

The infrastructure 1300 includes an example retail environment 1318. The retail environment 1318 includes an example retail store 1320 and an example parking lot 1322. In FIG. 13, the retail store 1320 is a business or outlet that sells products or services to the public. In FIG. 13, the parking lot 1322 includes a plurality of transit pods 102, 104, 155, 180 and the pad 1316. For example, the UAV 1102 may pick up or drop off a transit pod 102, 104, 155, 180 at the pad 1316. Operations associated with the transit pods 102, 104, 155, 180 in connection with the retail environment 1318 is described below in connection with FIGS. 19A-19D.

The infrastructure 1300 includes an example airport 1326 and an example seaport 1328. In some examples, the transit pods 102, 104, 155, 180 can be brought to the airport 1326 or the seaport 1328 for transportation to a different airport or seaport. In some examples, the transit pods 102, 104, 155, 180 can be brought to the airport 1326 or the seaport 1328 after being transported from a different airport or seaport.

The infrastructure 1300 includes an example stacking facility 1330 and an example rail facility 1332. In FIG. 13, the infrastructure 1300 includes the stacking facility 1330 to facilitate stacking of transit pods 102, 104, 155, 180 on different transit pods 102, 104, 155, 180. For example, the stacking facility 1330 can include one or more ramps 1334 that the parcel pod 104, 180 can use to move on top of another parcel pod 104, 180. In such examples, stacked ones of the parcel pods 104, 180 can travel to the rail facility 1332 or another location within the infrastructure 1300 for further operation. Operations associated with the rail facility 1332 are described below in connection with FIG. 21. Operations associated with the stacking facility 1330 are described below in connection with FIG. 22.

The infrastructure 1300 includes an example building 1336. The building 1336 is a high-density building, such as an apartment building, an office building, etc. The building 1336 includes the transportation pad 1316 to facilitate UAV transportation operations associated with the building 1336. The building 1336 can include storage for a plurality of transit pods 102, 104, 155, 180 for use by persons or users associated with the building 1336. In some examples, the building 1336 can include the one or more ramps 1334 of the stacking facility 1330 to facilitate stacking of the transit pods 102, 104, 155, 180 to increase a density of stored ones of the transit pods 102, 104, 155, 180.

The infrastructure 1300 includes an example warehouse 1338 to facilitate a storage and/or a delivery of goods, packages, or other items for the infrastructure 1300. The warehouse 1338 includes the transportation pad 1316 to facilitate UAV transportation operations associated with the warehouse 1338. For example, the warehouse 1338 can be used to unload or load ones of the parcel pods 104, 180, the UAVs 1102, etc., and/or a combination thereof for transport within the infrastructure 1300 or to a different infrastructure.

Figure 14:
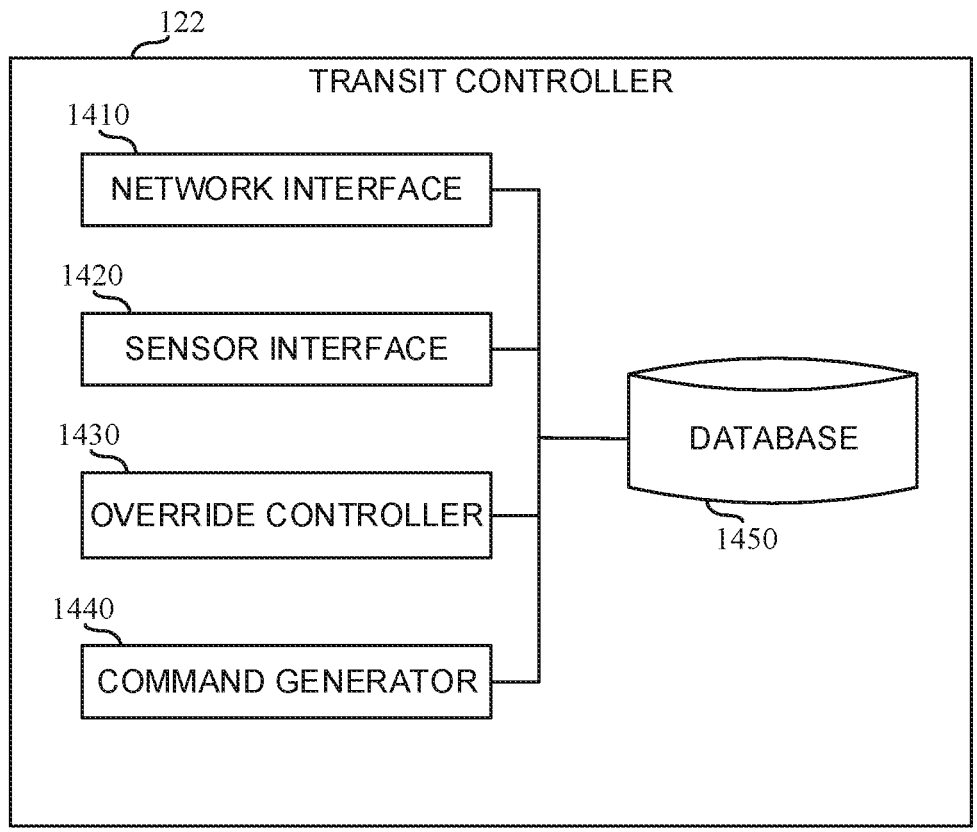
FIG. 14 is an example implementation of a transit controller.

FIG. 14 is an example implementation of the transit controller 122 of FIGS. 1A-1M, FIGS. 11A-11F, etc. The transit controller 122 can be used to facilitate transportation requests by a user, the central server 1302 of FIG. 13, etc., associated with the transit carrier 100 of FIGS. 1A-1B, the transit carrier 135 of FIGS. 1C-1E, the passenger pod 102 of FIGS. 1F-1G, the passenger pod 155 of FIGS. 1H-1I, the parcel pod 104 of FIGS. 1J-1K, the parcel pod 180 of FIGS. 1L-1M, and/or the UAV 1102 of FIGS. 11A-11F. In the illustrated example of FIG. 14, the transit controller 122 includes an example network interface 1410, an example sensor interface 1420, an example override controller 1430, an example command generator 1440, and an example database 1450.

In the illustrated example of FIG. 14, the transit controller 122 includes the network interface 1410 to obtain information from and/or transmit information to the network 1304 of FIG. 13. For example, the network interface 1410 may obtain data from and/or transmit data to a different transit controller 122 (e.g., the transit controller 122 associated with the transit carrier 100, 135, the transit controller 122 associated with the passenger pod 102, 155, the transit controller 122 associated with the parcel pod 104, 180, the transit controller associated with the UAV 1102, etc.), the central server 1302, etc., via the network 1304. In other examples, the network interface 1410 can obtain data (e.g., wireless data) from and/or transmit data to the different transit controller 122 via a direct wireless connection (e.g., a radio frequency connection, a wireless connection using wireless messages formatted to and/or otherwise based on a vehicles-to-everything (V2X) protocol, a Bluetooth connection, a Wi-Fi Direct connection, etc.), where the wireless data does not pass through other intervening devices, such as a cellular tower, a gateway, a router, a satellite, etc.

In some examples, the network interface 1410 implements a virtual server (e.g., a web server) that receives information from the network 1304 and/or from a different transit controller 122. For example, the information managed by the network interface 1410 may be formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 14, the transit controller 122 includes the sensor interface 1420 to obtain measurements from one or more sensors and/or sensor systems. For example, the sensor interface 1420 may obtain sensor data from the sensor systems 128, 130, 132, 134 of the transit carrier 100 of FIGS. 1A-1B and/or the transit carrier 135 of FIGS. 1C-1E, the sensor systems 154, 156 of the passenger pod 102 of FIGS. 1F-1G and/or the passenger pod 155 of FIGS. 1H-1I, the sensor systems 176, 178 of the parcel pod 104 of FIGS. 1J-1K and/or the parcel pod 180 of FIGS. 1L-1M, the sensor system 1111 of the UAV 1102 of FIGS. 11A-11F, etc.

In some examples, the sensor interface 1420 configures one or more sensors and/or sensor systems. For example, the sensor interface 1420 may update a configuration (e.g., an alarm setting, a sensor input range, a sensor output range, a calibration factor, etc.) for a sensor associated with the sensor systems 128, 130, 132, 134 of the transit carrier 100 of FIGS. 1A-1B and/or the transit carrier 135 of FIGS. 1C-1E, the sensor systems 154, 156 of the passenger pod 102 of FIGS. 1F-1G and/or the passenger pod 155 of FIGS. 1H-1I, the sensor systems 176, 178 of the parcel pod 104 of FIGS. 1J-1K and/or the parcel pod 180 of FIGS. 1L-1M, the sensor system 1111 of the UAV 1102, etc.

In the illustrated example of FIG. 14, the transit controller 122 includes the override controller 1430 to control the transit carrier 100, 135, the passenger pod 102, 155, the parcel pod 104, 180, the UAV 1102, etc., in response to a command (e.g., a user command) or from the central server 1302 (e.g., an administrator transmitting a command via the central server 1302). In some examples, the override controller 1430 obtains a user command to adjust a direction and/or a speed of the transit carrier 100, 135, the passenger pod 102, 155, the parcel pod 104, 180, the UAV 1102, etc. For example, a user may take manual control of the passenger pod 104, 155 via a joystick, a steering wheel, one or more pedals, or other control means. In such examples, the override controller 1430 can control the powertrain 124 of FIGS. 1A-1E, the second movement systems 152 of FIGS. 1F-1M, the third movement systems 1112 of FIGS. 11A-11D, etc., based on control inputs from the user. In some examples, the override controller 1430 translates the user command into a command to be executed by the command generator 1440.

In the illustrated example of FIG. 14, the transit controller 122 includes the command generator 1440 to generate a command, a direction, an instruction, an invocation, etc., to control the transit carrier 100, 135, the passenger pod 102, 155, the parcel pod 104, 180, the UAV 1102, etc. In some examples, the command generator 1440 generates and transmits a command to the powertrain 124 of the transit carrier 100, 135 to move the transit carrier 100, 135 from a first location to a second location. In some examples, the command generator 1440 generates and transmits an instruction to the second movement systems 152 of the passenger pod 102 to couple to the transit carrier 100, 135. In some examples, the command generator 1440 generates and transmits a command to the second movement systems 152 of the parcel pod 104, 180 to climb on top of a different parcel pod 104, 180 and couple to the parcel pod 104, 180 via the first couplers 115 and the second couplers 816. In some examples, the command generator 1440 generates and transmits a command to the powertrains 1108, 1110 of the UAV 1102 to move the UAV 1102 from a first location to a second location. In some examples, the command generator 1440 generates a command and invokes the network interface 1410 to transmit the command to a different transit controller 122 to control and/or otherwise affect an operation of the different transit controller 122.

In the illustrated example of FIG. 14, the transit controller 122 includes the database 1450 to record data (e.g., a command, a configuration, a GPS location, request, sensor data, etc.). The database 1450 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 1450 may additionally or alternatively be implemented by one or more double data rate (DDR) memories, such as DDR, DDR2, DDR3, DDR4, mobile DDR (mDDR), etc. The database 1450 may additionally or alternatively be implemented by one or more mass storage devices such as hard disk drive(s) (HDD(s)), compact disk (CD) drive(s), digital versatile disk (DVD) drive(s), solid-state disk (SDD) drive(s), etc. While in the illustrated example the database 1450 is illustrated as a single database, the database 1450 may be implemented by any number and/or type(s) of databases. Furthermore, the data stored in the database 1450 may be in any data format such as, for example, binary data, comma delimited data, tab delimited data, structured query language (SQL) structures, etc.

While an example manner of implementing the transit controller 122 of FIGS. 1A-1M, FIGS. 11A-11D, etc., is illustrated in FIG. 14, one or more of the elements, processes, and/or devices illustrated in FIG. 14 may be combined, divided, re-arranged, omitted, eliminated, and/or implemented in any other way. Further, the example network interface 1410, the example sensor interface 1420, the example override controller 1430, the example command generator 1440, the example database 1450, and/or, more generally, the example transit controller 122 of FIGS. 1A-1M, FIGS. 11A-11D, etc., may be implemented by hardware, software, firmware, and/or any combination of hardware, software, and/or firmware. Thus, for example, any of the example network interface 1410, the example sensor interface 1420, the example override controller 1430, the example command generator 1440, the example database 1450, and/or, more generally, the example transit controller 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 1410, the example sensor interface 1420, the example override controller 1430, the example command generator 1440, and/or the example database 1450, is/are hereby expressly defined to include a non-transitory computer readable storage device or storage disk such as a memory, a DVD, a CD, a Blu-ray disk, etc., including the software and/or firmware. Further still, the example transit controller 122 of FIGS. 1A-1M, FIGS. 11A-11D, etc., may include one or more elements, processes, and/or devices in addition to, or instead of, those illustrated in FIG. 14, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 15:
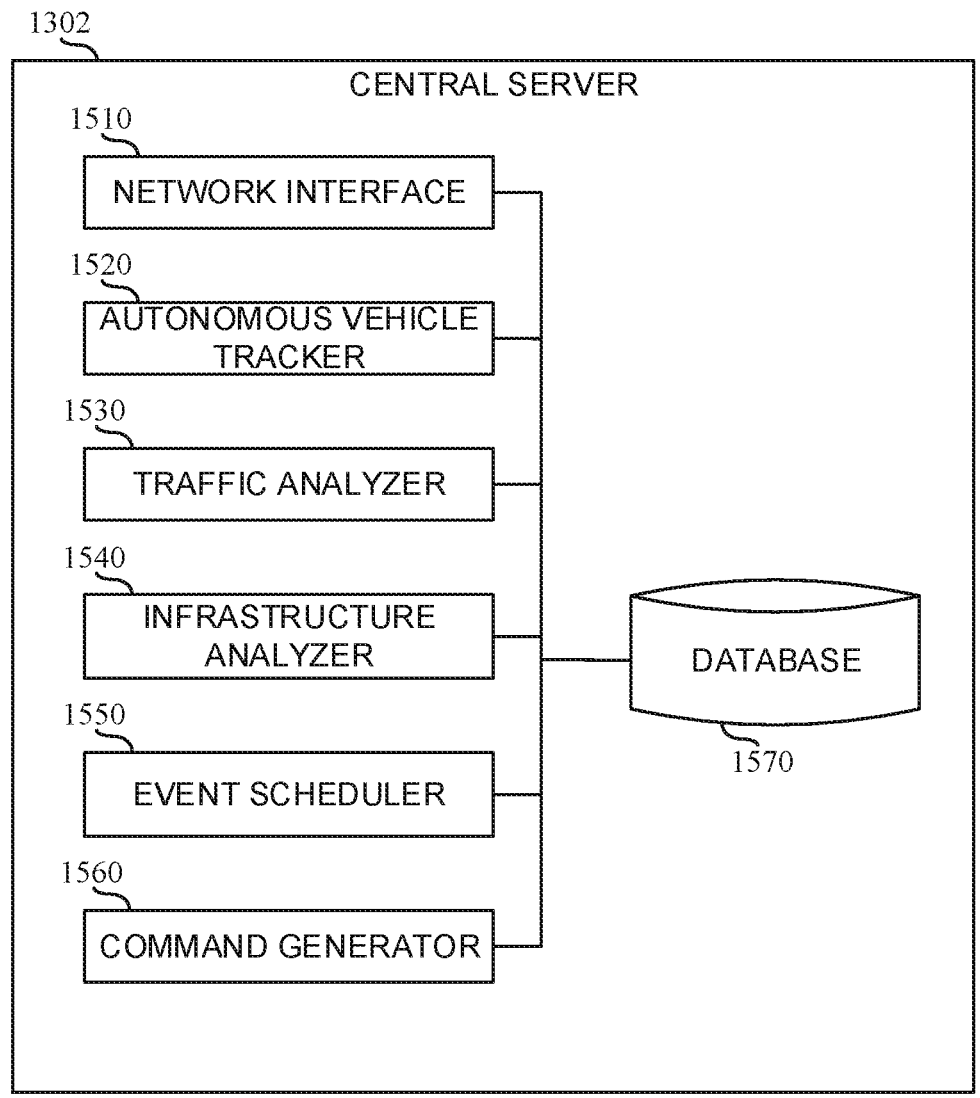
FIG. 15 is an example implementation of a central server.

FIG. 15 is an example implementation of the central server 1302 of FIG. 13. The central server 1302 can be used to facilitate transportation operations associated with the infrastructure 1300 of FIG. 13. A transportation operation can correspond to any activity associated with a land or air-based autonomous vehicle including two or more autonomous vehicles coupling together, autonomous vehicles stacking on top of each other, one autonomous vehicle transporting (e.g., picking up, dropping off, moving, etc.) another autonomous vehicle, etc., in connection with one or more air (e.g., aircraft operations), land (e.g., autonomous vehicle operations, convoy operations, train operations, etc.), and/or sea-based operations (e.g., ferry operations, barge operations, etc.).

In some examples, the central server 1302 corresponds to one or more computer servers, one or more cloud computing environments, and/or, more generally, one or more computing systems that can be used to facilitate transportation operations associated with one or more of the transit carrier 100 of FIGS. 1A-1B, one or more of the transit carrier 135 of FIGS. 1C-1E, one or more of the passenger pod 102 of FIGS. 1F-1G, one or more of the passenger pod 155 of FIGS. 1H-1I, one or more of the parcel pod 104 of FIGS. 1J-1K, one or more of the parcel pod 180 of FIGS. 1L-1M, one or more of the UAVs 1102 of FIGS. 11A-11F, one or more of the convoys 1309 of FIG. 13, etc., and/or a combination thereof. In the illustrated example of FIG. 15, the central server 1302 includes an example network interface 1510, an example autonomous vehicle tracker 1520, an example traffic analyzer 1530, an example infrastructure analyzer 1540, an example event scheduler 1550, an example command generator 1560, and an example database 1570.

In the illustrated example of FIG. 15, the central server 1302 includes the network interface 1510 to obtain information from and/or transmit information to the network 1304 of FIG. 13. For example, the network interface 1510 may obtain data from and/or transmit data to one or more transit controllers 122 (e.g., the transit controllers 122 associated with the transit carrier 100, 135, the passenger pod 102, 155, the parcel pod 104, 180, the UAV 1102, etc.), the convoys 1309, the UAVs 1102, etc., and/or a combination thereof via the network 1304.

In some examples, the network interface 1510 implements a web server that receives information from the network 1304. For example, the information managed by the network interface 1510 may be formatted as one or more HTTP messages. However, any other message format and/or protocol may additionally or alternatively be used such as, for example, FTP, SMTP, HTTPS protocol, etc.

In the illustrated example of FIG. 15, the central server 1302 includes the autonomous vehicle tracker 1520 to determine a location (e.g., a GPS location) of one or more autonomous vehicles including, for example, the transit carrier 100, 135, the transit pods 102, 104, 155, 180, the first land vehicle 200 of FIGS. 2B, 3B, 4B, the second land vehicle 400 of FIG. 4D, the third land vehicle 500 of FIG. 5B, the fourth land vehicle 510 of FIG. 5D, the convoys 1309 of FIG. 13, the UAVs 1102 of FIGS. 11A-11F, the convoy 1309, etc., within and/or otherwise in association with the infrastructure 1300 of FIG. 13.

Figure 16A:
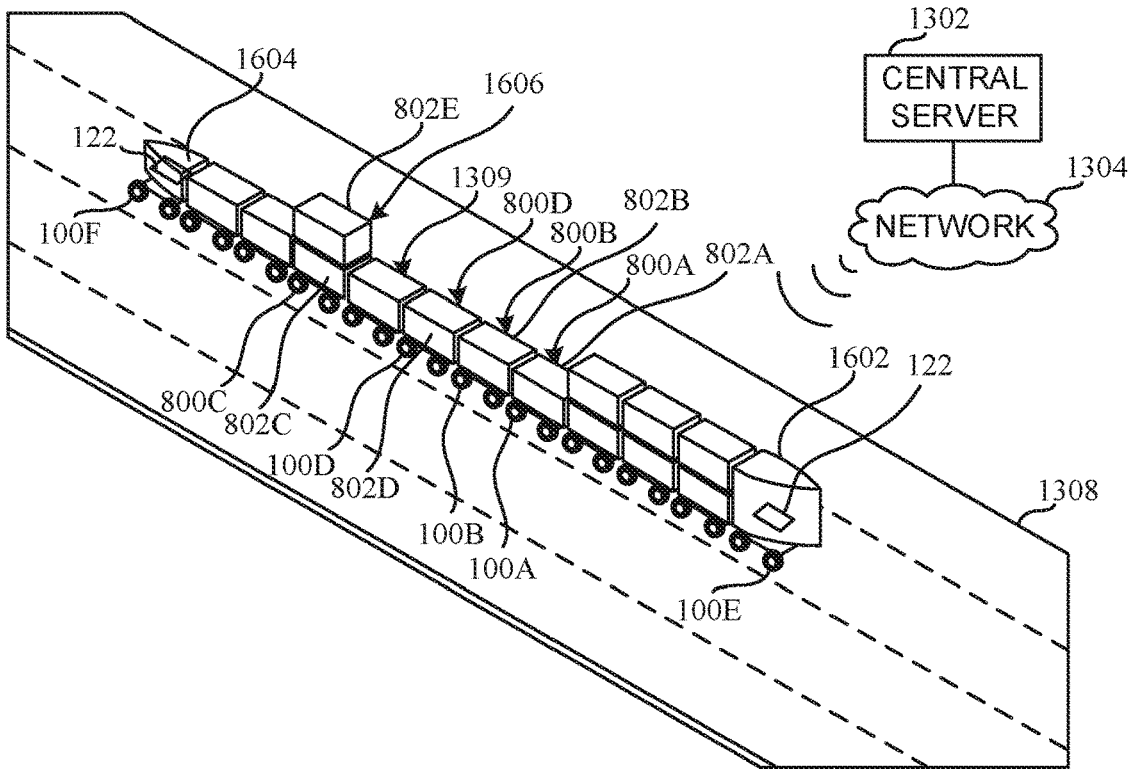
FIG. 16A depicts an example convoy.
Figure 16B:
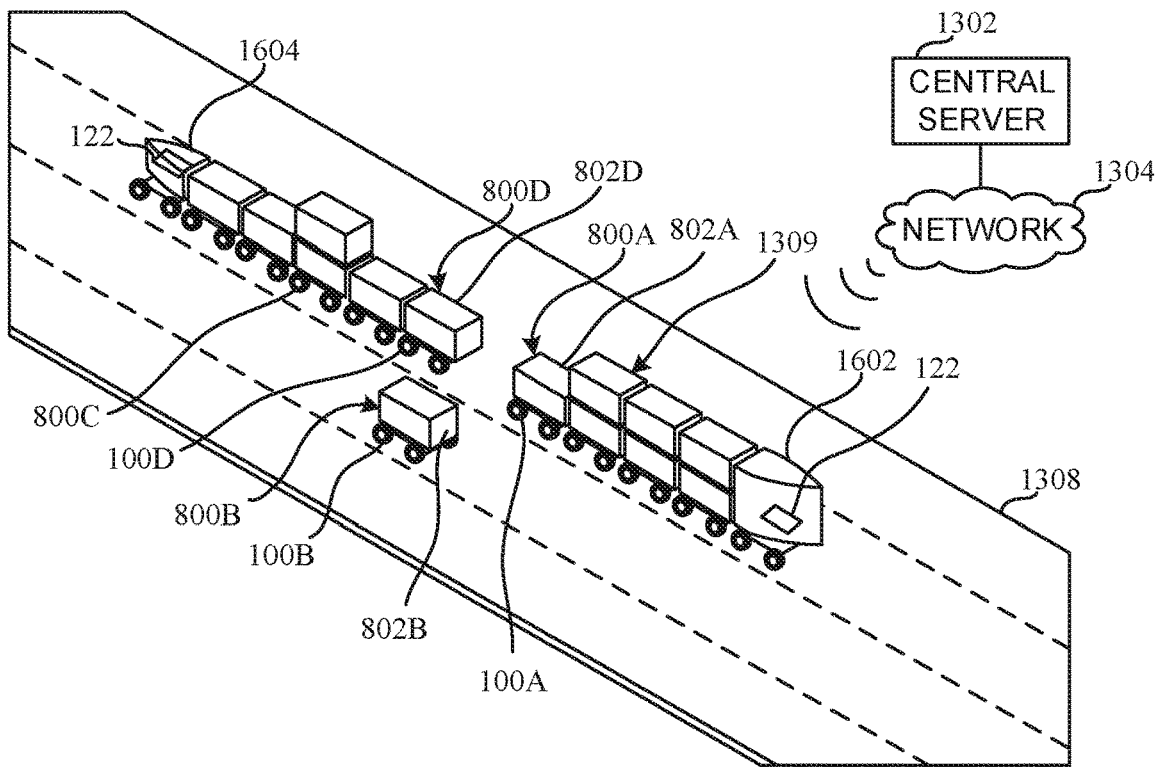
FIG. 16B depicts an example land vehicle interacting with the example convoy of FIG. 16A.

In some examples, the autonomous vehicle tracker 1520 obtains convoy inventory information associated with the convoy 1309 from the transit controller 122 of one or both of the powertrain vehicles 1602, 1604 of FIGS. 16A-16B. In such examples, the autonomous vehicle tracker 1520 can determine that the convoy 1309 includes the powertrain vehicles 1602, 1604, the land vehicles 800A-D, etc., an order of coupling (e.g., the second land vehicle 800B is coupled between the first land vehicle 800A and the fourth land vehicle 800D), etc. In some examples, autonomous vehicle tracker 1520 identifies a position for the transit pod to join a convoy of interest based on the convoy inventory information. For example, the autonomous vehicle tracker 1520 can determine that the second land vehicle 800B can join the convoy 1309 at a position between the first land vehicle 800A and the fourth land vehicle 800D.

In some examples, the autonomous vehicle tracker 1520 determines an availability or status of one or more autonomous vehicles. For example, the autonomous vehicle tracker 1520 may determine whether one or more of the transit carriers 100, 135, the transit pods 102, 104, 155, 180, the land vehicles 200, 400, 500, 510, the convoys 1309, the UAVs 1102, etc., are (1) not performing a transportation operation and, thus, available for dispatch or use or (2) performing a transportation operation and, thus, not available for dispatch or use. In some examples, the autonomous vehicle tracker 1520 determines a position between transit carriers 100, 135 of the convoy 1309 for an incoming transit carrier 100, 135 to join as described below in connection with FIGS. 16A-16B.

In the illustrated example of FIG. 15, the central server 1302 includes the traffic analyzer 1530 to determine existing traffic flows and/or predict future traffic flows associated with the infrastructure 1300. In some examples, the traffic analyzer 1530 determines existing traffic on the roadway 1308 of FIG. 13 based on a quantity and/or types of autonomous vehicles on the roadway 1308. In some examples, the traffic analyzer 1530 predicts future traffic based on the existing traffic and one or more requests (e.g., from a user, from the transit controller 122 of the transit pods 102, 104, 155, 180, etc.) for transportation operations to be conducted or executed. In some examples, the traffic analyzer 1530 determines existing or predicts future traffic based on traffic information obtained from traffic infrastructure including, for example, traffic cameras, traffic lights, etc., monitoring and/or otherwise associated with the roadway 1308. In some examples, the traffic analyzer 1530 determines whether an autonomous vehicle is to join a convoy, such as the convoy 1309 of FIG. 13, based on the traffic analysis and/or determinations. In such examples, the traffic analyzer 1530 can determine whether a request for a transit pod to join a convoy of interest been obtained. For example, the event scheduler 1550 may obtain a request from the second land vehicle 800B to join the convoy 1309.

In the illustrated example of FIG. 15, the central server 1302 includes the infrastructure analyzer 1540 to determine existing infrastructure utilization and/or predict future infrastructure utilizations associated with the infrastructure 1300. In some examples, the infrastructure analyzer 1540 determines a utilization of the carrier facility 1310, the pod facility 1312, the UAV port 1314, the stacking facility 1330, etc., of FIG. 13. For example, the infrastructure analyzer 1540 may determine whether one or more pads 1316 of the UAV port 1314 are available for use by the UAVs 1102. In other examples, the infrastructure analyzer 1540 can determine whether the carrier facility 1310 and/or the pod facility 1312 has any storage and/or maintenance openings or availabilities. In yet other examples, the infrastructure analyzer 1540 can determine whether the stacking facility 1330 has available space on the ramp 1334 for a stacking operation to be executed.

In the illustrated example of FIG. 15, the central server 1302 includes the event scheduler 1550 to coordinate transportation operations. In some examples, the event scheduler 1550 determines an order of transportation operations. For example, in response to a request to move a passenger pod 102, 155 from one of the residences 1306 to the UAV port 1314, the event scheduler 1550 may determine an order of transportation operations. In such examples, the order of transportation operations can include a first transportation operation of identifying and dispatching an available transit carrier 100, 135 from the carrier facility 1310 to the requesting one of the residences 1306, a second transportation operation of coupling the passenger pod 102, 155 to the dispatched transit carrier 100, 135 to form the first land vehicle 200 of FIGS. 2B, 3B, and 4B, a third transportation operation of joining the first land vehicle 200 with the convoy 1309 of FIG. 13, a fourth transportation operation of disengaging the first land vehicle 200 with the convoy 1309 when the convoy 1309 approaches an exit of the roadway 1308 proximate the UAV port 1314, a fifth transportation operation of moving the first land vehicle 200 to an available pad 1316 of the UAV port 1314, etc. In such examples, the event scheduler 1550 can generate and/or maintain a transportation operation queue including the order of transportation operations or update an existing transportation operation queue associated with an entirety of the infrastructure 1300 to schedule and/or otherwise include the order of transportation operations described above.

In some examples, the event scheduler 1550 generates and/or determines convoy travel path information. In some examples, the event scheduler 1550 can generate convoy travel path information including GPS data, turn-by-turn directions, one or more waypoints connecting a plurality of locations to be traversed, etc. In such examples, the event scheduler 1550 can transmit the convoy travel path information to one or more transit pods, autonomous vehicles, etc., of the convoy 1309 of FIG. 13 to execute and/or otherwise implement. In other examples, the event scheduler 1550 can store the convoy travel path information in the database 1570 to be used by the central server 1302 for other purposes. For example, the traffic analyzer 1530 may determine existing traffic flows and/or predict future traffic flows based on the convoy travel path information stored in the database 1570.

In the illustrated example of FIG. 15, the central server 1302 includes the command generator 1560 to generate and transmit commands to an autonomous vehicle communicatively coupled to the network 1304 of FIG. 13 to facilitate a transportation operation associated with an asset of the infrastructure 1300 of FIG. 13. In some examples, the command generator 1560 transmits a command to one or more of the transit carrier 100, 135, one or more of the transit pod 102, 104, 155, 180, one or more of the land vehicles 200, 400, 500, 510, etc., via the network 1304. For example, the command generator 1560 may transmit a command to an available transit carrier 100, 135 at the carrier facility 1310 to invoke the available transit carrier 100, 135 to move to a different location to execute a transportation operation.

In some examples, the command generator 1560 controls the convoys 1309 traveling on the roadway 1308. For example, the command generator 1560 can generate and transmit commands to the convoy 1309 to invoke the convoy 1309 to travel to different areas of the infrastructure 1300 proximate and/or otherwise along the roadway 1308. In some examples, the command generator 1560 performs air traffic control functions by coordinating and/or otherwise controlling movement of the UAVs 1102 to not conflict with movement of different UAVs 1102.

In the illustrated example of FIG. 15, the central server 1302 includes the database 1570 to record data (e.g., a command, an event schedule, a GPS location, a request, infrastructure utilization, traffic information, etc.). The database 1570 may be implemented by a volatile memory (e.g., a SDRAM, DRAM, RDRAM, etc.) and/or a non-volatile memory (e.g., flash memory). The database 1570 may additionally or alternatively be implemented by one or more DDR memories, such as DDR, DDR2, DDR3, DDR4, mDDR, etc. The database 1570 may additionally or alternatively be implemented by one or more mass storage devices such as HDD(s), CD drive(s), DVD drive(s), SSD drive(s), etc. While in the illustrated example the database 1570 is illustrated as a single database, the database 1570 may be implemented by any number and/or type(s) of databases. Furthermore, the data stored in the database 1570 may be in any data format such as, for example, binary data, comma delimited data, tab delimited data, SQL structures, etc.

While an example manner of implementing the central server 1302 of FIG. 13 is illustrated in FIG. 15, one or more of the elements, processes, and/or devices illustrated in FIG. 15 may be combined, divided, re-arranged, omitted, eliminated, and/or implemented in any other way. Further, the example network interface 1510, the example autonomous vehicle tracker 1520, the example traffic analyzer 1530, the example infrastructure analyzer 1540, the example event scheduler 1550, the example command generator 1560, the example database 1570, and/or, more generally, the example central server 1302 of FIG. 13 may be implemented by hardware, software, firmware, and/or any combination of hardware, software, and/or firmware. Thus, for example, any of the example network interface 1510, the example autonomous vehicle tracker 1520, the example traffic analyzer 1530, the example infrastructure analyzer 1540, the example event scheduler 1550, the example command generator 1560, the example database 1570, and/or, more generally, the example central server 1302 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example network interface 1510, the example autonomous vehicle tracker 1520, the example traffic analyzer 1530, the example infrastructure analyzer 1540, the example event scheduler 1550, the example command generator 1560, and/or the example database 1570 is/are hereby expressly defined to include a non-transitory computer readable storage device or storage disk such as a memory, a DVD, a CD, a Blu-ray disk, etc., including the software and/or firmware. Further still, the example central server 1302 of FIG. 13 may include one or more elements, processes, and/or devices in addition to, or instead of, those illustrated in FIG. 15, and/or may include more than one of any or all of the illustrated elements, processes, and devices.

FIG. 16A depicts the convoy 1309 of FIG. 13 on the roadway 1308 of FIG. 13. The convoy 1309 includes a plurality of autonomous vehicles coupled together using magnetic couplers to facilitate operation of high-traffic density transportation pathways, such as the roadways 1308. The autonomous vehicles are disposed between a first example powertrain vehicle 1602 and a second example powertrain vehicle 1604. Alternatively, the convoy 1309 may not include one or both powertrain vehicles 1602, 1604. For example, the convoy 1309 may include only the plurality of autonomous vehicles, where one or more of the plurality of autonomous vehicles use the respective powertrain(s) of the one or more of the plurality of autonomous vehicles to drive the convoy 1309 (e.g., to drive the convoy in unison).

In the illustrated example of FIG. 16A, the powertrain vehicles 1602, 1604 are autonomous vehicles including the transit carrier 100 of FIGS. 1A-1B that have exterior surfaces having a form or shape that is configured to improve aerodynamic properties of the convoy 1309. For example, the first powertrain vehicle 1602 includes a first transit carrier 100E and the second powertrain vehicle 1604 includes a second transit carrier 100F. Alternatively, one or both powertrain vehicles 1602, 1604 may include the transit carrier 135 of FIGS. 1C-1E. The powertrain vehicles 1602, 1604 have curved exterior surfaces to reduce drag and improve power efficiency of the convoy 1309.

In FIG. 16A, the powertrain vehicles 1602, 1604 include the transit controller 122 of FIGS. 1A-1M to control operation of the powertrain vehicles 1602, 1604. For example, the transit controller 122 of the powertrain vehicles 1602, 1604 can be communicatively coupled to the central server 1302 of FIG. 13 via the network 1304 of FIG. 13. In such examples, the transit controller 122 of the powertrain vehicles 1602, 1604 can transmit wireless data, such as convoy inventory information (e.g., a listing, an inventory, or associated information of the autonomous vehicles in the convoy 1309) and/or convoy travel path information (e.g., GPS data, turn-by-turn directions, one or more waypoints connecting a plurality of locations to be traveled to by the convoy 1309, etc.) to and/or receive wireless data (e.g., a command, a request for data, etc.) from the central server 1302.

In FIG. 16A, one or both powertrain vehicles 1602, 1604 can include a powertrain that includes one or more electric motors, one or more transmissions, one or more drive shafts, one or more differentials, one or more axles, a final drive, multiple wheels, etc., to steer and/or otherwise control the powertrain vehicles 1602, 1604 to facilitate movement of the powertrain vehicles 1602, 1604. In some examples, one or both of the powertrain vehicles 1602, 1604 can include a power source including one or more batteries (e.g., lithium-ion batteries), one or more chemical-based power sources (e.g., gasoline, hydrogen, etc.) that can provide fuel for the powertrain to burn and/or otherwise use to enable movement capability of the powertrain vehicles 1602, 1604. In some examples, the power source of the powertrain vehicles 1602, 1604 can provide power to the switching unit 120 of the transit carrier 100, 135 coupled to the corresponding one of the powertrain vehicles 1602, 1604 to change the polarity of the electromagnet coil(s) of one or both magnetic couplers 116, 118 of FIGS. 1A-1E.

In some examples, the power source of at least one of the first powertrain vehicle 1602 or the second powertrain vehicle 1604 charges the power source 126 of one or more of the transit carrier 100, 135 included in the convoy 1309. For example, the power source of the first powertrain vehicle 1602 may charge the power source 126 of the transit carrier 100, 135 of a first land vehicle 800A, a power source associated with the transit pod 802 of the first land vehicle 800A, etc. In such examples, the power source of the first powertrain vehicle 1602 can charge the power source associated with the first land vehicle 800A via a daisy-chain electrical connection established through the magnetic couplers 116, 118 of the transit carrier 100, 135 of the convoy 1309. For example, the power source of the first powertrain vehicle 1602 can charge the power source associated with the first land vehicle 800A via the second magnetic coupler 118 of the transit carrier 100E and intervening magnetic couplers 116, 118 between the transit carrier 100E of the first powertrain vehicle 1602 and the transit carrier 100A of the first land vehicle 800A. In such examples, the central server 1302 and/or the transit controller 122 of the first powertrain vehicle 1602 can instruct the first powertrain vehicle 1602 to charge the power source associated with the first land vehicle 800A.

In the illustrated example of FIG. 16A, the convoy 1309 includes land vehicles 800A, 800B, 800C, 800D corresponding to the land vehicle 800 of FIGS. 8A-8D. The land vehicles 800A, 800B, 800C, 800D include a first land vehicle 800A, a second land vehicle 800B, a third land vehicle 800C, and a fourth land vehicle 800D with each land vehicle including a respective transit pod 802A, 802B, 802C, 802D, 802E corresponding to the transit pod 802 of FIGS. 8A-8D and a respective transit carrier 100A, 100B, 100C, 100D corresponding to the transit carrier 100 of FIGS. 1A-1B. Alternatively, the land vehicles 800A-D may include the transit carrier 135 of FIGS. 1C-1E. In FIG. 16A, the third land vehicle 800C has a transit pod 802E stacked on top of the transit pod 802C of the third land vehicle 800C. The stacked ones of the transit pods 802C, 802E form an example stacked vehicle (e.g., a stacked land vehicle) 1606 described below in connection with FIG. 22. For example, the second couplers 816 of the transit pod 802E can be coupled to the first couplers 115 of the transit pod 802C.

In the illustrated example of FIG. 16A, the first land vehicle 800A is coupled (e.g., magnetically coupled) to the second land vehicle 800B. For example, the second magnetic coupler 118 of the first transit carrier 100A can be coupled to the first magnetic coupler 116 of the second transit carrier 100B.

FIG. 16B depicts the second land vehicle 800B interacting with the convoy 1309 of FIG. 16A. In some examples, FIG. 16B depicts the second land vehicle 800B joining the convoy 1309. For example, the transit controller 122 of the second land vehicle 800B (e.g., the transit controller 122 of the transit carrier 100B, the transit controller 122 of the transit pod 802B, etc., and/or a combination thereof) may generate and transmit a request to the central server 1302 of FIG. 13 to move from a first location in the infrastructure 1300 of FIG. 13 to a second location different from the first location in the infrastructure 1300. In response to the request, the central server 1302 can instruct the second land vehicle 800B to join the convoy 1309. In some examples, the central server 1302 identifies a position between the powertrain vehicles 1602, 1604 for the second land vehicle 800B to join and/or otherwise occupy. In some examples, the transit controller 122 of one or both powertrain vehicles 1602, 1604 determine the position.

In FIG. 16B, when the determined position is between the first transit vehicle 800A and the fourth land vehicle 800D, the central server 1302 and/or the transit controllers 122 of the powertrain vehicles 1602, 1604 can instruct the first land vehicle 800A and the fourth land vehicle 800D to separate from each other. For example, the central server 1302 can transmit a first command to the transit controller 122 of the first transit carrier 100A and a second command to the transit controller 122 of the fourth transit carrier 100D. In response to obtaining the first command, the transit controller 122 of the first transit carrier 100A can invoke the corresponding switching unit 120 to turn off the second magnetic coupler 118 of the first transit carrier 100A. In response to obtaining the second command, the transit controller 122 of the fourth transit carrier 100D can invoke the corresponding switching unit 120 to turn off the first magnetic coupler 116 of the fourth transit carrier 100D. In some examples, the central server 1302 commands the fourth land vehicle 800D and all autonomous vehicles behind the fourth land vehicle 800D to adjust speed from a first speed to a second speed, where the second speed is slower than the first speed. Advantageously, the central server 1302 can synchronize the speed adjustments so that the fourth land vehicle 800D and all autonomous vehicles behind the fourth land vehicle 800D slow down to the second speed substantially simultaneously.

In response to the first and fourth land vehicles 800A, 800D being separated, the second land vehicle 800B can be directed to join the convoy in the opening formed by the separation. For example, the central server 1302 can transmit a third command to the transit controller 122 of the second transit carrier 100B to join the convoy in the opening. In such examples, the second land vehicle 800B can join the convoy 1309 at the first speed, the second speed, or a different non-zero speed. In response to the second land vehicle 800B moving between the first and fourth land vehicles 800A, 800D, the second land vehicle 800B can couple to the first and fourth land vehicles 800A, 800D. For example, the central server 1302 can transmit (1) a fourth command to the first transit carrier 100A to enable the second magnetic coupler 118 of the first transit carrier 100A and (2) a fifth command to the second transit carrier 100B to enable the first magnetic coupler 116 of the second transit carrier 100B to facilitate the coupling of (3) the first magnetic coupler 116 of the second transit carrier 100B to (4) the second magnetic coupler 118 of the first transit carrier 100A.

In response to the first and second land vehicles 800A, 800B being coupled, the central server 1302 can transmit commands to the fourth land vehicle 800D and all autonomous vehicles behind the fourth land vehicle 800D to adjust from the second speed to a third speed faster than the second speed to catch up to the second land vehicle 800B. The fourth land vehicle 800D and all autonomous vehicles behind the fourth land vehicle 800D can adjust from the third speed to the first speed based on sensor measurements of one or more sensor systems (e.g., the sensor systems 154, 156 of FIGS. 1F-1I, the sensor systems 176, 178 of FIGS. 1J-1M, etc.). For example, the one or more sensor systems can indicate to the fourth land vehicle 800D that the second land vehicle 800B is in a proximate position for coupling and the speed of the fourth land vehicle 800D is to be reduced to avoid substantial contact or collision with the second land vehicle 800B.

In response to the fourth land vehicle 800D moving to a coupling position proximate the second land vehicle 800B, the central server 1302 can generate (1) a sixth command to the second transit carrier 100B to enable the second magnetic coupler 118 of the second transit carrier 100B and (2) a seventh command to the fourth transit carrier 100D to enable the first magnetic coupler 116 of the fourth transit carrier 100D to facilitate the coupling of (3) the first magnetic coupler 116 of the fourth transit carrier 100D to (4) the second magnetic coupler 118 of the second transit carrier 100B. A process corresponding to the second land vehicle 800B separating from the convoy 1309 is implemented substantially in reverse of the process described above for the second land vehicle 800B joining the convoy 1309.

In some examples, FIG. 16B depicts the second land vehicle 800B leaving the convoy 1309. For example, the transit controller 122 of the second land vehicle 800B may generate and transmit a request to the central server 1302 via the network 1304 of FIG. 13 to move from a first location in the infrastructure 1300 of FIG. 13 to a second location different from the first location in the infrastructure 1300. In response to the request, the central server 1302 can instruct the second land vehicle 800B to leave the convoy 1309 in response to the second land vehicle 800B and/or, more generally, the convoy 1309, moving to a third location that is proximate the second location (e.g., an exit of the roadway 1308 that is near and/or otherwise proximate the second location).

To facilitate the second land vehicle 800B leaving the convoy 1309, the central server 1302 via the network 1304 can (1) transmit a first command to the transit controller 122B of the second transit carrier 100B to turn off the second magnetic coupler 118 of the second transit carrier 100B, (2) transmit a second command to the transit controller 122B of the fourth transit carrier 100D to turn off the first magnetic coupler 116 of the fourth transit carrier 100D, and (3) transmit a third command to the transit controller 122B of the fourth transit carrier 100D and all autonomous vehicles behind the fourth transit carrier 100D to adjust from a first speed to a second speed slower than the first speed. Accordingly, the fourth transit carrier 100D can decouple from the second transit carrier 100B and the fourth transit carrier 100D and all autonomous vehicles behind the fourth transit carrier 100D can slow down to create separation from the second transit carrier 100B.

In response to a sufficient separation (e.g., 1 meter, 2 meters, 5 meters, etc.) being generated (e.g., in response to a LIDAR system of one or more of the sensor systems 128, 130, 132, 134 of the second transit carrier 100B detecting the sufficient separation), the central server 1302 via the network 1304 can transmit (4) a fourth command to the transit controller 122 of the first transit carrier 100A to turn off the second magnetic coupler 118 of the first transit carrier 100A, (5) transmit a fifth command to the transit controller 122 of the second transit carrier 100B to turn off the first magnetic coupler 116 of the second transit carrier 100B, and (6) transmit a sixth command to the transit controller 122 of the second transit carrier 100B to adjust from the first speed to the second speed or a third speed slower than the first speed. Accordingly, the second transit carrier 100B can decouple from the first transit carrier 100A and can slow down to create separation from the first transit carrier 100A. In response to a sufficient separation being generated (e.g., in response to a LIDAR system of one or more of the sensor systems 128, 130, 132, 134 of the second transit carrier 100B detecting the sufficient separation), the central server 1302 can transmit a seventh command to the transit controller 122 of the second transit carrier 100B to move to the second location.

Figure 16C:
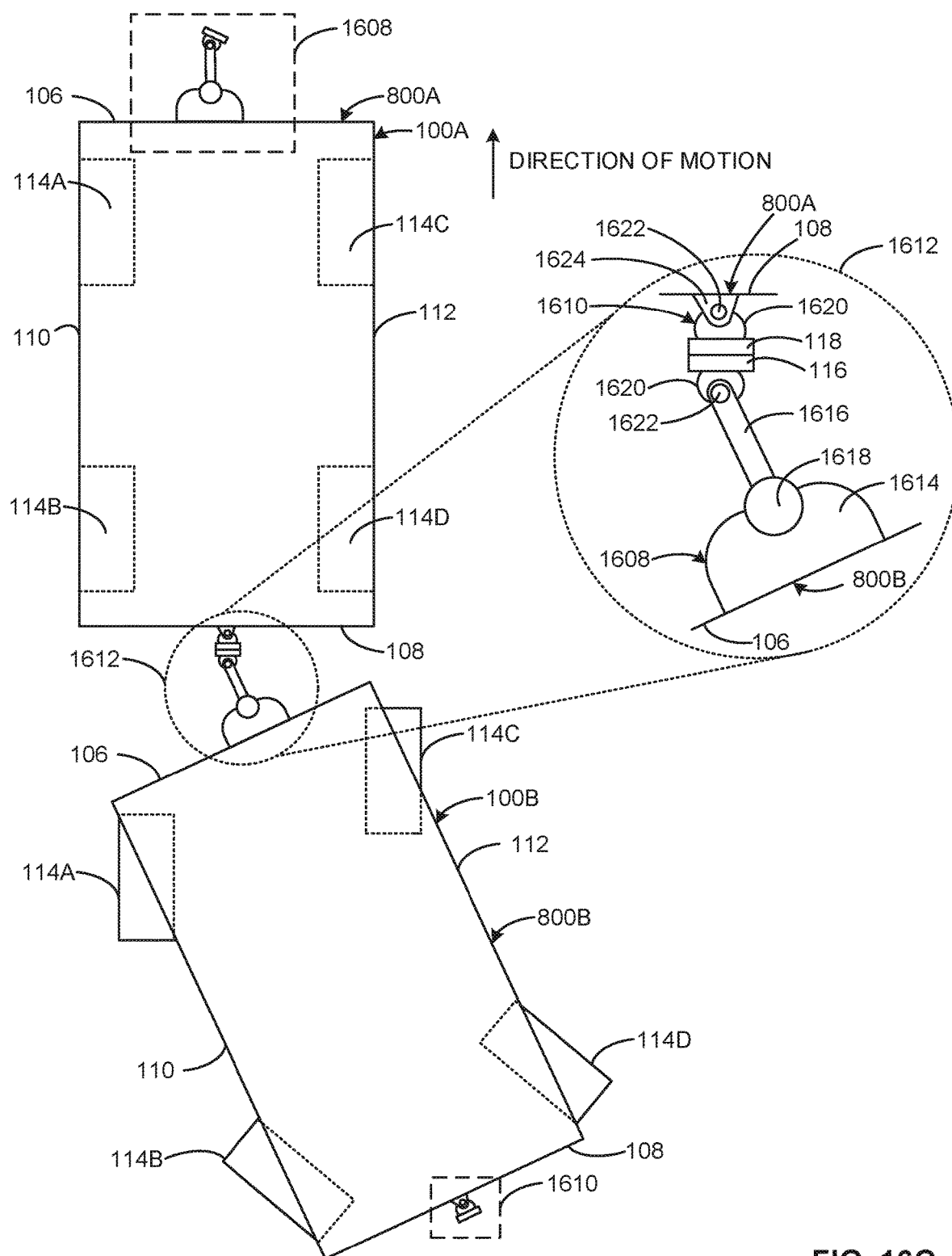
FIG. 16C depicts a top view of a first example implementation of the example land vehicle of FIG. 16B coupled to another example land vehicle of the example convoy of FIG. 16A.

FIG. 16C depicts a top view of a first example implementation of the first land vehicle 800A of FIGS. 16A-16B coupled to the second land vehicle 800B of FIGS. 16A-16B. In FIG. 16C, the transit carriers 100A, 100B of the land vehicles 800A, 800B have first example magnetic coupling systems 1608 and second example magnetic coupling systems 1610. In FIG. 16C, the first and second magnetic coupling systems 1608, 1610 include a first example implementation of the magnetic couplers 116, 118 of FIGS. 1A-1E. For example, the first implementation corresponds to the magnetic couplers 116, 118 having substantially flat circular exterior surfaces.

In FIG. 16C, the transit carriers 100A, 100B have the first magnetic coupling systems 1608 coupled, affixed, and/or otherwise attached to the front surface 106 of the transit carriers 100A, 100B. The transit carriers 100A, 100B have the second magnetic coupling systems 1610 coupled, affixed, and/or otherwise attached to the rear surface 108 of the transit carriers 100A, 100B. Depicted in an enlarged view 1612 of FIG. 16C, the second magnetic coupling system 1610 of the first transit carrier 100A is coupled (e.g., magnetically coupled) to the first magnetic coupling system 1608 of the second transit carrier 100B.

In the illustrated example of FIG. 16C, the first magnetic coupling system 1608 includes an example base 1614 coupled to the front surface 106 of a respective one of the transit carriers 100A, 100B. The first magnetic coupling system 1608 includes an example elongated member (e.g., an arm, an elongated mechanical support, a lever, etc.) 1616 pivotably coupled to the base 1614 via an example joint (e.g., a pivotable joint) 1618. For example, the joint 1618 may be a ball-and-socket joint, a hinge joint, etc. In some examples, the base 1614 is coupled to the front surface 106 using one or more springs, air cushions, shock absorbers, etc., and/or a combination thereof. The elongated member 1616 can pivot about the joint 1618 in response to changes in direction of the second magnetic coupling system 1610. In FIG. 16C, the elongated member 1616 is pivotably coupled to the first magnetic coupler 116 of a respective one of the transit carriers 100A, 100B via a ball mount that includes a ball 1620 and a pin 1622. The pin 1622 secures and/or otherwise attaches the ball 1620 to the elongated member 1616. Alternatively, the ball 1620 may have any other shape. In FIG. 16C, the ball 1620 is coupled to the first magnetic coupler 116.

In the illustrated example of FIG. 16C, the second magnetic coupling system 1610 includes an example base 1624 coupled to the rear surface 108 of a respective one of the transit carriers 100A, 100B. In FIG. 16C, the base 1624 is pivotably coupled to the ball 1620 via the pin 1622. The ball 1620 of the second magnetic coupling system 1610 is coupled to the second magnetic coupler 118 of a respective one of the transit carriers 100A, 100B. Advantageously, the first and second magnetic coupling systems 1608, 1610 facilitate changes in direction by one of the transit carriers 100A, 100B. For example, in response to the first transit carrier 100A changing direction, the second transit carrier 100B can remain magnetically coupled to the first transit carrier 100A and adjust direction accordingly.

Figure 16D:
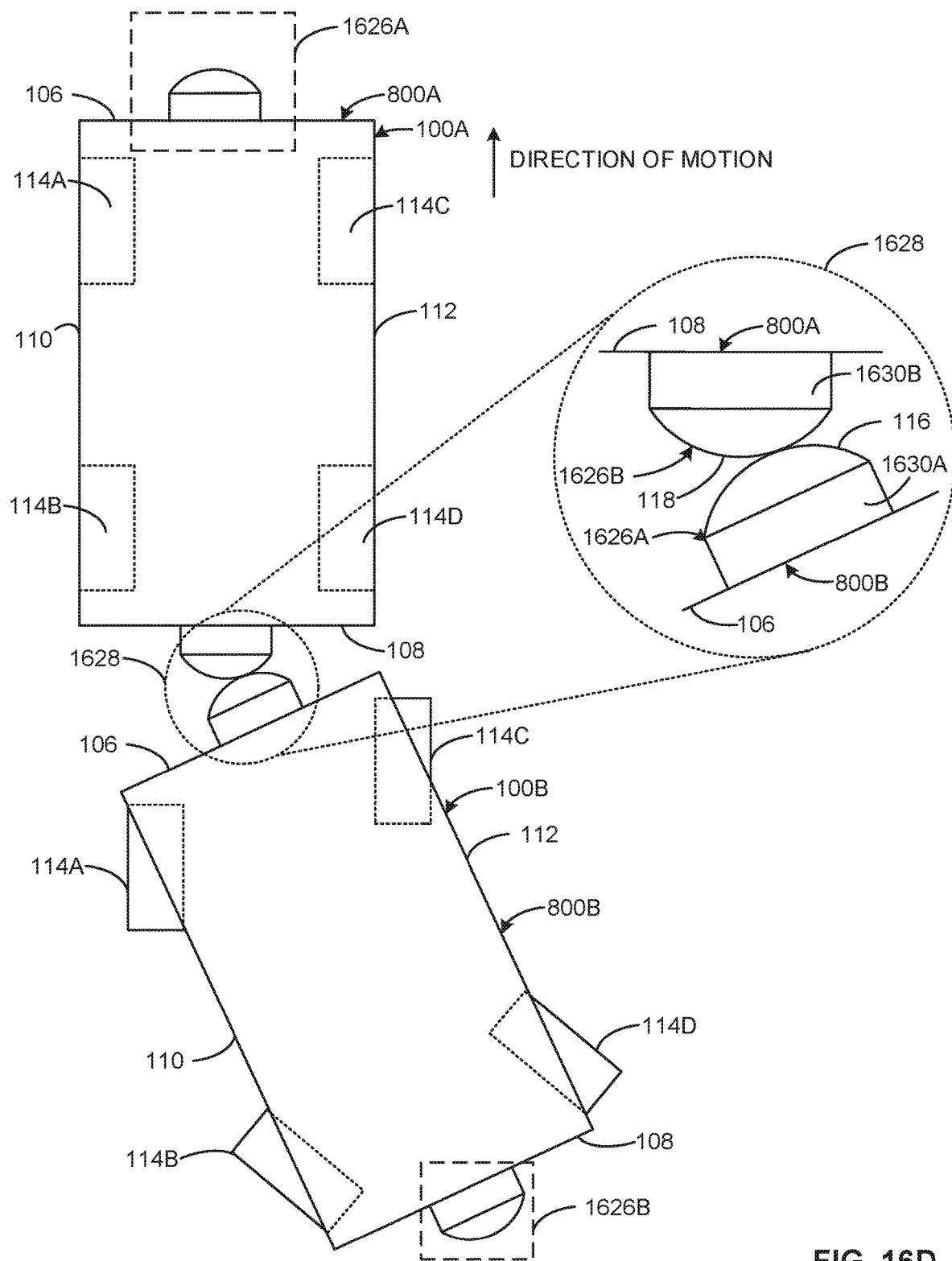
FIG. 16D depicts a top view of a second example implementation of the example land vehicle of FIG. 16B coupled to another example land vehicle of the example convoy of FIG. 16A.

FIG. 16D depicts a top view of a second example implementation of the first land vehicle 800A of FIGS. 16A-16B coupled to the second land vehicle 800B of FIGS. 16A-16B. In FIG. 16D, the transit carriers 100A, 100B of the land vehicles 800A, 800B have third example magnetic coupling systems 1626A and fourth example magnetic coupling systems 1626B. In FIG. 16D, the third and fourth magnetic coupling systems 1626A, 1626B include a second example implementation of the magnetic couplers 116, 118 of FIGS. 1A-1E. For example, the second implementation corresponds to the magnetic couplers 116, 118 having semi-spherical concave-shaped exterior surfaces that protrude away from a respective one of the transit carrier 100A-B. Advantageously, the concave-shaped exterior surfaces of the magnetic couplers 116, 118 eliminate a need for the moveable components (e.g., the elongated member 1616, the joint 1618, etc.) described above in connection with FIG. 16C.

In FIG. 16D, the transit carriers 100A, 100B have the third magnetic coupling systems 1626A coupled, affixed, and/or otherwise attached to the front surface 106 of the transit carriers 100A, 100B. The transit carriers 100A, 100B have the fourth magnetic coupling systems 1626B coupled, affixed, and/or otherwise attached to the rear surface 108 of the transit carriers 100A, 100B. Depicted in an enlarged view 1628 of FIG. 16D, the fourth magnetic coupling system 1626B of the first transit carrier 100A is coupled (e.g., magnetically coupled) to the third magnetic coupling system 1626A of the second transit carrier 100B.

In the illustrated example of FIG. 16D, the third and fourth magnetic coupling systems 1626A-B include a respective example base 1630A-B coupled to a respective one of the magnetic couplers 116, 118. In FIG. 16D, the base 1630A of the third magnetic coupling system 1626A is coupled to the front surface 106 of a respective one of the transit carriers 100A, 100B. In FIG. 16D, the base 1630B of the fourth magnetic coupling system 1626B is coupled to the rear surface 108 of a respective one of the transit carriers 100A, 100B. Advantageously, the third and fourth magnetic coupling systems 1626A-B facilitate changes in direction by one of the transit carriers 100A, 100B. For example, in response to the first transit carrier 100A changing direction, the second transit carrier 100B can remain magnetically coupled to the first transit carrier 100A and adjust direction accordingly.

Figure 17:
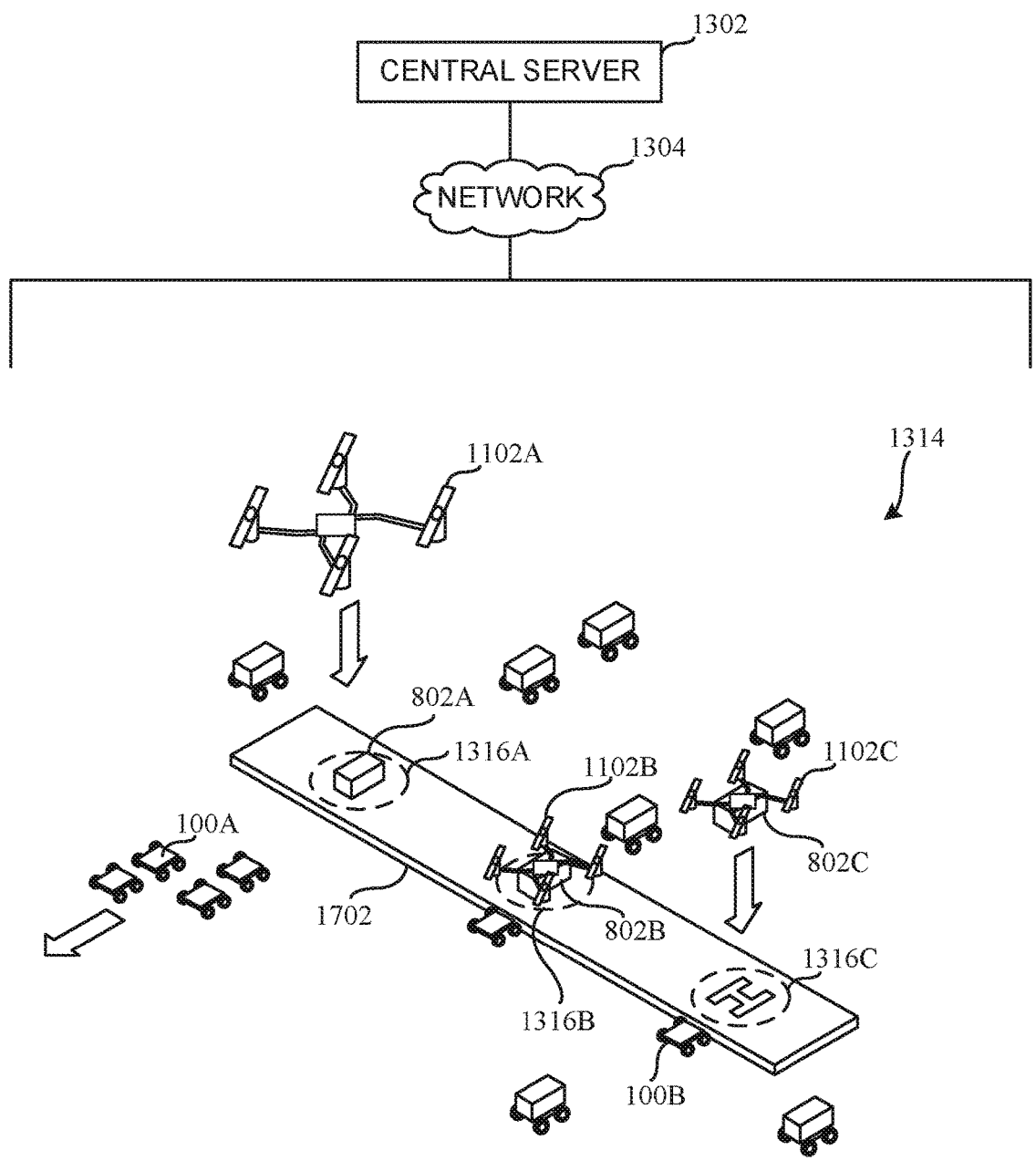
FIG. 17 depicts an example unmanned aerial vehicle port.

FIG. 17 depicts the UAV port 1314 of FIG. 13. The UAV port 1314 includes example pads 1316A, 1316B, 1316C on an example UAV platform 1702 including a first example pad 1316A, a second example pad 1316B, and a third example pad 1316C. In FIG. 17, the first pad 1316A has a first transit pod 802A corresponding to the transit pod 802 of FIGS. 8A-8F. For example, the first transit pod 802A may be brought to the UAV platform 1702 by a first transit carrier 100A corresponding to the transit carrier 100 of FIGS.

1A-1B. Alternatively, the first transit pod 802A may be brought to the UAV platform 1702 by the transit carrier 135 of FIGS. 1C-1E. In response to leaving the first transit pod 802A at the first pad 1316A, a first UAV 1102A corresponding to the UAV 1102 of FIGS. 11A-11F can travel to the UAV port 1314 and pick up the first transit pod 802A via the UAV coupling operations described above in connection with FIGS. 12A-12L. Alternatively, the UAV 1102 may travel to any other location (e.g., a current location, position, etc.) of the first transit pod 802A and pick up the first transit pod 802A via the UAV coupling operations described above in connection with FIGS. 12A-12L. For example, the UAV 1102 may pick up the first transit pod 802A at the high-density building 1336, the stacking facility 1330, etc. In such examples, the UAV 1102 can pick up the first transit pod 802A from (e.g., directly from) a corresponding one of the transit carrier 100 of FIGS. 1A-1B or the transit carrier 135 of FIGS. 1C-1E.

In the illustrated example of FIG. 17, the second pad 1316B has a second transit pod 802B corresponding to the transit pod 802 of FIGS. 8A-8F coupled to a second UAV 1102B corresponding to the UAV 1102 of FIGS. 11A-11F. For example, the second UAV 1102B may couple to the second transit pod 802B via the UAV coupling operations described above in connection with FIGS. 12A-12L.

In the illustrated example of FIG. 17, the third pad 1316C is empty and, thus, available for use. For example, the central server 1302 via the network 1304 may direct a third UAV 1102C corresponding to the UAV 1102 of FIGS. 11A-11F to drop off a third transit pod 802C corresponding to the transit pod 802 of FIGS. 8A-8F. In such examples, the third UAV 1102C can drop off and decouple from the third transit pod 802C via the UAV coupling operations described above in connection with FIGS. 12A-12L. In response to delivering the third transit pod 802C onto the third pad 1316C, the central server 1302 can instruct a second transit carrier 100B corresponding to the transit carrier 100 of FIGS. 1A-1B to travel to the platform 1702 to pick up the third transit pod 802C. Alternatively, the central server 1302 can instruct the transit carrier 135 of FIGS. 1C-1E to pick up the third transit pod 802C.

Figure 18A:
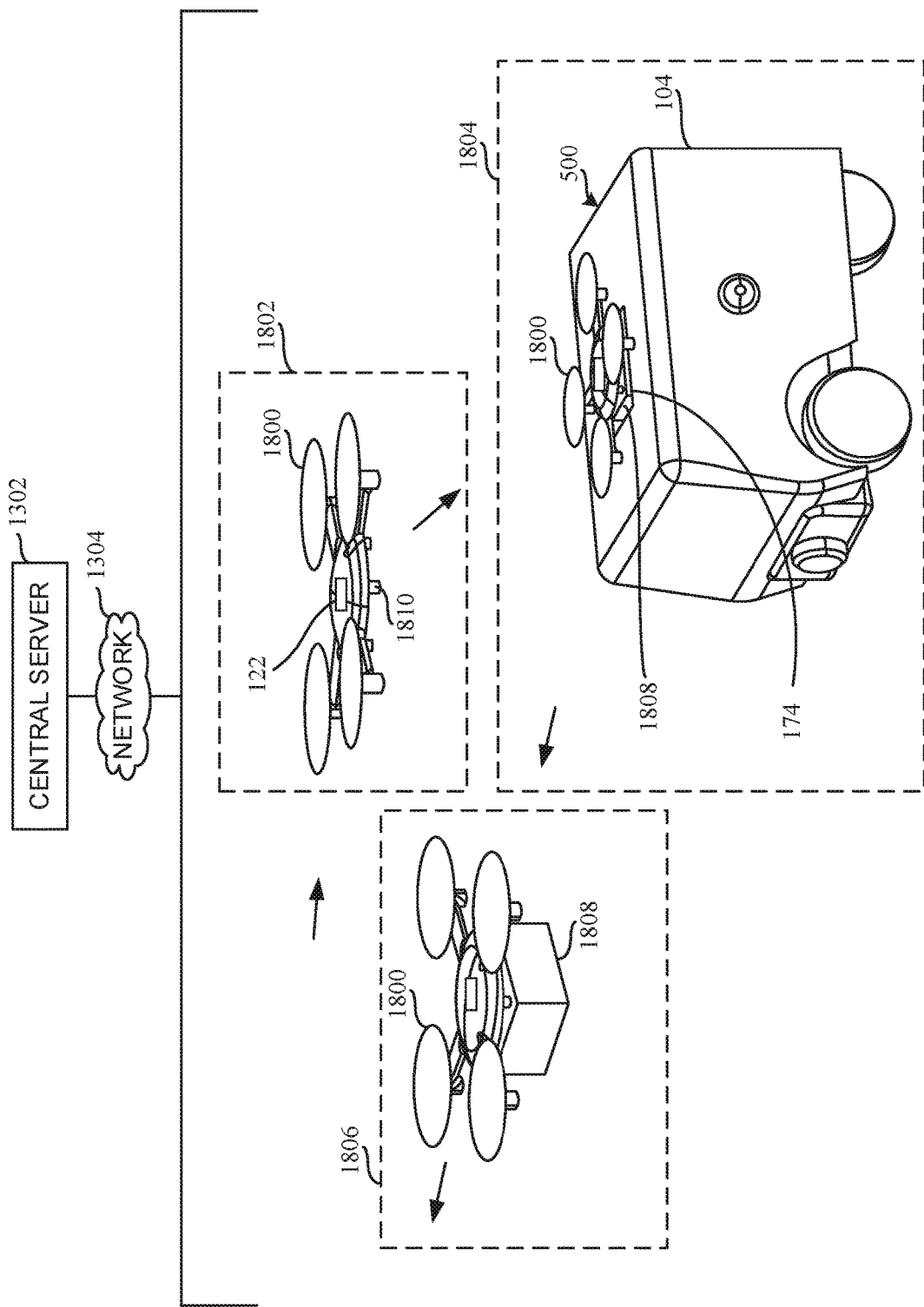
FIG. 18A depicts an example unmanned aerial vehicle interacting with the example land vehicle of FIG. 5B.

FIG. 18A depicts an example UAV 1800 interacting with the third land vehicle 500 of FIG. 5B. Alternatively, the UAV 1800 may interact with the fourth land vehicle 510 of FIG. 5D. The UAV 1800 of FIG. 18A is a drone (e.g., a delivery drone, a delivery UAV, etc.) used to facilitate transport of goods, packages, and/or other items from the land vehicle 500, 510 to a different location, such as one of the residences 1306 of FIG. 13, the high-density building 1336, the warehouse 1338, etc., and/or any other location within the infrastructure 1300 of FIG. 13. The UAV 1800 includes the transit controller 122 of FIG. 13. For example, the central server 1302 may generate and transmit a direction, a command, an instruction, or any other invocation to the UAV 1800 to obtain an example package 1808 from the land vehicle 500, 510 and deliver the package 1808 to a different location. Advantageously, the UAV 1800 enables the land vehicle 500, 510 to move from a first location (e.g., a first location in a residential neighborhood, an industrial complex, etc.) to a second location (e.g., a second location in a residential neighborhood, an industrial complex, etc.) while the UAV 1800 is delivering the package 1808. Accordingly, the UAV 1800 can return (e.g., iteratively return) to a current location of the land vehicle 500, 510 to obtain additional packages of interest from the land vehicle 500, 510 to deliver while the land vehicle 500, 510 remains in motion.

The illustrated example of FIG. 18A depicts example operations 1802, 1804, 1806 for the UAV 1800 to obtain the package 1808 from the third land vehicle 500. In FIG. 18A, the operations 1802, 1804, 1806 include a first example operation 1802, a second example operation 1804, and a third example operation 1806. For example, the parcel pod 104 of the third land vehicle 500 may be a delivery transit pod that includes a plurality of items, parcels, and/or other goods including the package 1808 for delivery to the residences 1306, the high-density building 1336, etc., of FIG. 13.

In the illustrated example of FIG. 18A, during the first operation 1802, the central server 1302 via the network 1304 of FIG. 13 instructs the UAV 1800 (e.g., the transit controller 122 of the UAV 1800) to move to a first location of the third land vehicle 500. In FIG. 18A, during the second operation 1804, the central server 1302 instructs the UAV 1800 to move to a second location corresponding to the UAV 1800 hovering above and/or otherwise proximate the hatch 174 of the parcel pod 104. During the second operation 1804, the lifting means of the parcel pod 104 can lift the package 1808 up and/or through the hatch 174. In response to the package 1808 being lifted through the hatch 174, the UAV 1800 can take possession of the package 1808 via example handlers 1810.

In some examples, the handlers 1810 can correspond to one or more arms, claws, grabbers, etc., coupled to one or more actuators of the UAV 1102. For example, the UAV 1800 includes the handlers 1810 to grab the package 1808 during the second operation 1804. In some examples, the handlers 1810 implement means for handling the package 1808. For example, the means for handling the package 1808 can include and/or otherwise be implemented by one or more arms, claws, grabbers, etc., coupled to one or more actuators of the UAV 1800.

In response to the UAV 1800 obtaining the package 1808 from the parcel pod 104, the central server 1302 can instruct the UAV 1800 to deliver the package 1808 to a third location (e.g., one of the residences 1306, the high-density building 1336, etc., of FIG. 13). In response to delivering the package 1808 to the third location, the central server 1302 can instruct the UAV 1800 to return to a fourth location corresponding to a current location of the parcel pod 104. For example, during the time that the UAV 1800 delivered the package 1808, the parcel pod 104 moved from the second location to the fourth location. Accordingly, the UAV 1800 can iteratively obtain items from the parcel pod 104, deliver the items to a different location from the parcel pod 104, and return to a current position of the parcel pod 104, where the parcel pod 104 may remain (constantly) in motion to move from location to location.

Figure 18B:
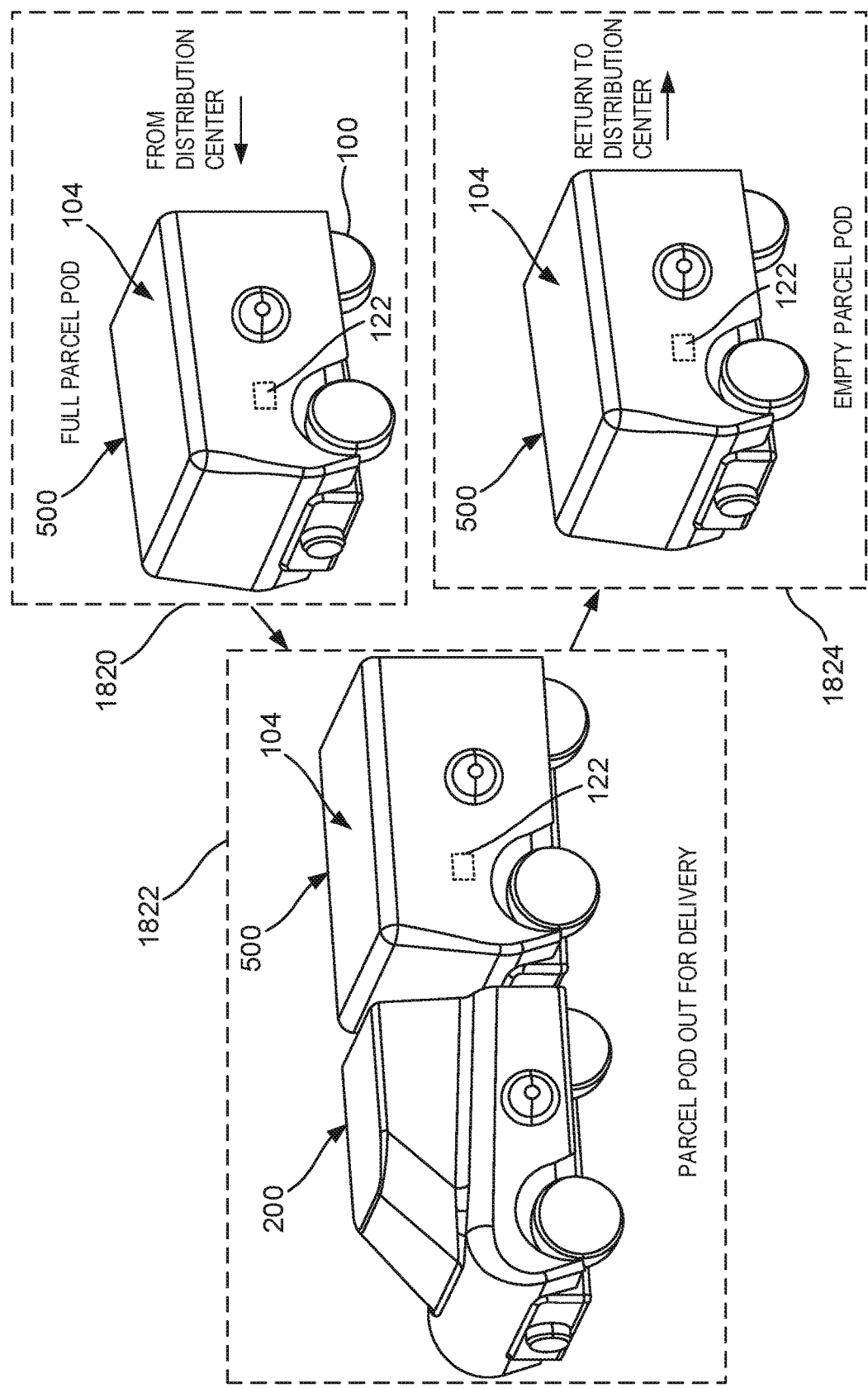
FIG. 18B depicts example parcel operations associated with the example land vehicle of FIG. 5B and/or 5D.

FIG. 18B depicts example parcel operations 1820, 1822, 1824 associated with the third land vehicle 500 of FIG. 5B. Alternatively, the parcel operations 1820, 1822, 1824 may be associated with the fourth land vehicle 510 of FIG. 5D. The third land vehicle 500 includes the parcel pod 104 of FIG. 1J-1K to facilitate the transport of goods, packages, and/or other items from the parcel pod 104 to a different location, such as one of the residences 1306, the high-density building 1336, the warehouse 1338, etc., and/or any other location within the infrastructure 1300 of FIG. 13. Alternatively, the parcel operations 1820, 1822, 1824 of FIG. 18B may be executed by the parcel pod 180 of FIGS. 1L-1M.

The parcel pod 104 includes the transit controller 122 of FIG. 13. For example, the central server 1302 may generate and transmit a direction, a command, an instruction, or any other invocation to the parcel pod 104 to deliver one or more packages to a location within the infrastructure 1300. In some examples, the transit controller 122 of the parcel pod 104 can instruct the transit controller 122 of a coupled one of the transit carrier 100, 135 to move the parcel pod 104 to a location of interest in the infrastructure 1300. Alternatively, the central server 1302 may generate and transmit a command to the coupled one of the transit carrier 100, 135 to move the parcel pod 104 to a location of interest for delivery operations.

Advantageously, the parcel pod 104 enables the first land vehicle 200 of FIGS. 2A, 3A, and 4A to move from a first location (e.g., a first location in a residential neighborhood, an industrial complex, etc.) to a second location (e.g., a second location in a residential neighborhood, an industrial complex, etc.) while the parcel pod 104 can travel to and from a distribution center (e.g., the warehouse 1338). Accordingly, a different parcel pod 104 can return (e.g., iteratively return) to a current location of the first land vehicle 200 to deliver additional packages of interest while the first land vehicle 200 remains in motion to improve transportation efficiency.

The illustrated example of FIG. 18B depicts the operations 1820, 1822, 1824 to facilitate the delivery of goods, packages, and/or other items. In FIG. 18B, the operations 1820, 1822, 1824 include a fourth example operation 1820, a fifth example operation 1822, and a sixth example operation 1824. In the illustrated example of FIG. 18B, during the fourth operation 1820, the central server 1302 via the network 1304 of FIG. 13 can instruct the third land vehicle 500 (e.g., the transit controller 122 of parcel pod 104 and/or the transit controller 122 of the corresponding transit carrier 100) to move to a first location of the first land vehicle 200. For example, the central server 1302 may instruct the third land vehicle 500 to join and/or otherwise couple to the first land vehicle 200 that is not already coupled to one of the third land vehicle 500. In such examples, the parcel pod 104 can correspond to a full parcel pod (e.g., the parcel pod 104 has a full inventory and/or is fully loaded with goods, packages, and/or other items) that the first land vehicle 200 can assist in delivering onboard items.

In the illustrated example of FIG. 18B, during the fifth operation 1822, the central server 1302 can instruct the third land vehicle 500 to couple to the first land vehicle 200. The central server 1302 can generate a delivery route, transportation path, etc., to be used by the first land vehicle 200 and the third land vehicle 500 to deliver the items included in the parcel pod 104. After the coupling of the first land vehicle 200 and the third land vehicle 500, the central server 1302 can instruct the first land vehicle 200 and the third land vehicle 500 to travel along the delivery route to facilitate the delivery of onboard items.

In the illustrated example of FIG. 18B, during the sixth operation 1824, the parcel pod 104 has been emptied corresponding to one or more of the previously stored items having been delivered to respective delivery locations. In response to the parcel pod 104 being emptied, or substantially emptied (e.g., one or more items may remain in the parcel pod 104 as the one or more items were unable to be successfully delivered), the central server 1302 can instruct the third land vehicle 500 to decouple from the first land vehicle 200 and return to the distribution center or travel to a different location. In some examples, the third land vehicle 500 may return to the distribution center to be reloaded and subsequently instructed to join the first land vehicle 200 or join a different one of the first land vehicle 200 to deliver additional goods, packages, and/or other items to locations of interest.

Figure 19A:
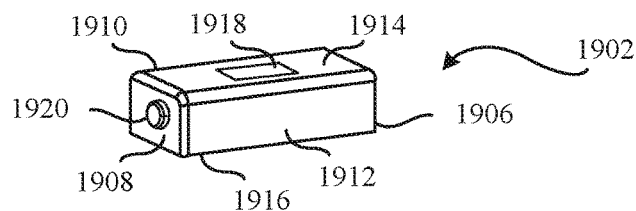
FIGS. 19A-19D depict example operations associated with the example land vehicle of FIG. 5B.

FIGS. 19A-19D depicts an example housing 1902 that can facilitate the transportation of example items 1904 via the third land vehicle 500 of FIG. 5B. Alternatively, the housing 1902 may facilitate the transportation of the items 1904 via the fourth land vehicle 510 of FIG. 5D. The items 1904 can correspond to packages, parcels, etc. In FIG. 19A, the housing 1902 is a platform or a pedestal structure on which the parcel pod 180 of the third land vehicle 500 can couple. The housing 1902 has a front surface 1906, a rear surface 1908 opposite the front surface 1906, a first side surface 1910, a second side surface 1912 opposite the first side surface 1910, atop surface 1914, and a bottom surface 1916 opposite the top surface 1914. The housing 1902 includes an example hatch 1918 on the top surface 1914. The housing 1902 has an interior cavity within the surfaces 1906, 1908, 1910, 1912, 1914, 1916 to store the items 1904. The hatch 1918 is a slidably moveable surface to expose the interior cavity of the housing 1902 to ambient air to facilitate interaction with another entity, such as the third land vehicle 500.

The housing 1902 of FIG. 19A includes an example magnetic coupler 1920 on the rear surface 1908. The magnetic coupler 1920 is the same as the first and second magnetic couplers 116, 118 of the transit carrier 100, 135 of FIGS. 1A-1E. Alternatively, the magnetic coupler 1920 may be different. Alternatively, the rear surface 1908 may have more than one of the magnetic coupler 1920. Alternatively, the magnetic coupler 1920 may be in a different location and/or position on the rear surface 1908 than depicted in FIG. 19A.

Figure 19B:
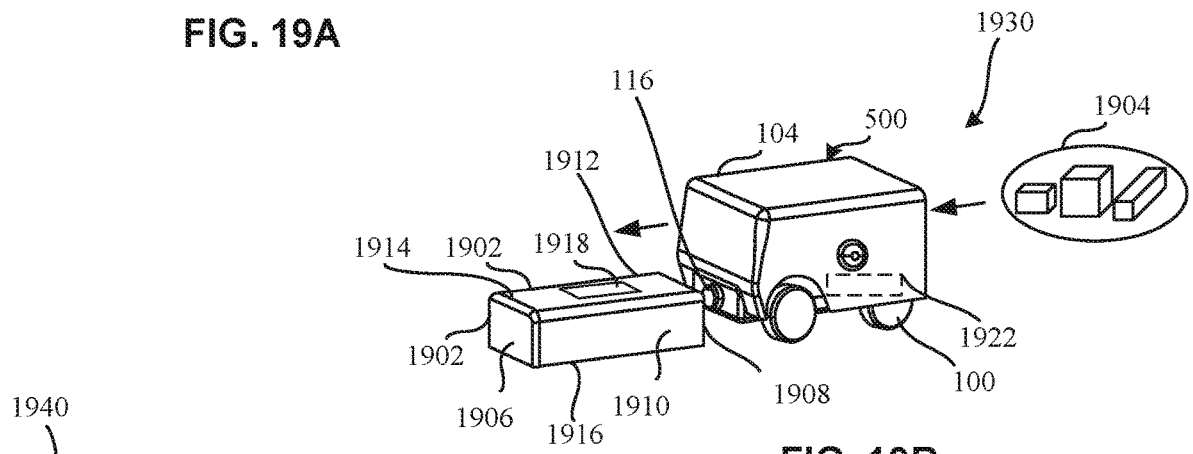

FIG. 19B depicts a first example operation 1930 associated with the housing 1902 and the third land vehicle 500 of FIG. 5B. In FIG. 19B, the third land vehicle 500 includes the items 1904 in the parcel pod 104 of FIGS. 1J-1K. During the first operation 1930, the third land vehicle 500 moves to the location of the housing 1902 to couple with the housing 1902.

Figure 19C:
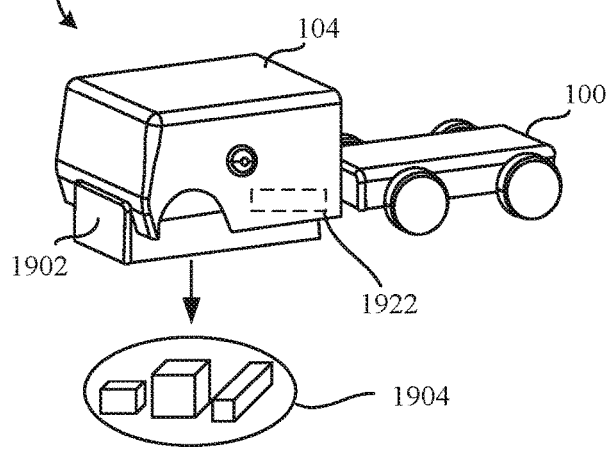

FIG. 19C depicts a second example operation 1940 associated with the housing 1902 of FIG. 19A and the third land vehicle 500 of FIG. 5B. During the second operation 1940, the first magnetic coupler 116 of the transit carrier 100 couples to the magnetic coupler 1920 of the housing 1902. In response to the coupling, the first hatch 1918 is invoked to open. During the second operation 1940, the parcel pod 104 de-couples from the transit carrier 100 and moves on top of the housing 1902. For example, the second movement systems 152 of the parcel pod 104 may move the parcel pod 104 onto the top surface 1914 of the housing 1902 as described above in connection with FIGS. 9A-9J. During the second operation 1940, the parcel pod 104 releases the items 1904 into the housing 1902 via the first hatch 1918. For example, the parcel pod 104 can include a second hatch 1922 that is substantially the same as the hatch 174 of FIGS. 1J-1M to allow the items 1904 to move from the parcel pod 104 to the housing 1902.

Figure 19D:
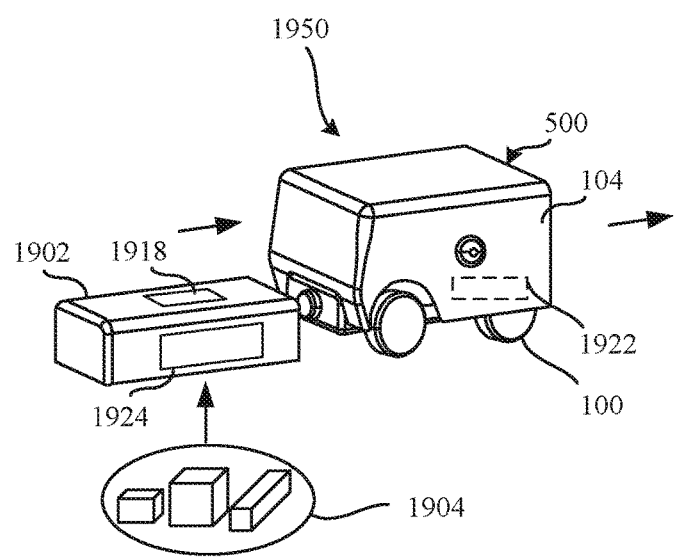

FIG. 19D depicts a third example operation 1950 associated with the housing 1902 of FIG. 19A and the third land vehicle 500 of FIG. 5B. During the third operation 1950, the items 1904 are placed into the housing 1902. During the third operation 1950, the third land vehicle 500 can move to the location of the housing 1902 and couple to the housing 1902. In response to the coupling, the parcel pod 104 can decouple from the transit carrier 100 and move from the top surface of the transit carrier 100 to the top surface 1914 of the housing 1902. In response to the parcel pod 104 moving to a position above the hatch 1918 of the housing 1902, an example lift 1924 of the housing 1902 can lift the items 1904 from the interior of the housing 1902 to an interior of the parcel pod 104 through the second hatch 1922. The lift 1924 can correspond to an elevatable platform, a liftable surface, a hoist, etc. In some examples, the lift 1924 implements means for lifting corresponding to an elevatable platform, a liftable surface, a hoist, etc. In response to moving the items 1904 to the interior of the parcel pod 104, the parcel pod 104 can close the second hatch 1922. During the third operation 1950, the parcel pod 104 can move back onto the transit carrier 100 and transport the items 1904 to a different location.

Figure 20:
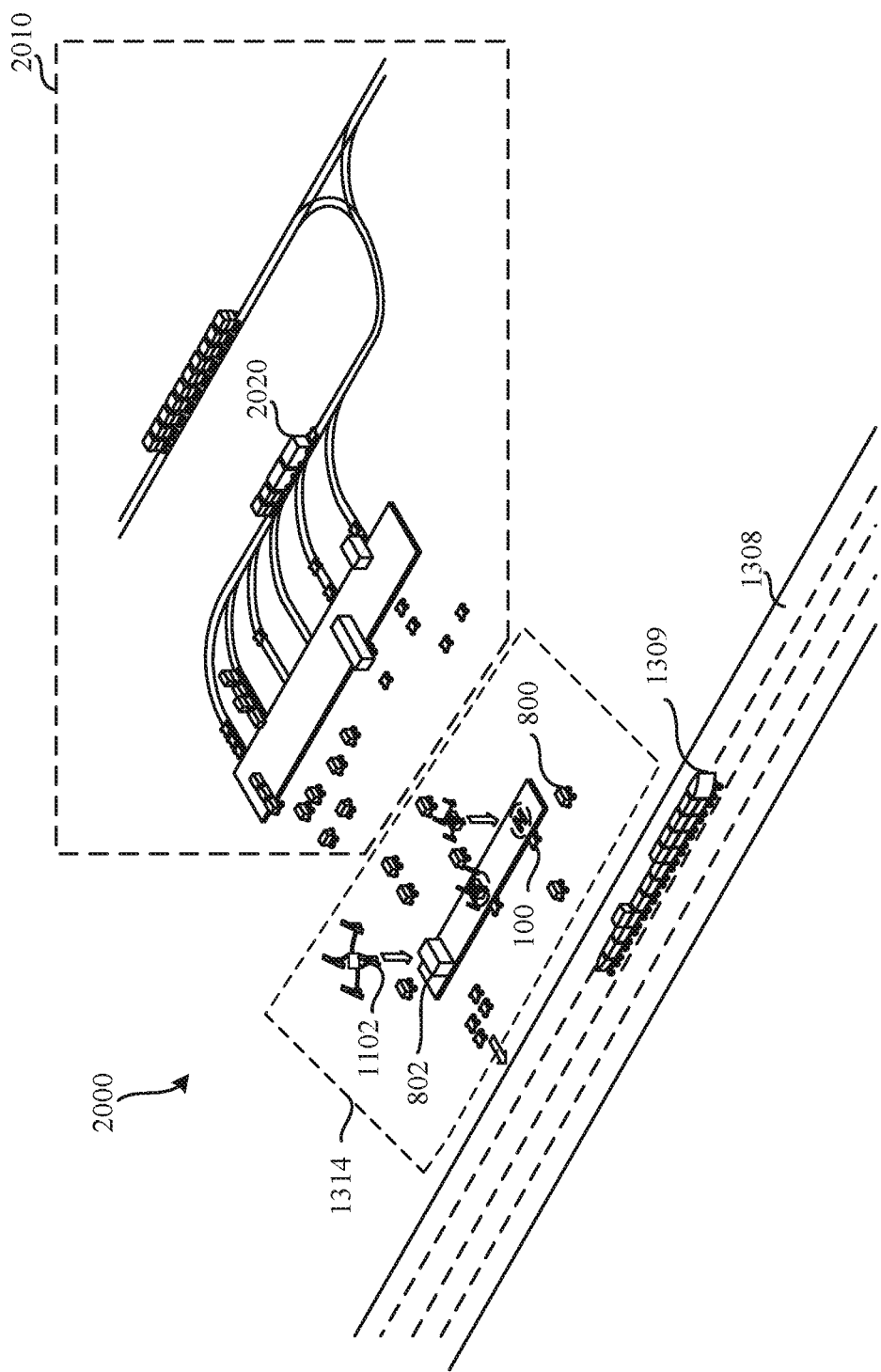
FIG. 20 depicts an example transportation hub to facilitate transportation operations of autonomous vehicles.

FIG. 20 depicts an example transportation hub 2000 to facilitate transportation operations of autonomous vehicles. The transportation hub 2000 includes the UAV port 1314 of FIG. 13 and/or 17 and an example transportation depot 2010. Additionally or alternatively, the transportation hub 2000 may include the carrier facility 1310, the pod facility 1312, the airport 1326, the seaport 1328, the stacking facility 1330, the rail facility 1332, and/or the warehouse 1338 of FIG. 13. For example, one or more of the autonomous vehicles of the convoy 1309 may leave the convoy 1309 of FIG. 13 when in proximity to and/or when passing by the transportation hub 2000. In such examples, the autonomous vehicles can travel to the UAV port 1314 to be transported by one of the UAVs 1102. For example, the UAV 1102 may transport one of the autonomous vehicles to a different location from the transportation hub 2000. In other examples, the UAV 1102 can pick up and land one of the autonomous vehicles on top of a different autonomous vehicle associated with an example autonomous vehicle train 2020. Alternatively, the autonomous vehicles can travel to the transportation depot 2010 to be transported by the autonomous vehicle train 2020. In other examples, an autonomous vehicle after being transported to the UAV port 1314, the transportation depot 2010, etc., may leave the transportation hub 2000 and enter the roadway 1308 to join the convoy 1309.

Figure 21:
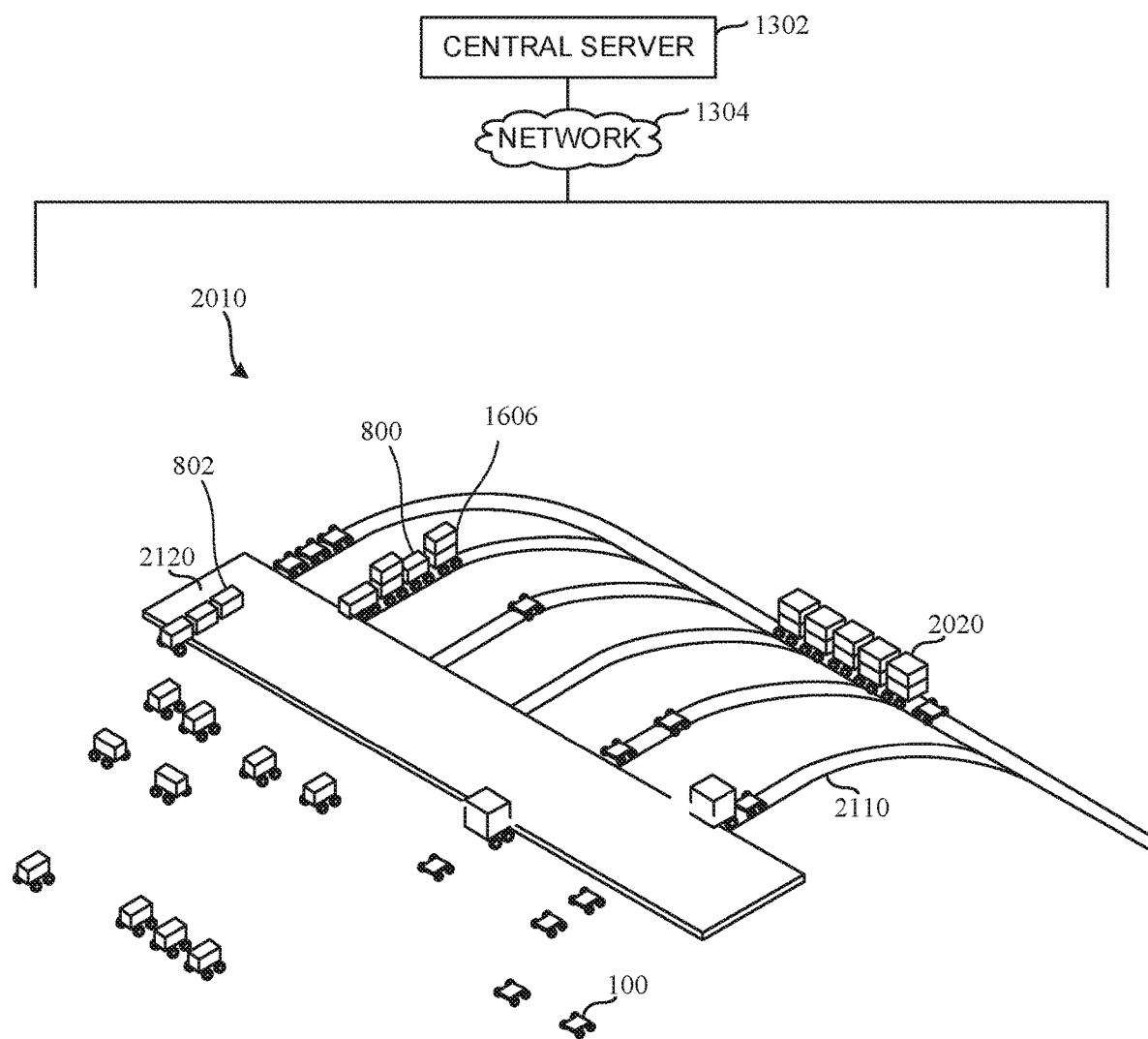
FIG. 21 depicts an example transportation depot.

FIG. 21 depicts the transportation depot 2010 of FIG. 20. In FIG. 21, autonomous vehicles facilitate transportation operations. For example, the autonomous vehicle train 2020 of FIG. 20 moves on example depot roads 2110. The autonomous vehicle train 2020 includes stacked vehicles corresponding to the stacked vehicle 1606 of FIG. 16. In such examples, the stacked vehicles can decouple from the autonomous vehicle train 2020 and move onto a respective one of the depot roads 2110. For example, the central server 1302 via the network 1304 can instruct ones of the stacked vehicles to decouple from or couple to the autonomous vehicle train 2020. In such examples, the transit pod 802 of FIGS. 8A-8F of the stacked vehicles can decouple from a respective transit carrier 100 and move on top of a platform (e.g., a transportation platform, a loading/unloading platform, a raised platform, etc.) 2120. The transit pod 802 can travel across the platform 2120 and move on top of another transit carrier 100 and couple to the transit carrier 100. The transit carrier 100 can transport the transit pod 802 to a different location (e.g., can travel to the roadway 1308 of FIG. 13, join the convoy 1309 of FIG. 13, etc.).

Figure 22:
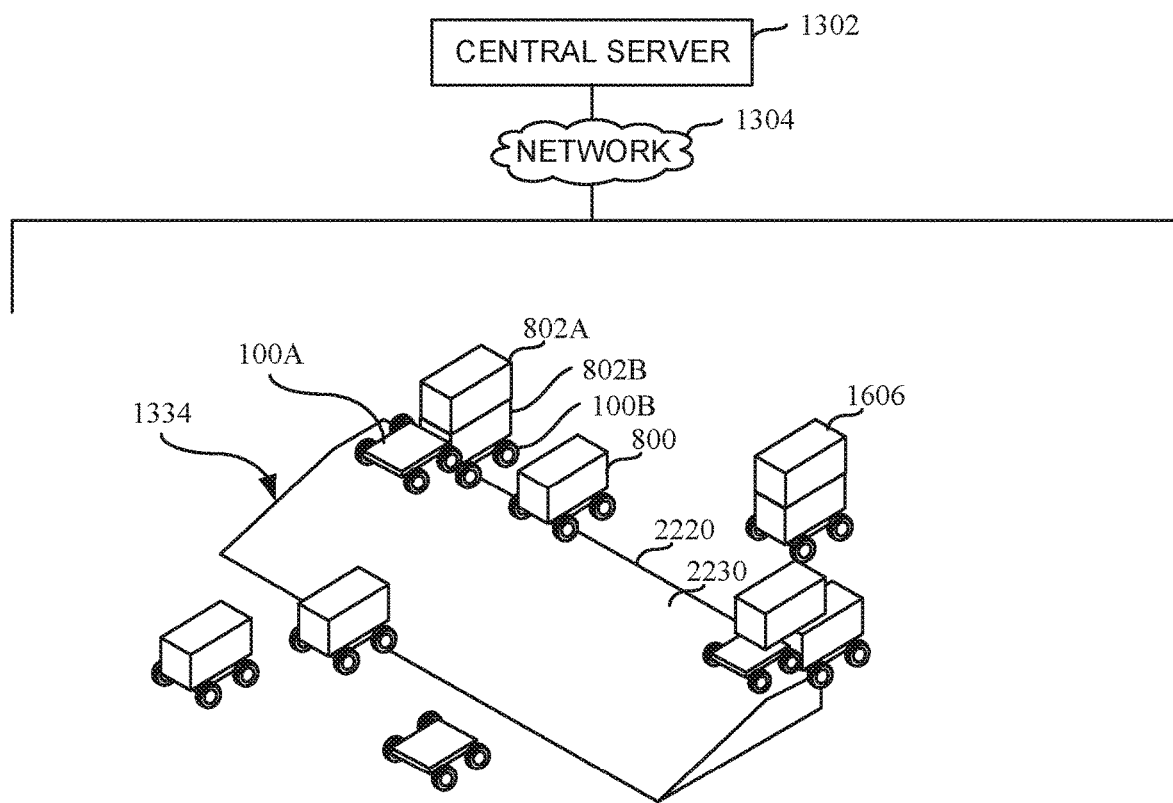
FIG. 22 depicts stacking of example transit pods.

FIG. 22 depicts stacking of example transit pods 802A, 802B including a first example transit pod 802A and a second example transit pod 802B corresponding to the transit pod 802 of FIGS. 8A-8F. For example, the central server 1302 via the network 1304 can instruct a first transit carrier 100A corresponding to the transit carrier 100 of FIGS. 1A-1B to stack the first transit pod 802A coupled to the first transit carrier 100A on top of the second transit pod 802B. Alternatively, the transit carrier 135 of FIGS. 1C-1E may be used. In FIG. 22, the second transit pod 802B is coupled to a second transit carrier 100B corresponding to the transit carrier 100 of FIGS. 1A-1B. In FIG. 22, the second transit pod 802B is proximate an edge 2220 of the ramp 1334 of FIG. 13, where the ramp 1334 has a top surface 2230. The first transit carrier 100A can travel up the ramp 1334. In response to traveling to the edge 2220 of the top surface 2230 of the ramp 1334, the first transit carrier 100A stops at the edge 2220.

In the illustrated example of FIG. 22, at the edge 2220, the first transit pod 802A decouples from the first transit carrier 100A. In response to the decoupling, the first transit pod 802A moves from the top of the first transit carrier 100A to the top of the second transit pod 802B. In response to moving to the top of the second transit pod 802B, the first transit pod 802A couples to the second transit pod 802B. For example, the second couplers 816 of the first transit pod 802A can couple to the first couplers 115 of the second transit pod 802B as described above in connection with FIGS. 8A-8F and FIGS. 9A-9J to form the stacked vehicle 1606 of FIG. 16. In response to the coupling, the second transit carrier 100B can transport the first transit pod 802A and the second transit pod 802B to a different location.

Flowcharts representative of example hardware logic, machine readable instructions, hardware implemented state machines, and/or any combination thereof for implementing the transit controller 122 of FIG. 14 and/or the central server 1302 of FIG. 15 are shown in FIGS. 23-27. The machine readable instructions may be one or more executable programs or portion(s) of an executable program for execution by a computer processor such as the processor 2812 shown in the example processor platform 2800 discussed below in connection with FIG. 28 and/or the processor 2912 shown in the example processor platform 2900 discussed below in connection with FIG. 29. The program may be embodied in software stored on a non-transitory computer readable storage medium such as a CD-ROM, a floppy disk, a hard drive, a DVD, a Blu-ray disk, or a memory associated with the processor 2812 of FIG. 28 and/or the processor 2912 of FIG. 29, but the entire program and/or parts thereof could alternatively be executed by a device other than the processor 2812 of FIG. 28 and/or the processor 2912 of FIG. 29 and/or embodied in firmware or dedicated hardware. Further, although the example program is described with reference to the flowcharts illustrated in FIGS. 23-27, many other methods of implementing the example transit controller 122 and/or the example central server 1302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 23-27 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 23:
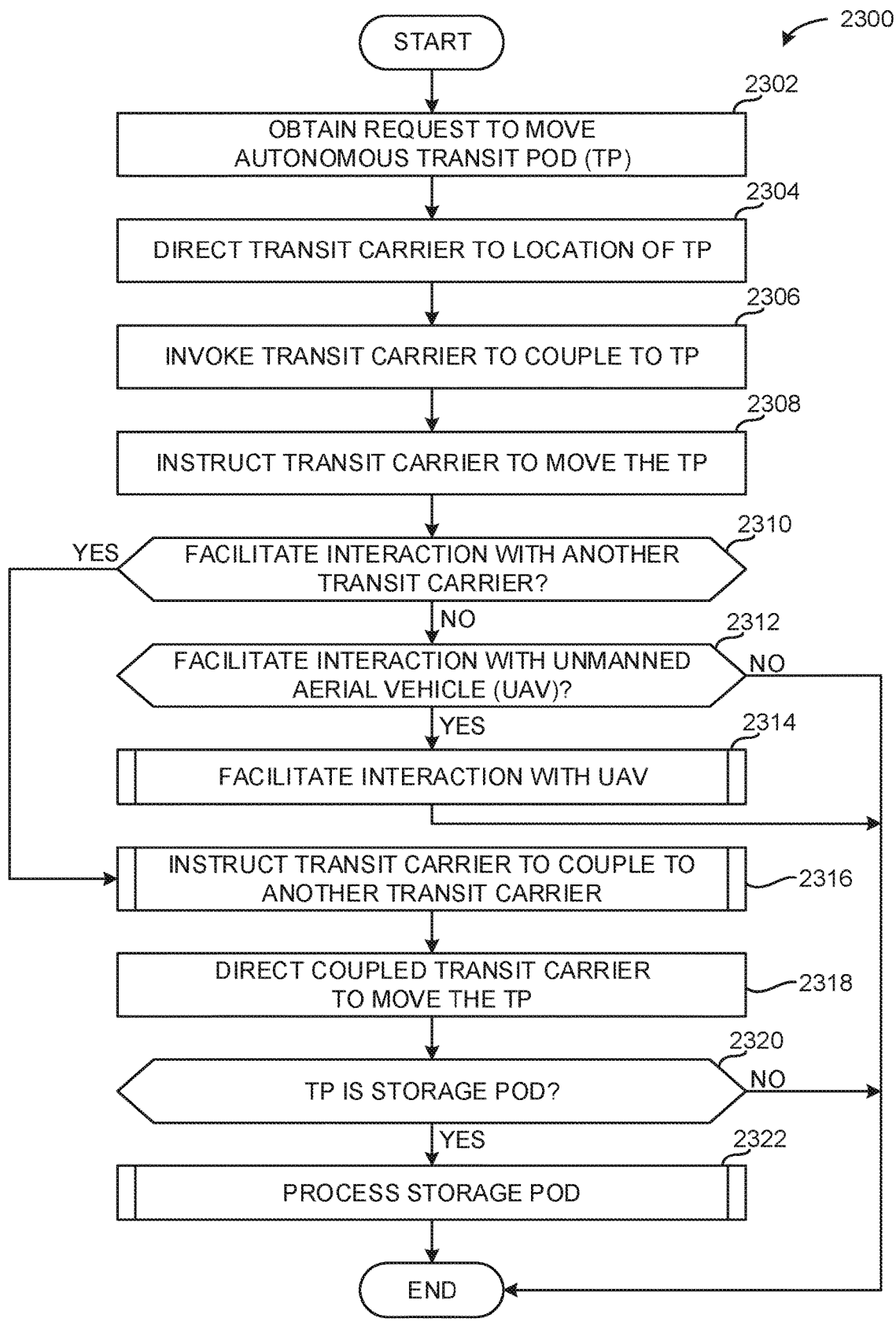
FIG. 23 is a flowchart representative of example machine readable instructions that may be executed to implement the example central server of FIG. 15 to transport an example transit pod.

FIG. 23 is a flowchart representative of example machine readable instructions 2300 that may be executed to implement the transit controller 122 of FIG. 14 and/or the central server 1302 of FIG. 15 to transport an autonomous transit pod, such as the passenger pod 102 of FIGS. 1F-1G, the passenger pod 155 of FIGS. 1H-1I, the parcel pod 104 of FIGS. 1J-1K, and/or the parcel pod 180 of FIGS. 1L-1M. The machine readable instructions 2300 of FIG. 23 begin at block 2302, at which the central server 1302 obtains a request to move an autonomous transit pod. For example, the network interface 1510 (FIG. 15) may obtain the request from a user (e.g., an application executing on a smartphone associated with the user, the transit controller 122 associated with the user, etc.) via the network 1304 of FIG. 13. In such examples, the request can correspond to moving the passenger pod 102, 155, the parcel pod 104, 180, etc., from one of the residences 1306 of FIG. 13 to the UAV port 1314 of FIG. 13.

At block 2304, the central server 1302 directs a transit carrier to a location of the transit pod. For example, the autonomous vehicle tracker 1520 (FIG. 15) can identify an available transit carrier 100, 135 at the carrier facility 1310. In such examples, the command generator 1560 (FIG. 15) can generate and transmit one or more commands to the transit controller 122 of the available transit carrier 100, 135 to direct the available transit carrier 100, 135 to move to the requesting one of the residences 1306.

At block 2306, the central server 1302 invokes the transit carrier to couple to the transit pod. For example, the command generator 1560 can generate and transmit one or more commands to the transit controller 122 of the transit pod 802 of FIGS. 8A-8F and/or the transit controller 122 of the transit carrier 100, 135 to couple together as described above in connection with FIGS. 9A-9J.

At block 2308, the central server 1302 instructs the transit carrier to move the transit pod. For example, in response to the passenger pod 102, 155 coupling to the transit carrier 100, 135, the command generator 1560 can transmit a command to the transit controller 122 of the transit carrier 100, 135 to move the first land vehicle 200 of FIGS. 2B, 3B, 4B, the second land vehicle 400 of FIG. 4D, etc., to a different location, such as the UAV port 1314.

At block 2310, the central server 1302 determines whether to facilitate interaction with another transit carrier. For example, the traffic analyzer 1530 (FIG. 15) may determine that traffic on the roadway 1308 of FIG. 13 is congested and can determine to move the first land vehicle 200, the second land vehicle 400, etc., to the UAV port 1314 via the convoy 1309 of FIG. 13. In such examples, the event scheduler 1550 (FIG. 15) can schedule one or more events in a queue to facilitate the first land vehicle 200, the second land vehicle 400, etc., joining the convoy 1309. In response to scheduling the one or more events, the command generator 1560 can transmit commands corresponding to the one or more events to facilitate the first land vehicle 200, the second land vehicle 400, etc., joining the convoy 1309 as described above in connection with FIGS. 16A-16B. In other examples, the central server 1302 can determine that the roadway 1308 is not congested and the first land vehicle 200, the second land vehicle 400, etc., can travel to the UAV port 1314 directly without joining the convoy 1309. In such examples, the central server 1302 can facilitate the coupling of a UAV 1102 with the passenger pod 102 of the first land vehicle 200, the passenger pod 155 of the second land vehicle 400, etc., after the first land vehicle 200, the second land vehicle 400, etc., arrives at the UAV port 1314.

If, at block 2310, the central server 1302 determines not to facilitate interaction with another transit carrier, then, at block 2312, the central server 1302 determines whether to facilitate interaction with a UAV. For example, the traffic analyzer 1530 may determine that moving the passenger pod 102, 155 from the requesting one of the residences 1306 to another location in the infrastructure 1300 is more efficient via flight (e.g., one or more flight operations). In such examples, the event scheduler 1550 can schedule one or more events including coordinating with a UAV 1102 of FIGS. 11A-11F to pick up the passenger pod 102, 155 at the UAV port 1314. Accordingly, the command generator 1560 can transmit a command to the transit controller 122 of the transit carrier 100, 135 carrying the passenger pod 102, 155 to travel to the UAV port 1314 for flight transport of the passenger pod 102, 155.

If, at block 2312, the central server 1302 determines not to facilitate interaction with another transit carrier, the machine readable instructions 2300 of FIG. 23 conclude. For example, the command generator 1560 transmitting the command to the transit controller 122 of the transit carrier 100, 135 to move the first land vehicle 200, the second land vehicle 400, etc., to a different location as described above in connection with block 2308 may conclude actions to be executed by the central server 1302.

If, at block 2312, the central server 1302 determines to facilitate interaction with a UAV, then, at block 2314, the central server 1302 facilitates interaction with the UAV. For example, the command generator 1560 may instruct the UAV 1102 to couple to the passenger pod 102, 155 at the UAV port 1314. An example process that may be used to implement block 2312 is described below in connection with FIG. 24. In response to facilitating the interaction with the UAV at block 2314, the machine readable instructions 2300 of FIG. 23 conclude.

If, at block 2310, the central server 1302 determines to facilitate interaction with another transit carrier, control proceeds to block 2316 to instruct the transit carrier to couple to another transit carrier. For example, the command generator 1560 may instruct autonomous vehicles of the convoy 1309 of FIG. 13 to facilitate the joining of the first land vehicle 200, the second land vehicle 400, etc., with the convoy 1309. An example process that may be used to implement block 2316 is described below in connection with FIG. 25.

In response to instructing the transit carrier to couple to another transit carrier at block 2316, the central server 1302 directs the coupled transit carrier to move the transit pod at block 2318. For example, the command generator 1560 may transmit a command to the convoy 1309 to move the first land vehicle 200, the second land vehicle 400, etc. In other examples, the command generator 1560 can transmit one or more commands to the transit carriers 100A-D of FIGS. 6A-6B to move the first land vehicle 200A after coupling to the second through fourth land vehicles 200B, 200C, 200D.

At block 2320, the central server 1302 determines whether the transit pod is a parcel pod. For example, the network interface 1510 may determine that the request is associated with the parcel pod 104 of FIGS. 1J-1K or the parcel pod 180 of FIGS. 1L-1M. If, at block 2320, the central server 1302 determines that the transit pod is not a parcel pod, the machine readable instructions 2300 of FIG. 23 conclude. If, at block 2320, the central server 1302 determines that the transit pod is a parcel pod, then, at block 2322, the central server 1302 processes the parcel pod. For example, the event scheduler 1550 may schedule one or more events to facilitate the stacking of two parcel pods 104, 180 as described above in connection with FIG. 22. An example process that may be used to implement block 2322 is described below in connection with FIG. 26. In response to processing the parcel pod at block 2322, the machine readable instructions 2300 of FIG. 23 conclude.

Figure 24:
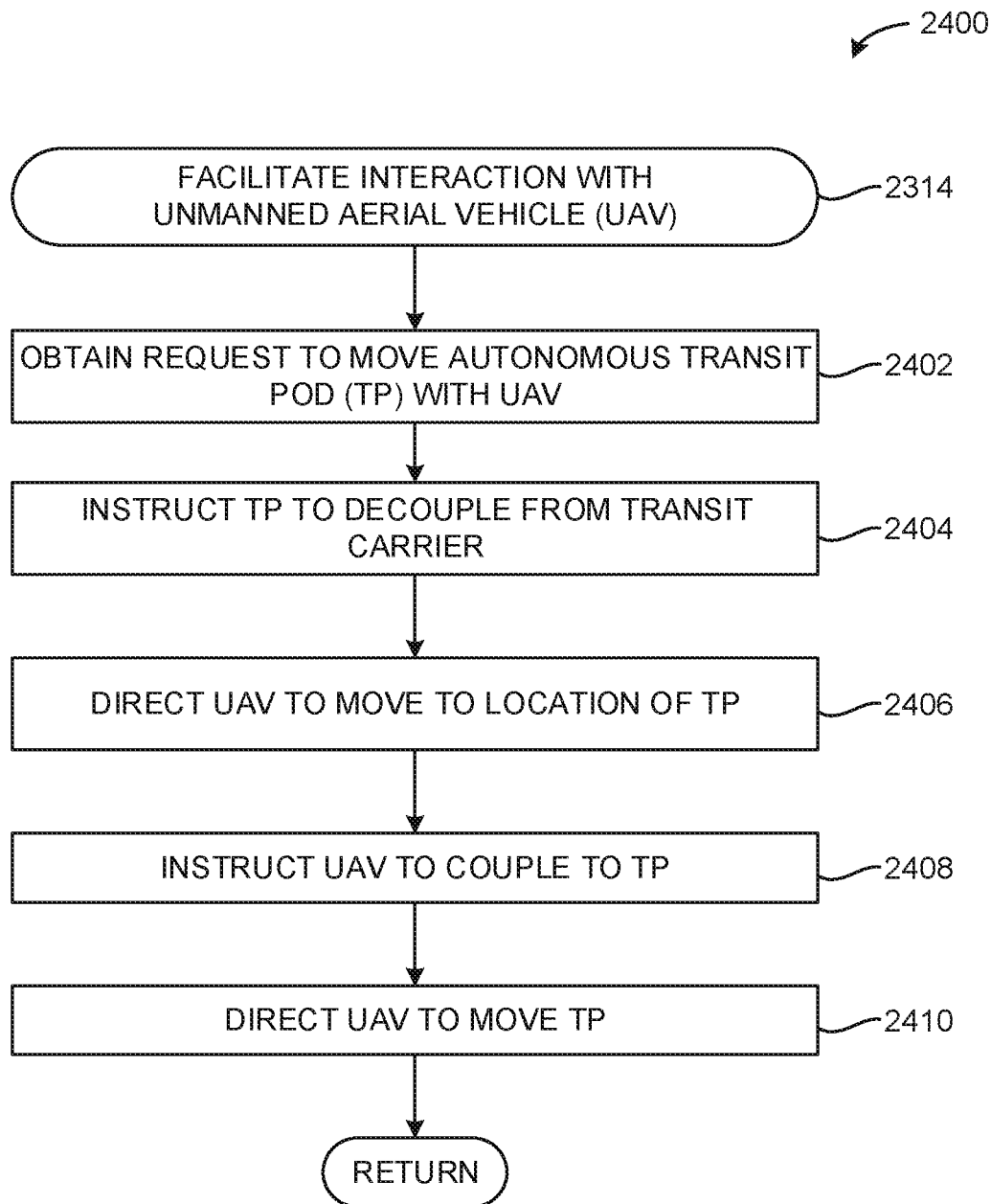
FIG. 24 is a flowchart representative of example machine readable instructions that may be executed to implement the example central server of FIG. 15 to facilitate interaction with an example unmanned aerial vehicle.

FIG. 24 is a flowchart representative of example machine readable instructions 2400 that may be executed to implement the transit controller 122 of FIG. 14 and/or the central server 1302 of FIG. 15 to transport a transit pod such as the passenger pod 102 of FIGS. 1F-1G, the passenger pod 155 of FIGS. 1H-1I, the parcel pod 104 of FIGS. 1J-1K, or the parcel pod 180 of FIGS. 1L-1M with the UAV 1102 of FIGS. 11A-11F. The machine readable instructions 2400 of FIG. 24 can be used to implement block 2314 of the machine readable instructions 2300 of FIG. 23. The machine readable instructions 2400 of FIG. 24 begin at block 2402, at which the central server 1302 obtains a request to move a transit pod with a UAV. For example, the network interface 1510 (FIG. 15) may obtain the request from a user (e.g., an application executing on a smartphone associated with the user, the transit controller 122 associated with the user, etc.) via the network 1304 of FIG. 13. In such examples, the request can correspond to moving the passenger pod 102, 155, the parcel pod 104, 180, etc., from one of the residences 1306 of FIG. 13 to the UAV port 1314 of FIG. 13. The infrastructure analyzer 1540 (FIG. 15) can determine that the third pad 1316C is available for transport and invoke the event scheduler 1550 to schedule an air transport operation at the third pad 1316C.

At block 2404, the central server 1302 instructs the transit pod to decouple from the transit carrier. For example, the command generator 1560 (FIG. 15) may transmit a command to the transit controller 122 of the passenger pod 102, 155 to decouple from the transit carrier 100, 135 coupled to the passenger pod 102, 155. In such examples, the passenger pod 102, 155 can invoke the movement systems 152 of the passenger pod 102, 155 to decouple the second couplers 816 of the passenger pod 102, 155 from the first couplers 115 of the transit carrier 100, 135.

At block 2406, the central server 1302 directs a UAV to move to a location of the transit pod. For example, the command generator 1560 may transmit a command to the UAV 1102 of FIGS. 11A-11F to move from a first location in the infrastructure 1300 to a second location corresponding to the third pad 1316C of the UAV port 1314.

At block 2408, the central server 1302 instructs the UAV to couple to the transit pod. For example, the command generator 1560 may transmit one or more commands to a respective transit controller 122 of the passenger pod 102, 155 and the UAV 1102 to invoke the coupling. In such examples, the command generator 1560 can direct the transit controller 122 of the UAV 1102 to have the second couplers 816 of the UAV 1102 couple to the first couplers 115 of the passenger pod 102, 155 as described above in connection with FIGS. 11A-11F and FIGS. 12A-12L.

At block 2410, the central server 1302 directs the UAV to move the transit pod. For example, the traffic analyzer 1530 (FIG. 15) may determine a flight path based on existing or pending flight traffic from UAVs, aircraft associated with the airport 1326 of FIG. 13, etc. The command generator 1560 may transmit a command to the transit controller 122 of the UAV 1102 to transport the passenger pod 102, 155 based on the determined flight path. In response to the UAV moving the transit pod at block 2410, the machine readable instructions 2400 of FIG. 24 return to the machine readable instructions 2300 of FIG. 23 to conclude.

Figure 25:
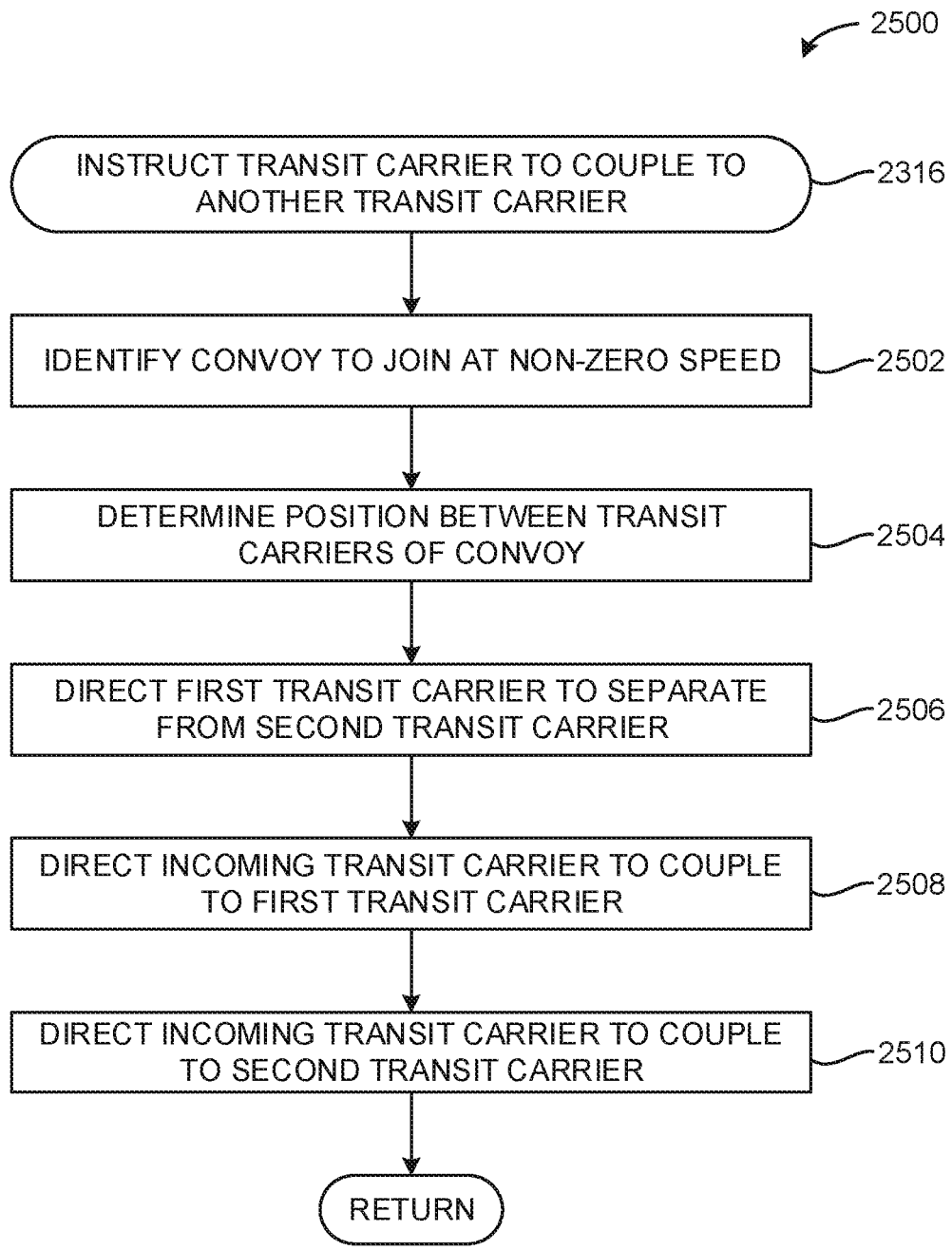
FIG. 25 is a flowchart representative of example machine readable instructions that may be executed to implement the example central server of FIG. 15 to instruct a first one of the transit carrier of FIGS. 1A-1B and/or FIGS. 1C-1E to couple with a second one of the transit carrier of FIGS. 1A-1B and/or FIGS. 1C-1E.

FIG. 25 is a flowchart representative of example machine readable instructions 2500 that may be executed to implement the transit controller 122 of FIG. 14 and/or the central server 1302 of FIG. 15 to instruct a transit carrier to couple to another transit carrier. The machine readable instructions 2500 of FIG. 25 can be used to implement block 2316 of the machine readable instructions 2300 of FIG. 23.

The machine readable instructions 2500 of FIG. 25 begin at block 2502, at which the central server 1302 identifies a convoy to join at a non-zero speed. For example, the network interface 1510 (FIG. 15) may obtain a request from a user (e.g., an application executing on a smartphone associated with the user, the transit controller 122 associated with the user, etc.) via the network 1304 of FIG. 13 to move the second land vehicle 800B of FIGS. 16A-16B from a first location to a second location. In such examples, the request can correspond to moving the passenger pod 102, 155, the parcel pod 104, 180, etc., from one of the residences 1306 of FIG. 13 to the high-density building 1336 of FIG. 13. The traffic analyzer 1530 (FIG. 15) can determine that traffic on the roadway 1308 of FIG. 13 is congested and to improve transportation throughput and reduce transportation time, the traffic analyzer 1530 can identify the convoy 1309 of FIG. 13 for the second land vehicle 800B to join.

At block 2504, the central server 1302 determines a position between transit carriers of the convoy. For example, the autonomous vehicle tracker 1520 (FIG. 15) can determine that the second land vehicle 800B can join the convoy 1309 at a position between the first land vehicle 800A and the fourth land vehicle 800D as depicted in FIGS. 16A-16B.

At block 2506, the central server 1302 directs a first transit carrier to separate from a second transit carrier. For example, the command generator 1560 may instruct the first transit carrier 100A of the first land vehicle 800A to separate from the fourth transit carrier 100D of the fourth land vehicle 800D as described above in connection with FIGS. 16A-16B.

At block 2508, the central server 1302 directs an incoming transit carrier to couple to the first transit carrier. For example, the command generator 1560 may transmit a first command to the transit controller 122 of the second transit carrier 100B to couple to the first transit carrier 100A as described above in connection with FIGS. 16A-16B.

At block 2510, the central server 1302 directs the incoming transit carrier to couple to the second transit carrier. For example, the command generator 1560 may transmit a first command to the transit controller 122 of the second transit carrier 100B to couple to the fourth transit carrier 100D as described above in connection with FIGS. 16A-16B.

In response to directing the incoming transit carrier to couple to the second transit carrier, the machine readable instructions 2500 of FIG. 25 return to block 2318 of the machine readable instructions 2300 of FIG. 23 to direct the coupled transit carrier to move the transit pod.

Figure 26:
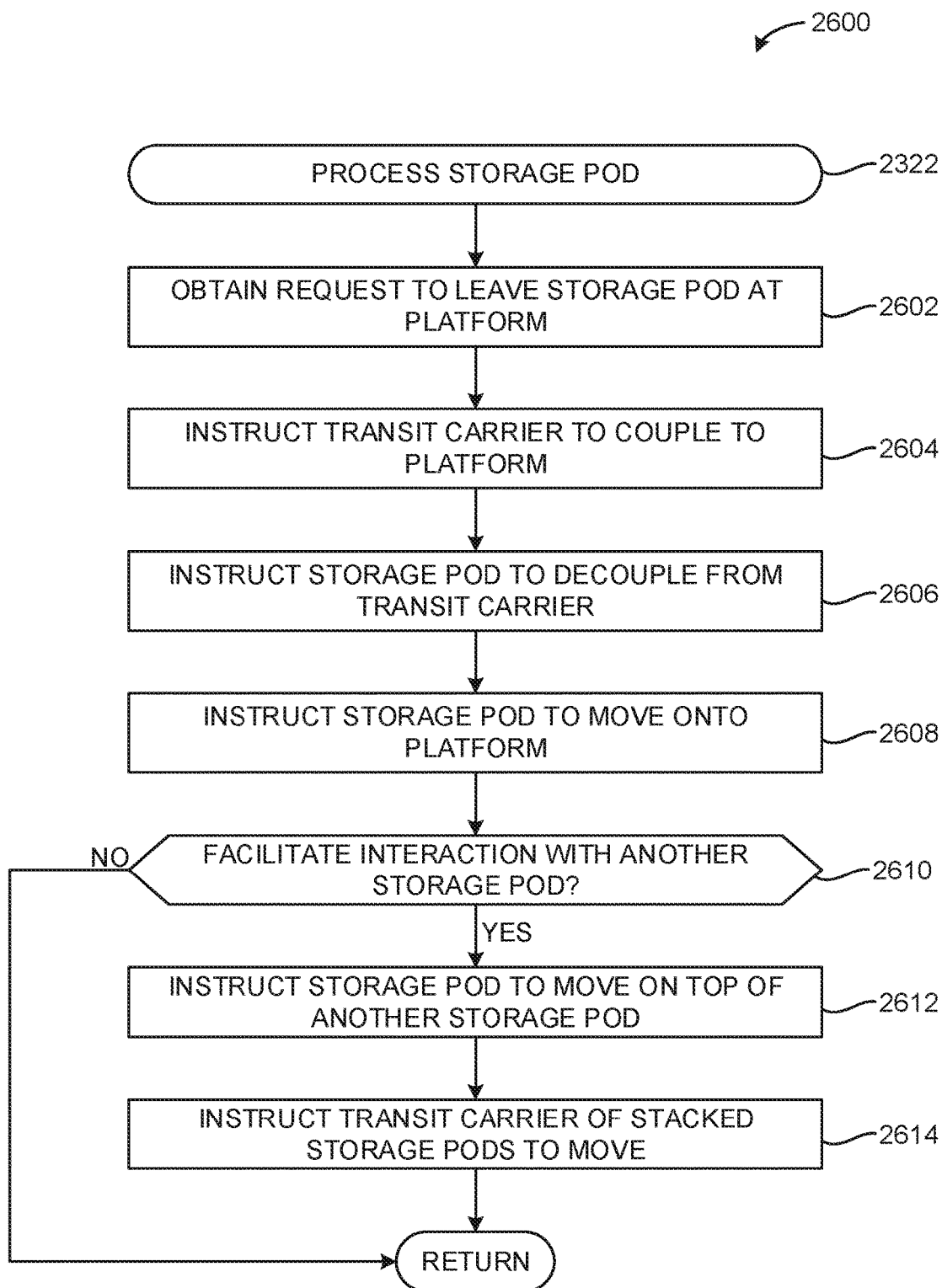
FIG. 26 is a flowchart representative of example machine readable instructions that may be executed to implement the example central server of FIG. 15 to process the example parcel pod of FIGS. 1J-1M.

FIG. 26 is a flowchart representative of example machine readable instructions 2600 that may be executed to implement the transit controller 122 of FIG. 14 and/or the central server 1302 of FIG. 15 to instruct a first parcel pod to be stacked on top of a second parcel pod. The machine readable instructions 2600 of FIG. 26 can be used to implement block 2322 of the machine readable instructions 2300 of FIG. 23.

The machine readable instructions 2600 of FIG. 26 begin at block 2602, at which the central server 1302 obtains a request to leave a parcel pod at a platform. For example, the network interface 1510 (FIG. 15) may obtain a request from a user (e.g., an application executing on a smartphone associated with the user, the transit controller 122 associated with the user, etc.) via the network 1304 of FIG. 13 to transport the parcel pod 104 of FIGS. 1J-1K or the parcel pod 180 of FIGS. 1L-1M from a first location to a second location. The request may be indicative of leaving the parcel pod 104, 180 at the second location corresponding to the platform 1702 of FIG. 17, the ramp 1334 of FIG. 13 and/or 22, the housing 1902 of FIGS. 19A-19D, etc.

At block 2604, the central server 1302 instructs the transit carrier to couple to the platform. For example, the command generator 1560 may transmit a command to the transit controller 122 of the transit carrier 100 of FIGS. 1A-1B or the transit carrier 135 of FIGS. 1C-1E to couple the first magnetic coupler 116 of the transit carrier 100, 135 to the magnetic coupler 1920 of the housing 1902.

At block 2606, the central server 1302 instructs the transit carrier to decouple from the parcel pod. For example, in response to the coupling to the housing 1902, the command generator 1560 may transmit a command to the transit controller 122 of the parcel pod 104, 180 to engage the movement systems 152 to decouple from the transit carrier 100, 135.

At block 2608, the central server 1302 instructs the parcel pod to move onto the platform. For example, the command generator 1560 may transmit a command to the transit controller 122 of the parcel pod 104, 180 to move from the top of the transit carrier 100, 135 to the top of the housing 1902.

At block 2610, the central server 1302 determines whether to facilitate interaction with another parcel pod. For example, if the parcel pod 104, 180 decouples from the transit carrier 100, 135 on top of the ramp 1334 of FIG. 13 and/or 22, the command generator 1560 may transmit a command to the transit controller 122 of the parcel pod 104, 180 to move on top of another parcel pod 104, 180 as described above in connection with FIG. 22.

If, at block 2610, the central server 1302 determines not to facilitate interaction with another parcel pod, the machine readable instructions 2600 of FIG. 26 return to the machine readable instructions 2300 of FIG. 23 to conclude. For example, further operations, such as the operations 1930, 1940, 1950 of FIGS. 19B-19D may be executed by the transit controller 122 of the parcel pod 104, 180.

If, at block 2610, the central server 1302 determines to facilitate interaction with another parcel pod, then, at block 2612, the central server 1302 instructs the parcel pod to move on top of another parcel pod. For example, the first transit pod 802A of FIG. 22 may travel from the top of the first transit carrier 100A to the top surface of the second transit pod 802B as described above in connection with FIG. 22.

At block 2614, the central server 1302 instructs the transit carrier of the stacked parcel pods to move. For example, in response to the stacking of the transit pods 802A, 802B as depicted in FIG. 22, the command generator 1560 may transmit a command to the second transit carrier 100B of the stacked vehicle 1606 to move the transit pods 802A, 802B to a different location. In response to instructing the transit carrier of the stacked parcel pods to move at block 2614, the machine readable instructions 2600 of FIG. 26 return to the machine readable instructions 2300 of FIG. 23 to conclude.

Figure 27:
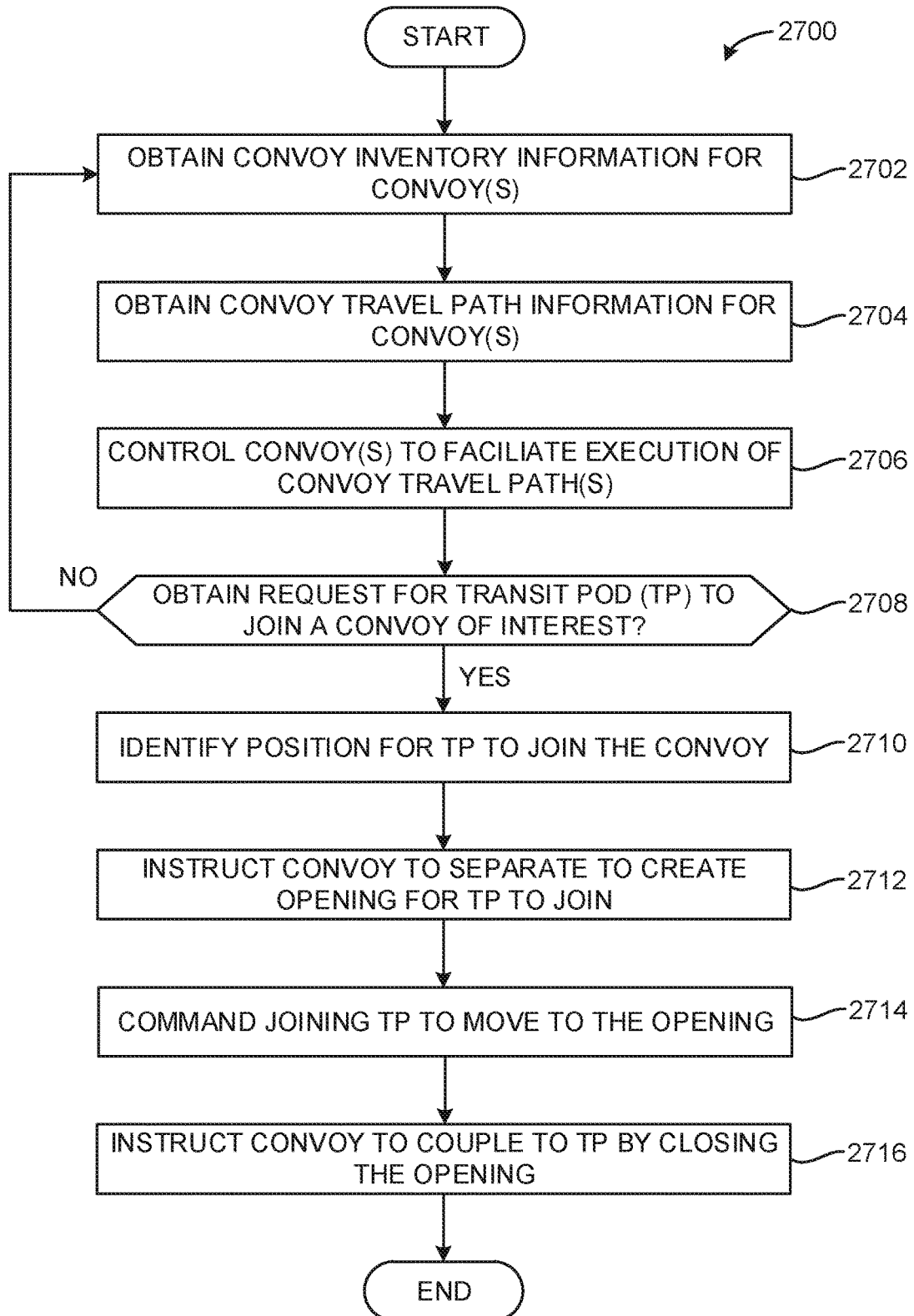
FIG. 27 is a flowchart representative of example machine readable instructions that may be executed to implement the example central server of FIG. 15 to facilitate operation of the example convoy of FIG. 16A and/or 16B.

FIG. 27 is a flowchart representative of example machine readable instructions 2700 that may be executed to implement the central server 1302 of FIG. 15 to facilitate operation of the example convoy 1309 of FIGS. 13, 16A, and/or 16B. The machine readable instructions begin at block 2702, at which the central server 1302 obtains convoy inventory information for convoy(s). For example, the autonomous vehicle tracker 1520 (FIG. 15) can obtain convoy inventory information associated with one or more convoys including the convoy 1309 from the transit controller 122 of one or both of the powertrain vehicles 1602, 1604 of FIGS. 16A-16B. In such examples, the autonomous vehicle tracker 1520 can determine that the convoy 1309 includes the powertrain vehicles 1602, 1604, the land vehicles 800A-D, etc., an order of coupling (e.g., the second land vehicle 800B is coupled between the first land vehicle 800A and the fourth land vehicle 800D), etc.

At block 2704, the central server 1302 obtains convoy travel path information for the convoy(s). For example, the event scheduler 1550 (FIG. 15) can obtain convoy travel path information associated with one or more convoys including the convoy 1309, where the convoy travel path information can include GPS data, turn-by-turn directions, one or more waypoints connecting a plurality of locations to be traversed, etc., from one or both of the powertrain vehicles 1602, 1604 of FIGS. 16A-16B. In other examples, the event scheduler 1550 can obtain the convoy travel path information from the database 1570 (FIG. 15).

At block 2706, the central server 1302 controls the convoy(s) to facilitate execution of convoy travel path(s). For example, the command generator 1560 (FIG. 15) can control the powertrain vehicles 1602, 1604 of FIGS. 16A-16B, one or more of the transit vehicles 800A-D, etc., and/or, more generally the convoy 1309 to travel along a convoy travel path from a first location to a plurality of different locations in the infrastructure 1300.

At block 2708, the central server 1302 determines whether a request for a transit pod to join a convoy of interest been obtained. For example, the traffic analyzer 1530 (FIG. 15) may obtain a request from the second land vehicle 800B to join the convoy 1309.

If, at block 2708, the central server 1302 determines that a request has not been obtained, control returns to block 2702 to obtain convoy inventory information (e.g., updated convoy inventory information) for the convoy(s). If, at block 2708, the central server 1302 determines that a request for the transit pod to join the convoy of interest, then, at block 2710, the central server 1302 identifies a position for the transit pod to join the convoy of interest. For example, the autonomous vehicle tracker 1520 can determine that the second land vehicle 800B can join the convoy 1309 at a position between the first land vehicle 800A and the fourth land vehicle 800D.

At block 2712, the central server 1302 instructs the convoy to separate to create an opening for the transit pod to join. For example, the command generator 1560 can instruct the first land vehicle 800A to decouple from the fourth land vehicle 800D. In some examples, the command generator 1560 can direct the first land vehicle 800A and all land vehicles ahead of or in front of the first land vehicle 800A to increase speed from a first speed to a second speed greater than the first speed. Additionally or alternatively, the command generator 1560 can direct the fourth land vehicle 800D and all land vehicles behind the fourth land vehicle 800D to decrease speed from the first speed to a third speed less than the first speed.

At block 2714, the central server 1302 commands the joining transit pod to move to the opening. For example, the command generator 1560 can invoke the second land vehicle 800B to move into the opening created by the separation of the first land vehicle 800A and the fourth land vehicle 800D.

At block 2716, the central server 1302 instructs the convoy to couple to the transit pod by closing the opening. For example, the command generator 1560 can instruct the first land vehicle 800A to couple to the second land vehicle 800B by decreasing speed from the second speed to the first speed. Additionally or alternatively, after the coupling, the fourth land vehicle 800D can couple to the second land vehicle 800B by increasing speed from the third speed to the first speed. Accordingly, the convoy 1309 can continue along the travel path with the addition of the second land vehicle 800B to the convoy. In response to instructing the convoy to couple to the transit pod by closing the opening at block 2716, the machine readable instructions 2700 of FIG. 27 conclude.

Figure 28:
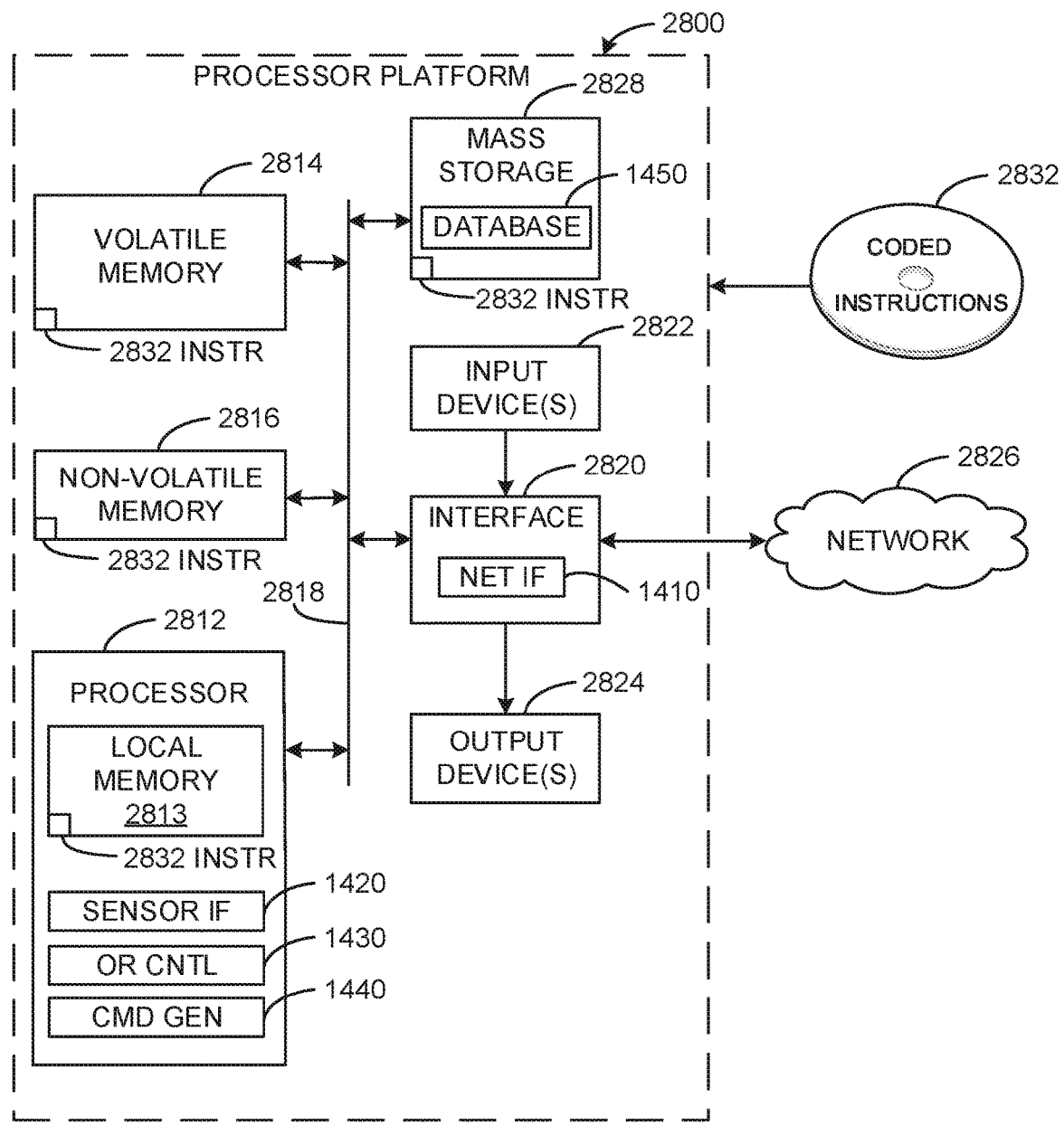
FIG. 28 is a block diagram of an example processing platform structured to execute the example machine readable instructions of FIGS. 23-27 to implement the example transit controller of FIG. 14.

FIG. 28 is a block diagram of an example processor platform 2800 structured to execute the instructions of FIGS. 23-27 to implement the transit controller 122 of FIG. 14. The processor platform 2800 can be, for example, an electronic control unit (ECU), a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2812 implements the example sensor interface 1420, the example override controller 1430, and the example command generator 1440 of FIG. 14. In FIG. 28, the example sensor interface 1420 is represented as "SENSOR IF," the example override controller 1430 is represented as "OR CNTL," and the example command generator 1440 is represented as "CMD GEN."

The processor 2812 of the illustrated example includes a local memory 2813 (e.g., a cache). The processor 2812 of the illustrated example is in communication with a main memory including a volatile memory 2814 and a non-volatile memory 2816 via a bus 2818. The volatile memory 2814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2816 may be implemented by flash memory and/or any other desired type of memory device. Access to the main memory 2814, 2816 is controlled by a memory controller.

The processor platform 2800 of the illustrated example also includes an interface circuit 2820. The interface circuit 2820 may be implemented by any type of interface standard, such as an Ethernet interface, a universal serial bus (USB), a Bluetooth® interface, a near field communication (NFC) interface, and/or a PCI express interface. In this example, the interface circuit 2820 implements the example network interface 1410 of FIG. 14 represented as "NET IF" in FIG. 28.

In the illustrated example, one or more input devices 2822 are connected to the interface circuit 2820. The input device(s) 2822 permit(s) a user to enter data and/or commands into the processor 2812. The input device(s) 2822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2824 are also connected to the interface circuit 2820 of the illustrated example. The output devices 2824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 2820 of the illustrated example, thus, typically includes a graphics driver card, a graphics driver chip, and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2800 of the illustrated example also includes one or more mass storage devices 2828 for storing software and/or data. Examples of such mass storage devices 2828 include floppy disk drives, hard drive disks, CD drives, Blu-ray disk drives, redundant array of independent disks (RAID) systems, and DVD drives. In this example, the one or more mass storage devices 2828 implements the example database 1450 of FIG. 28.

The machine executable instructions 2832 of FIGS. 23-27 may be stored in the mass storage device 2828, in the volatile memory 2814, in the non-volatile memory 2816, and/or on a removable non-transitory computer readable storage medium such as a CD or DVD. In FIG. 28, the machine executable instructions 2832 is represented as "CODED INSTRUCTIONS" and "INSTR."

Figure 29:
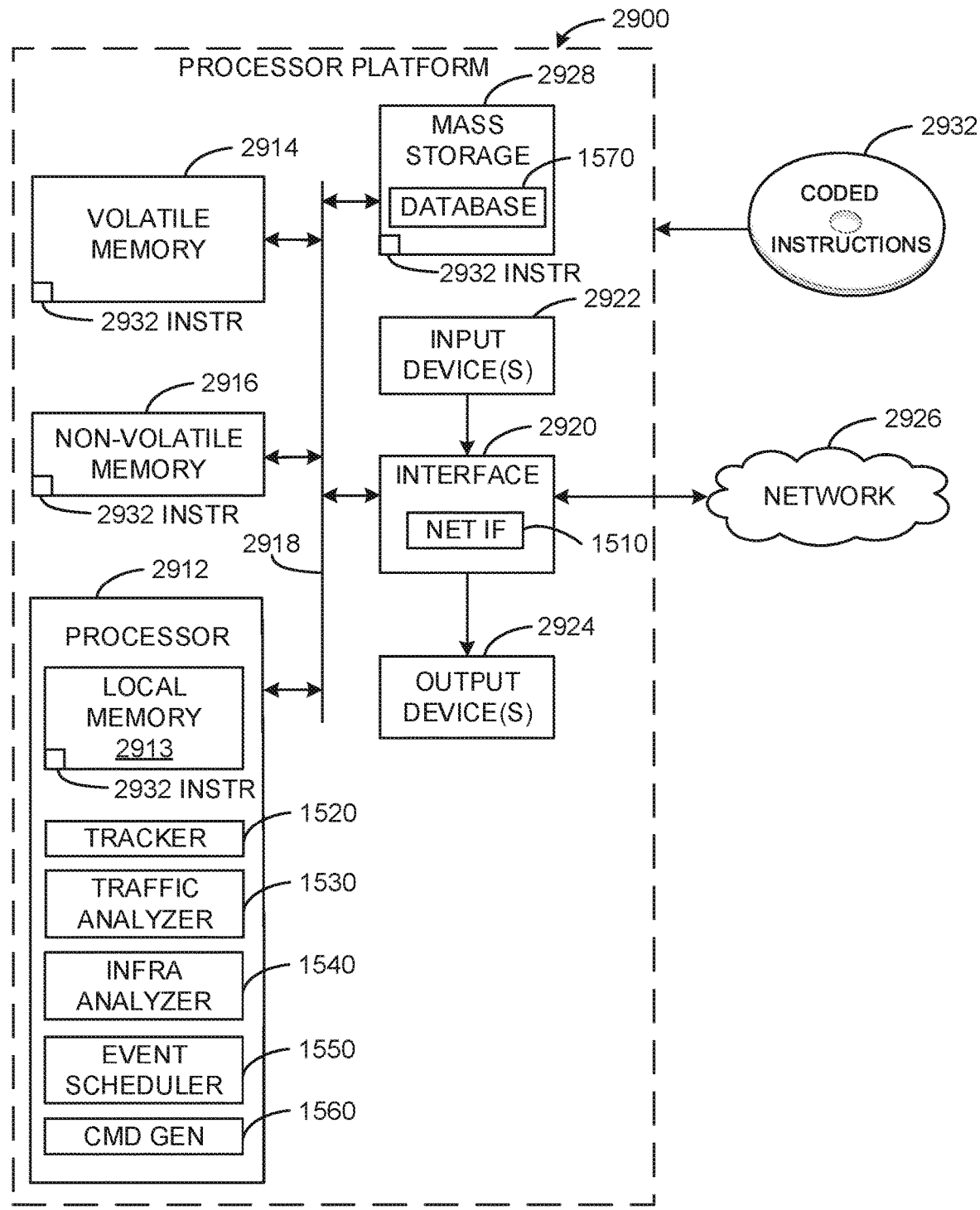
FIG. 29 is a block diagram of an example processing platform structured to execute the example machine readable instructions of FIGS. 23-27 to implement the example central server of FIG. 15.

FIG. 29 is a block diagram of an example processor platform 2900 structured to execute the instructions of FIGS. 23-27 to implement the central server 1302 of FIG. 1. The processor platform 2900 can be, for example, a server, a personal computer, a workstation, a self-learning machine (e.g., a neural network), a mobile device (e.g., a cell phone, a smart phone, a tablet such as an iPad™), a PDA, or any other type of computing device.

The processor platform 2900 of the illustrated example includes a processor 2912. The processor 2912 of the illustrated example is hardware. For example, the processor 2912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2912 implements the example autonomous vehicle tracker 1520, the example traffic analyzer 1530, the example infrastructure analyzer 1540, the example event scheduler 1550, and the example command generator 1560 of FIG. 15. In FIG. 29, the example autonomous vehicle tracker 1520 is represented as "TRACKER," the example infrastructure analyzer 1540 is represented as "INFRA ANALYZER," and the example command generator 1560 is represented as "CMD GEN."

The processor 2912 of the illustrated example includes a local memory 2913 (e.g., a cache). The processor 2912 of the illustrated example is in communication with a main memory including a volatile memory 2914 and a non-volatile memory 2916 via a bus 2918. The volatile memory 2914 may be implemented by SDRAM, DRAM, RDRAM®, and/or any other type of random access memory device. The non-volatile memory 2916 may be implemented by flash memory and/or any other desired type of memory device. Access to the main memory 2914, 2916 is controlled by a memory controller.

The processor platform 2900 of the illustrated example also includes an interface circuit 2920. The interface circuit 2920 may be implemented by any type of interface standard, such as an Ethernet interface, a USB, a Bluetooth® interface, an NFC interface, and/or a PCI express interface. In this example, the interface circuit 2920 implements the example network interface 1510 of FIG. 15. In FIG. 29, the example network interface 1510 is represented as "NET IF."

In the illustrated example, one or more input devices 2922 are connected to the interface circuit 2920. The input device(s) 2922 permit(s) a user to enter data and/or commands into the processor 2912. The input device(s) 2922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2924 are also connected to the interface circuit 2920 of the illustrated example. The output devices 2924 can be implemented, for example, by display devices (e.g., an LED, an OLED, an LCD, a CRT display, an IPS display, a touchscreen, etc.), a tactile output device, a printer, and/or speaker. The interface circuit 2920 of the illustrated example, thus, typically includes a graphics driver card, a graphics driver chip, and/or a graphics driver processor.

The interface circuit 2920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2926. The communication can be via, for example, an Ethernet connection, a DSL connection, a telephone line connection, a coaxial cable system, a satellite system, a line-of-site wireless system, a cellular telephone system, etc.

The processor platform 2900 of the illustrated example also includes one or more mass storage devices 2928 for storing software and/or data. Examples of such mass storage devices 2928 include floppy disk drives, hard drive disks, CD drives, Blu-ray disk drives, RAID systems, and DVD drives. In this example, the one or more mass storage devices 2928 implements the example database 1570 of FIG. 15.

The machine executable instructions 2932 of FIGS. 23-27 may be stored in the mass storage device 2928, in the volatile memory 2914, in the non-volatile memory 2916, and/or on a removable non-transitory computer readable storage medium such as a CD or DVD. In FIG. 29, the machine executable instructions 2932 is represented as "CODED INSTRUCTIONS" and "INSTR."

From the foregoing, it will be appreciated that example systems, methods, apparatus, and articles of manufacture have been disclosed for high-traffic density transportation (e.g., high-traffic density personalized transportation, high-traffic density air transportation, high-traffic density transportation pathways, etc., and/or a combination thereof) to implement an example mass transportation system. The disclosed system, methods, apparatus, and articles of manufacture improve travel efficiency and throughput compared to conventional transportation systems. The example mass transportation system disclosed herein can facilitate transportation for people or packages using lightweight, mobile pods that are temporarily mounted onto autonomous carriers that drive on roads, connect for high-density transport, and provide optimized traffic flow, battery power saving efficiencies, and traffic safety. The example mass transportation system facilitates rapid, efficient transition from one form of transportation (e.g., land) to another form of transportation (e.g., air) to enable faster point-to-point transit of people and/or packages.

Example methods, apparatus, systems, and articles of manufacture for high-traffic density air transportation are disclosed herein. Further examples and combinations thereof include the following:

Example 1 includes a system comprising a land vehicle having a first location, the land vehicle including a transit carrier having a movement system, first stacking couplers, a first magnetic coupler, and a second magnetic coupler, and a transit pod having second stacking couplers configured to couple to the first stacking couplers, an unmanned aerial vehicle (UAV) having UAV couplers and a second location, and a controller to in response to obtaining a request to direct the land vehicle to move from the first location to a third location, invoke the UAV to move to the third location, and in response to the land vehicle and the UAV arriving at the third location, invoke the UAV to couple to the transit pod to facilitate transport of the transit pod from the third location to a fourth location by coupling the UAV couplers to the second stacking couplers of the transit pod.

Example 2 includes the system of example 1, wherein the transit pod has the first stacking couplers on a top surface of the transit pod, the UAV has the UAV couplers on a bottom surface of the UAV, and the controller is to instruct the transit pod to decouple from the transit carrier at the third location by decoupling the second stacking couplers of the transit pod from the first stacking couplers of the transit carrier, instruct the UAV to couple to the transit pod by coupling the UAV couplers to the first stacking couplers of the transit pod, and instruct the UAV to transport the transit pod to the fourth location.

Example 3 includes the system of example 1, wherein the transit carrier is a first transit carrier, and the controller is to instruct a second transit carrier to move from a fifth location to the fourth location, the second transit carrier having the first stacking couplers on a top surface of the second transit carrier, in response to the UAV moving the transit pod to the fourth location, direct the UAV to lower the transit pod from a first height to a second height, the second height proximate a landing pad, instruct the UAV to decouple from the transit pod by decoupling the UAV couplers from the first stacking couplers of the transit pod, and after the decoupling, invoke the transit pod to couple to the second transit carrier by coupling the second stacking couplers of the transit pod to the first stacking couplers of the second transit carrier.

Example 4 includes the system of example 3, wherein the request is a first request, the transit carrier is a first transit carrier, the transit pod is a first transit pod, and the controller is to in response to obtaining a second request to transport the first transit pod to a fifth location command a second transit carrier having a sixth location to move to the fifth location, instruct the first transit pod to couple to the second transit carrier, and direct a third transit carrier coupled to a second transit pod to move from a seventh location to the fifth location, the third transit carrier having a third magnetic coupler on a rear surface of the third transit carrier, invoke the third transit carrier to couple to the second transit carrier by coupling the third magnetic coupler of the third transit carrier to the first magnetic coupler of the second transit carrier, and instruct at least one of the second transit carrier or the third transit carrier to move to the fifth location.

Example 5 includes the system of example 1, wherein the movement system is a first movement system, and the UAV has a second movement system, and the controller is to invoke the UAV to couple to the transit pod by commanding the UAV to move from a first height to a second height, the second height proximate a top surface of the transit pod, in response to the UAV moving to the second height, instructing the UAV to move across the top surface of the transit pod using the second movement system, and directing the UAV to lower a pin of the UAV couplers into a groove of the first stacking couplers to facilitate the coupling.

Example 6 includes the system of example 1, wherein the transit pod is a parcel pod having a hatch, the UAV is a first UAV, and further including a second UAV having a fifth location, and the controller is to instruct the second UAV to fly from the fifth location to the fourth location, in response to the parcel pod arriving at the fourth location, direct the second UAV to obtain a package from the parcel pod, the parcel pod to present the package to the second UAV through the hatch, and invoke the second UAV to transport the package from the fourth location to a sixth location.

Example 7 includes the system of example 6, wherein the package is a first package, and the controller is to instruct the parcel pod to move from the fourth location to a seventh location, in response to the second UAV transporting the package to the sixth location, instruct the second UAV to fly to the seventh location, direct the second UAV to obtain a second package from the parcel pod, the parcel pod to present the second package to the second UAV through the hatch, and invoke the second UAV to transport the second package from the seventh location to an eighth location.

Example 8 includes a non-transitory computer readable storage medium comprising instructions that, when executed, cause at least one processor to at least instruct a land vehicle to move from a first location to a second location, the land vehicle including a transit carrier having a movement system, first stacking couplers, a first magnetic coupler, and a second magnetic coupler, and a transit pod having second stacking couplers configured to couple to the first stacking couplers, direct a UAV to move from a third location to the second location, the UAV having transport couplers, and in response to the land vehicle and the UAV arriving at the third location, invoke the UAV to couple to the transit pod to facilitate transport of the transit pod from the third location to a fourth location by coupling the UAV couplers to the second stacking couplers of the transit pod.

Example 9 includes the non-transitory computer readable storage medium of example 8, wherein the transit pod has the first stacking couplers on a top surface of the transit pod, the UAV has the transport couplers on a bottom surface of the UAV, and the instructions, when executed, cause the at least one processor to instruct the transit pod to decouple from the transit carrier at the second location by decoupling the second stacking couplers of the transit pod from the first stacking couplers of the transit carrier, instruct the UAV to couple to the transit pod by coupling the UAV couplers to the first stacking couplers of the transit pod, and instruct the UAV to transport the transit pod to the fourth location.

Example 10 includes the non-transitory computer readable storage medium of example 8, wherein the transit carrier is a first transit carrier, and the instructions, when executed, cause the at least one processor to instruct a second transit carrier to move from a fifth location to the fourth location, the second transit carrier having the first stacking couplers on a top surface of the second transit carrier, in response to the UAV moving the transit pod to the fourth location, direct the UAV to lower the transit pod from a first height to a second height, the second height proximate a landing pad, instruct the UAV to decouple from the transit pod by decoupling the UAV couplers from the first stacking couplers of the transit pod, and after the decoupling, invoke the transit pod to couple to the second transit carrier by coupling the second stacking couplers of the transit pod to the first stacking couplers of the second transit carrier.

Example 11 includes the non-transitory computer readable storage medium of example 10, wherein the transit carrier is a first transit carrier, the transit pod is a first transit pod, and the instructions, when executed, cause the at least one processor to in response to obtaining a request to transport the first transit pod to a fifth location command a second transit carrier having a sixth location to move to the fifth location, instruct the first transit pod to couple to the second transit carrier, and direct a third transit carrier coupled to a second transit pod to move from a seventh location to the fifth location, the third transit carrier having a third magnetic coupler on a rear surface of the third transit carrier, invoke the third transit carrier to couple to the second transit carrier by coupling the third magnetic coupler of the third transit carrier to the first magnetic coupler of the second transit carrier, and instruct at least one of the second transit carrier or the third transit carrier to move to the fifth location.

Example 12 includes the non-transitory computer readable storage medium of example 8, wherein the movement system is a first movement system, and the UAV has a second movement system, and the instructions, when executed, cause the at least one processor to invoke the UAV to couple to the transit pod by commanding the UAV to move from a first height to a second height, the second height proximate a top surface of the transit pod, in response to the UAV moving to the second height, instructing the UAV to move across the top surface of the transit pod using the second movement system, and directing the UAV to lower a pin of the UAV couplers into a groove of the first stacking couplers to facilitate the coupling.

Example 13 includes the non-transitory computer readable storage medium of example 8, wherein the transit pod is a parcel pod having a hatch, the UAV is a first UAV, and further including a second UAV having a fifth location, and the instructions, when executed, cause the at least one processor to instruct the second UAV to fly from the fifth location to the fourth location, in response to the parcel pod arriving at the fourth location, direct the second UAV to obtain a package from the parcel pod, the parcel pod to present the package to the second UAV through the hatch, and invoke the second UAV to transport the package from the fourth location to a sixth location.

Example 14 includes the non-transitory computer readable storage medium of example 13, wherein the package is a first package, and the instructions, when executed, cause the at least one processor to instruct the parcel pod to move from the fourth location to a seventh location, in response to the second UAV transporting the package to the sixth location, instruct the second UAV to fly to the seventh location, direct the second UAV to obtain a second package from the parcel pod, the parcel pod to present the second package to the second UAV through the hatch, and invoke the second UAV to transport the second package from the seventh location to an eighth location.

Example 15 includes a method comprising instructing a land vehicle to move from a first location to a second location, the land vehicle including a transit carrier having a movement system, first stacking couplers, a first magnetic coupler, and a second magnetic coupler, and a transit pod having second stacking couplers configured to couple to the first stacking couplers, directing a UAV to move from a third location to the second location, the UAV having transport couplers, and in response to the land vehicle and the UAV arriving at the third location, invoking the UAV to couple to the transit pod to facilitate transport of the transit pod from the third location to a fourth location by coupling the UAV couplers to the second stacking couplers of the transit pod.

Example 16 includes the method of example 15, wherein the transit pod has the first stacking couplers on a top surface of the transit pod, the UAV has the transport couplers on a bottom surface of the UAV, and further including instructing the transit pod to decouple from the transit carrier at the second location by decoupling the second stacking couplers of the transit pod from the first stacking couplers of the transit carrier, instructing the UAV to couple to the transit pod by coupling the UAV couplers to the first stacking couplers of the transit pod, and instructing the UAV to transport the transit pod to the fourth location.

Example 17 includes the method of example 15, wherein the transit carrier is a first transit carrier, and further including instructing a second transit carrier to move from a fifth location to the fourth location, the second transit carrier having the first stacking couplers on a top surface of the second transit carrier, in response to the UAV moving the transit pod to the fourth location, directing the UAV to lower the transit pod from a first height to a second height, the second height proximate a landing pad, instructing the UAV to decouple from the transit pod by decoupling the UAV couplers from the first stacking couplers of the transit pod, and after the decoupling, invoking the transit pod to couple to the second transit carrier by coupling the second stacking couplers of the transit pod to the first stacking couplers of the second transit carrier.

Example 18 includes the method of example 17, wherein the transit carrier is a first transit carrier, the transit pod is a first transit pod, and further including in response to obtaining a request to transport the first transit pod to a fifth location commanding a second transit carrier having a sixth location to move to the fifth location, instructing the first transit pod to couple to the second transit carrier, and directing a third transit carrier coupled to a second transit pod to move from a seventh location to the fifth location, the third transit carrier having a third magnetic coupler on a rear surface of the third transit carrier, invoking the third transit carrier to couple to the second transit carrier by coupling the third magnetic coupler of the third transit carrier to the first magnetic coupler of the second transit carrier, and instructing at least one of the second transit carrier or the third transit carrier to move to the fifth location.

Example 19 includes the method of example 15, wherein the movement system is a first movement system, and the UAV has a second movement system, and invoking the UAV to couple to the transit pod includes commanding the UAV to move from a first height to a second height, the second height proximate a top surface of the transit pod, in response to the UAV moving to the second height, instructing the UAV to move across the top surface of the transit pod using the second movement system, and directing the UAV to lower a pin of the UAV couplers into a groove of the first stacking couplers to facilitate the coupling.

Example 20 includes the method of example 15, wherein the transit pod is a parcel pod having a hatch, the UAV is a first UAV, and further including a second UAV having a fifth location, and further including instructing the second UAV to fly from the fifth location to the fourth location, in response to the parcel pod arriving at the fourth location, directing the second UAV to obtain a package from the parcel pod, the parcel pod to present the package to the second UAV through the hatch, and invoking the second UAV to transport the package from the fourth location to a sixth location.

Example 21 includes the method of example 20, wherein the package is a first package, and further including instructing the parcel pod to move from the fourth location to a seventh location, in response to the second UAV transporting the package to the sixth location, instructing the second UAV to fly to the seventh location, directing the second UAV to obtain a second package from the parcel pod, the parcel pod to present the second package to the second UAV through the hatch, and invoking the second UAV to transport the second package from the seventh location to an eighth location.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
    a land vehicle having a first location, the land vehicle including:
        a transit carrier having a movement system, first stacking couplers, a first magnetic coupler, and a second magnetic coupler; and
        a transit pod having second stacking couplers and third stacking couplers, the second stacking couplers configured to couple to the first stacking couplers;
    an unmanned aerial vehicle (UAV) having UAV couplers and a second location; and
    a controller to:
        in response to obtaining a request to direct the land vehicle to move from the first location to a third location, invoke the UAV to move to the third location; and
        in response to the land vehicle and the UAV arriving at the third location, invoke the UAV to couple to the transit pod to facilitate transport of the transit pod from the third location to a fourth location by coupling the UAV couplers to the third stacking couplers of the transit pod.

2. The system of claim 1, wherein the transit pod has the third stacking couplers on a top surface of the transit pod, the UAV has the UAV couplers on a bottom surface of the UAV, and the controller is to:
    instruct the transit pod to decouple from the transit carrier at the third location by decoupling the second stacking couplers of the transit pod from the first stacking couplers of the transit carrier;
    instruct the UAV to couple to the transit pod by coupling the UAV couplers to the third stacking couplers of the transit pod; and
    instruct the UAV to transport the transit pod to the fourth location.

3. The system of claim 1, wherein the transit carrier is a first transit carrier, and the controller is to:
    instruct a second transit carrier to move from a fifth location to the fourth location, the second transit carrier having the first stacking couplers on a top surface of the second transit carrier;
    in response to the UAV moving the transit pod to the fourth location, direct the UAV to lower the transit pod from a first height to a second height, the second height proximate a landing pad;
    instruct the UAV to decouple from the transit pod by decoupling the UAV couplers from the third stacking couplers of the transit pod; and
    after the decoupling, invoke the transit pod to couple to the second transit carrier by coupling the second stacking couplers of the transit pod to the first stacking couplers of the second transit carrier.

4. The system of claim 3, wherein the request is a first request, the transit carrier is a first transit carrier, the transit pod is a first transit pod, and the controller is to:
    in response to obtaining a second request to transport the first transit pod to a fifth location:
        command a second transit carrier having a sixth location to move to the fifth location;
        instruct the first transit pod to couple to the second transit carrier;
        direct a third transit carrier coupled to a second transit pod to move from a seventh location to the fifth location, the third transit carrier having a third magnetic coupler on a rear surface of the third transit carrier;
        invoke the third transit carrier to couple to the second transit carrier by coupling the third magnetic coupler of the third transit carrier to the first magnetic coupler of the second transit carrier; and
        instruct at least one of the second transit carrier or the third transit carrier to move to the fifth location.

5. The system of claim 1, wherein the movement system is a first movement system, the UAV has a second movement system, and the controller is to invoke the UAV to couple to the transit pod by:
   commanding the UAV to move from a first height to a second height, the second height proximate a top surface of the transit pod;
   in response to the UAV moving to the second height, instructing the UAV to move across the top surface of the transit pod using the second movement system; and
   directing the UAV to lower a pin of the UAV couplers into a groove of the third stacking couplers to facilitate the coupling.

6. The system of claim 1, wherein the transit pod is a parcel pod having a hatch, the UAV is a first UAV, the system further including a second UAV having a fifth location, and the controller is to:
   instruct the second UAV to fly from the fifth location to the fourth location;
   in response to the parcel pod arriving at the fourth location, direct the second UAV to obtain a package from the parcel pod, the parcel pod to present the package to the second UAV through the hatch; and
   invoke the second UAV to transport the package from the fourth location to a sixth location.

7. The system of claim 6, wherein the package is a first package, and the controller is to:
   instruct the parcel pod to move from the fourth location to a seventh location;
   in response to the second UAV transporting the package to the sixth location, instruct the second UAV to fly to the seventh location;
   direct the second UAV to obtain a second package from the parcel pod, the parcel pod to present the second package to the second UAV through the hatch; and
   invoke the second UAV to transport the second package from the seventh location to an eighth location.

8. A non-transitory computer readable storage medium comprising instructions that, when executed, cause at least one processor to at least:
   instruct a land vehicle to move from a first location to a second location, the land vehicle including:
      a transit carrier having a movement system, first stacking couplers, a first magnetic coupler, and a second magnetic coupler; and
      a transit pod having second stacking couplers and third stacking couplers, the second stacking couplers configured to couple to the first stacking couplers;
   direct a UAV to move from a third location to the second location, the UAV having transport couplers; and
   in response to the land vehicle and the UAV arriving at the third location, invoke the UAV to couple to the transit pod to facilitate transport of the transit pod from the third location to a fourth location by coupling the UAV couplers to the third stacking couplers of the transit pod.

9. The non-transitory computer readable storage medium of claim 8, wherein the transit pod has the third stacking couplers on a top surface of the transit pod, the UAV has the UAV couplers on a bottom surface of the UAV, and the instructions, when executed, cause the at least one processor to:
   instruct the transit pod to decouple from the transit carrier at the second location by decoupling the second stacking couplers of the transit pod from the first stacking couplers of the transit carrier;
   instruct the UAV to couple to the transit pod by coupling the UAV couplers to the third stacking couplers of the transit pod; and
   instruct the UAV to transport the transit pod to the fourth location.

10. The non-transitory computer readable storage medium of claim 8, wherein the transit carrier is a first transit carrier, and the instructions, when executed, cause the at least one processor to:
   instruct a second transit carrier to move from a fifth location to the fourth location, the second transit carrier having the first stacking couplers on a top surface of the second transit carrier;
   in response to the UAV moving the transit pod to the fourth location, direct the UAV to lower the transit pod from a first height to a second height, the second height proximate a landing pad;
   instruct the UAV to decouple from the transit pod by decoupling the UAV couplers from the third stacking couplers of the transit pod; and
   after the decoupling, invoke the transit pod to couple to the second transit carrier by coupling the second stacking couplers of the transit pod to the first stacking couplers of the second transit carrier.

11. The non-transitory computer readable storage medium of claim 10, wherein the transit carrier is a first transit carrier, the transit pod is a first transit pod, and the instructions, when executed, cause the at least one processor to:
   in response to obtaining a request to transport the first transit pod to a fifth location:
      command a second transit carrier having a sixth location to move to the fifth location;
      instruct the first transit pod to couple to the second transit carrier;
      direct a third transit carrier coupled to a second transit pod to move from a seventh location to the fifth location, the third transit carrier having a third magnetic coupler on a rear surface of the third transit carrier;
      invoke the third transit carrier to couple to the second transit carrier by coupling the third magnetic coupler of the third transit carrier to the first magnetic coupler of the second transit carrier; and
      instruct at least one of the second transit carrier or the third transit carrier to move to the fifth location.

12. The non-transitory computer readable storage medium of claim 8, wherein the movement system is a first movement system, and the UAV has a second movement system, and the instructions, when executed, cause the at least one processor to invoke the UAV to couple to the transit pod by:
   commanding the UAV to move from a first height to a second height, the second height proximate a top surface of the transit pod;
   in response to the UAV moving to the second height, instructing the UAV to move across the top surface of the transit pod using the second movement system; and
   directing the UAV to lower a pin of the UAV couplers into a groove of the third stacking couplers to facilitate the coupling.

13. The non-transitory computer readable storage medium of claim 8, wherein the transit pod is a parcel pod having a hatch, the UAV is a first UAV, and the instructions, when executed, cause the at least one processor to:
   instruct a second UAV to fly from a fifth location to the fourth location;
   in response to the parcel pod arriving at the fourth location, direct the second UAV to obtain a package from the parcel pod, the parcel pod to present the package to the second UAV through the hatch; and invoke the second UAV to transport the package from the fourth location to a sixth location.

14. The non-transitory computer readable storage medium of claim 13, wherein the package is a first package, and the instructions, when executed, cause the at least one processor to:

instruct the parcel pod to move from the fourth location to a seventh location;

in response to the second UAV transporting the package to the sixth location, instruct the second UAV to fly to the seventh location;

direct the second UAV to obtain a second package from the parcel pod, the parcel pod to present the second package to the second UAV through the hatch; and invoke the second UAV to transport the second package from the seventh location to an eighth location.

15. A method comprising:

instructing a land vehicle to move from a first location to a second location, the land vehicle including:

a transit carrier having a movement system, first stacking couplers, a first magnetic coupler, and a second magnetic coupler; and a transit pod having second stacking couplers and third stacking couplers, the second stacking couplers configured to couple to the first stacking couplers;

directing a UAV to move from a third location to the second location, the UAV having transport couplers; and in response to the land vehicle and the UAV arriving at the third location, invoking the UAV to couple to the transit pod to facilitate transport of the transit pod from the third location to a fourth location by coupling the UAV couplers to the third stacking couplers of the transit pod.

16. The method of claim 15, wherein the transit pod has the third stacking couplers on a top surface of the transit pod, the UAV has the transport couplers on a bottom surface of the UAV, and the method further including:

instructing the transit pod to decouple from the transit carrier at the second location by decoupling the second stacking couplers of the transit pod from the first stacking couplers of the transit carrier;

instructing the UAV to couple to the transit pod by coupling the UAV couplers to the third stacking couplers of the transit pod; and instructing the UAV to transport the transit pod to the fourth location.

17. The method of claim 15, wherein the transit carrier is a first transit carrier, and the method further including:

instructing a second transit carrier to move from a fifth location to the fourth location, the second transit carrier having the first stacking couplers on a top surface of the second transit carrier;

in response to the UAV moving the transit pod to the fourth location, directing the UAV to lower the transit pod from a first height to a second height, the second height proximate a landing pad;

instructing the UAV to decouple from the transit pod by decoupling the UAV couplers from the third stacking couplers of the transit pod; and after the decoupling, invoking the transit pod to couple to the second transit carrier by coupling the second stacking couplers of the transit pod to the first stacking couplers of the second transit carrier.

18. The method of claim 17, wherein the transit carrier is a first transit carrier, the transit pod is a first transit pod, and the method further including:

in response to obtaining a request to transport the first transit pod to a fifth location:

commanding a second transit carrier having a sixth location to move to the fifth location;

instructing the first transit pod to couple to the second transit carrier;

directing a third transit carrier coupled to a second transit pod to move from a seventh location to the fifth location, the third transit carrier having a third magnetic coupler on a rear surface of the third transit carrier;

invoking the third transit carrier to couple to the second transit carrier by coupling the third magnetic coupler of the third transit carrier to the first magnetic coupler of the second transit carrier; and instructing at least one of the second transit carrier or the third transit carrier to move to the fifth location.

19. The method of claim 15, wherein the movement system is a first movement system, the UAV has a second movement system, and the invoking of the UAV to couple to the transit pod including:

commanding the UAV to move from a first height to a second height, the second height proximate a top surface of the transit pod;

in response to the UAV moving to the second height, instructing the UAV to move across the top surface of the transit pod using the second movement system; and directing the UAV to lower a pin of the UAV couplers into a groove of the third stacking couplers to facilitate the coupling.

20. The method of claim 15, wherein the transit pod is a parcel pod having a hatch, the UAV is a first UAV, and further including a second UAV having a fifth location, and the method further including:

instructing the second UAV to fly from the fifth location to the fourth location;

in response to the parcel pod arriving at the fourth location, directing the second UAV to obtain a package from the parcel pod, the parcel pod to present the package to the second UAV through the hatch; and invoking the second UAV to transport the package from the fourth location to a sixth location.

21. The method of claim 20, wherein the package is a first package, and the method further including:

instructing the parcel pod to move from the fourth location to a seventh location;

in response to the second UAV transporting the package to the sixth location, instructing the second UAV to fly to the seventh location;

directing the second UAV to obtain a second package from the parcel pod, the parcel pod to present the second package to the second UAV through the hatch; and invoking the second UAV to transport the second package from the seventh location to an eighth location.

* * * * *